United States Patent [19]
Sasaki

[11] Patent Number: 5,819,070
[45] Date of Patent: Oct. 6, 1998

[54] METHOD AND APPARATUS FOR PROCESSING FINITE ELEMENT MESHING MODEL

[75] Inventor: Toyoshige Sasaki, Yokohama, Japan

[73] Assignee: Canon Kabushiki Kaisha, Tokyo, Japan

[21] Appl. No.: 637,372

[22] Filed: Apr. 25, 1996

[30] Foreign Application Priority Data

Apr. 27, 1995 [JP] Japan .................................. 7-103969
Jun. 20, 1995 [JP] Japan .................................. 7-153277
Jun. 20, 1995 [JP] Japan .................................. 7-153278

[51] Int. Cl.$^6$ .................................................. G06T 17/40
[52] U.S. Cl. ........................ 395/500; 364/575; 345/420; 707/526
[58] Field of Search .................................. 364/578, 570, 364/572, 556, 133, 500; 345/423, 420; 707/526

[56] References Cited

U.S. PATENT DOCUMENTS

| | | | |
|---|---|---|---|
| 4,744,047 | 5/1988 | Okamoto et al. | 364/900 |
| 4,858,146 | 8/1989 | Shebini | 364/512 |
| 5,010,501 | 4/1991 | Arakawa | 364/522 |
| 5,315,537 | 5/1994 | Blacker | 364/570 |

FOREIGN PATENT DOCUMENTS 4346178  12/1992  Japan.

OTHER PUBLICATIONS

IBM Technical Disclosure Bulletin, "Surface Flow Correction In Fast Drawing Systems," vol. 34, No. 1, pp. 481–484, Jun. 1, 1991.

*Primary Examiner*—Kevin J. Teska
*Assistant Examiner*—Thai Phan
*Attorney, Agent, or Firm*—Fitzpatrick, Cella, Harper & Scinto

[57] ABSTRACT

In a finite element meshing model, the number of elements sharing boundaries surrounding a node of interest are counted and whether the node is positioned inside or outside an outer circumference of the element mesh model is determined to detect errors. Errors are detected when the position of a node determined from the sum of the angles of the elements surrounding the node differs from the position of the node determined from boundary face connections. An error is also determined from the maximum and minimum angles of the external shape of a model formed from input data.

73 Claims, 59 Drawing Sheets

| ELEMENT | NODE$n_i$ | NODE$n_j$ | SIDE$n_0$-$n_i$ | SIDE$n_0$-$n_j$ |
|---|---|---|---|---|
| $E_1$ | $n_1$ | $n_2$ | 1 | 1 |

| ELEMENT | NODE$n_i$ | NODE$n_j$ | SIDE$n_0$-$n_i$ | SIDE$n_0$-$n_j$ |
|---|---|---|---|---|
| $E_1$ | $n_1$ | $n_2$ | 1 | 2 |
| $E_2$ | $n_2$ | $n_3$ | 2 | 1 |

| ELEMENT | NODE$n_i$ | NODE$n_j$ | SIDE$n_0$-$n_i$ | SIDE$n_0$-$n_j$ |
|---|---|---|---|---|
| $E_1$ | $n_1$ | $n_2$ | 1 | 2 |
| $E_2$ | $n_2$ | $n_3$ | 2 | 2 |
| $E_3$ | $n_3$ | $n_4$ | 2 | 1 |

| ELEMENT | NODE$n_i$ | NODE$n_j$ | SIDE$n_0$-$n_i$ | SIDE$n_0$-$n_j$ |
|---|---|---|---|---|
| $E_1$ | $n_1$ | $n_2$ | 2 | 2 |
| $E_2$ | $n_2$ | $n_3$ | 2 | 2 |
| $E_3$ | $n_3$ | $n_4$ | 2 | 2 |
| $E_4$ | $n_4$ | $n_5$ | 2 | 2 |
| $E_5$ | $n_5$ | $n_1$ | 2 | 2 |

| ELEMENT | NODE$n_i$ | NODE$n_j$ | NODE$n_k$ | FACE$n_0$-$n_i$-$n_j$ | FACE$n_0$-$n_j$-$n_k$ | FACE$n_0$-$n_k$-$n_i$ |
|---|---|---|---|---|---|---|
| $E_1$ | $n_1$ | $n_2$ | $n_6$ | 1 | 1 | 1 |

| ELEMENT | NODE$n_i$ | NODE$n_j$ | NODE$n_k$ | FACE$n_0$-$n_i$-$n_j$ | FACE$n_0$-$n_j$-$n_k$ | FACE$n_0$-$n_k$-$n_i$ |
|---|---|---|---|---|---|---|
| $E_1$ | $n_1$ | $n_2$ | $n_6$ | 1 | 2 | 1 |
| $E_2$ | $n_2$ | $n_3$ | $n_6$ | 1 | 1 | 2 |

| ELEMENT | NODEni | NODEnj | NODEnk | FACEn0-ni-nj | FACEn0-nj-nk | FACEn0-nk-ni |
|---------|--------|--------|--------|--------------|--------------|--------------|
| $E_1$ | $n_1$ | $n_2$ | $n_6$ | 1 | 2 | 1 |
| $E_2$ | $n_2$ | $n_3$ | $n_6$ | 1 | 2 | 2 |
| $E_3$ | $n_3$ | $n_4$ | $n_6$ | 1 | 1 | 2 |

| ELEMENT | NODEni | NODEnj | NODEnk | FACEn0-ni-nj | FACEn0-nj-nk | FACEn0-nk-ni |
|---------|--------|--------|--------|--------------|--------------|--------------|
| $E_1$ | $n_1$ | $n_2$ | $n_6$ | 1 | 2 | 2 |
| $E_2$ | $n_2$ | $n_3$ | $n_6$ | 1 | 2 | 2 |
| $E_3$ | $n_3$ | $n_4$ | $n_6$ | 1 | 2 | 2 |
| $E_4$ | $n_4$ | $n_5$ | $n_6$ | 1 | 2 | 2 |
| $E_5$ | $n_5$ | $n_1$ | $n_6$ | 1 | 2 | 2 |

| ELEMENT | NODE$n_i$ | NODE$n_j$ | SIDE$n_0$-$n_i$ | SIDE$n_0$-$n_j$ | REPRESENTATIVE ELEMENT |
|---|---|---|---|---|---|
| $E_1$ | $n_1$ | $n_2$ | 1 | 1 | $E_1$ |

| ELEMENT | NODE$n_i$ | NODE$n_j$ | SIDE$n_0$-$n_i$ | SIDE$n_0$-$n_j$ | REPRESENTATIVE ELEMENT |
|---|---|---|---|---|---|
| $E_1$ | $n_1$ | $n_2$ | 1 | 2 | $E_1$ |
| $E_2$ | $n_2$ | $n_3$ | 2 | 1 | $E_1$ |

| ELEMENT | NODE$n_i$ | NODE$n_j$ | SIDE$n_0$-$n_i$ | SIDE$n_0$-$n_j$ | REPRESENTATIVE ELEMENT |
|---|---|---|---|---|---|
| $E_1$ | $n_1$ | $n_2$ | 1 | 2 | $E_1$ |
| $E_2$ | $n_2$ | $n_3$ | 2 | 2 | $E_1$ |
| $E_3$ | $n_3$ | $n_4$ | 2 | 1 | $E_1$ |

| ELEMENT | NODE$n_i$ | NODE$n_j$ | SIDE$n_0$-$n_i$ | SIDE$n_0$-$n_j$ | REPRESENTATIVE ELEMENT |
|---|---|---|---|---|---|
| $E_1$ | $n_1$ | $n_2$ | 2 | 2 | $E_1$ |
| $E_2$ | $n_2$ | $n_3$ | 2 | 2 | $E_1$ |
| $E_3$ | $n_3$ | $n_4$ | 2 | 2 | $E_1$ |
| $E_4$ | $n_4$ | $n_5$ | 2 | 2 | $E_1$ |
| $E_5$ | $n_5$ | $n_1$ | 2 | 2 | $E_1$ |

FIG.12

| MODEL | ELEMENT SHAPE | CONVENTIONAL METHOD(1) | PRESENT INVENTION |
|---|---|---|---|
| TWO-DIMENSIONAL MODEL | TRIANGLE | $4.5E_n^2$ | $4.5E_n^2 + 3e_n$ |
| | QUADRANGLE | $8E_n^2$ | $8E_n^2 + 4e_n$ |
| THREE-DIMENSIONAL MODEL | TETRAHEDRON | $18E_n^2$ | $5.3E_n^2 + 21e_n$ |
| | PENTAHEDRON (TRIANGULAR PRISM) | $40.5E_n^2$ | $15E_n^2 + 24e_n$ |
| | HEXAHEDRON | $72E_n^2$ | $24E_n^2 + 32e_n$ |

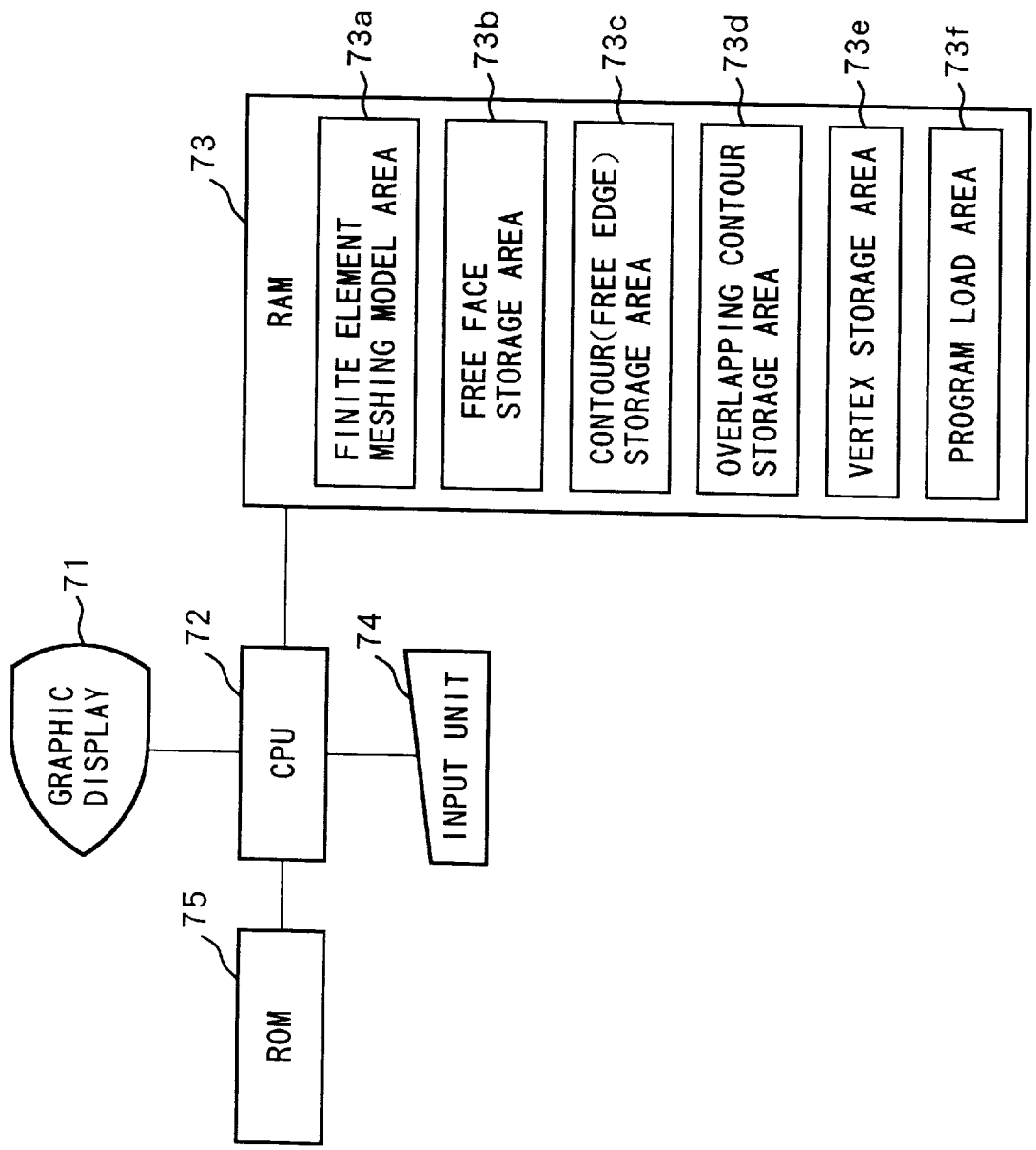

| ELEMENT SHAPE | NUMBER OF SIDES | NUMBER OF FACES |
|---|---|---|
| TRIANGULAR PYRAMID | 6 | 4 |
| QUADRANGULAR PYRAMID | 8 | 5 |
| PENTAGONAL PYRAMID | 9 | 5 |
| HEXAGONAL PYRAMID | 12 | 6 |

FIG.32A

SEGMENT LIST

| LIST NUMBER | ELEMENT NUMBER | LOCAL SEGMENT NUMBER |
|---|---|---|
| 1 | | |
| 2 | | |
| 3 | | |
| EXPRESSION(1) | | |

ROW ↓

} TWO ROWS

FIG.32B

INDEX TABLE

| INDEX VALUE | NUMBER OF CORRESPONDING SEGMENTS | FIRST LIST NUMBER |
|---|---|---|
| 1 | | |
| 2 | | |
| 3 | 2 | 1 |
| EXPRESSION(2) | | |

ROW ↓

FIG.34A

DEFINITION OF FACE NUMBER

| FACE NUMBER | FACE CONSTITUTING NODE STRING |
|---|---|
| 1 | $n_1, n_2, n_3$ |
| 2 | $n_4, n_5, n_6$ |
| 3 | $n_1, n_2, n_5, n_4$ |
| 4 | $n_2, n_3, n_6, n_5$ |
| 5 | $n_3, n_1, n_4, n_6$ |

FIG.34B

DEFINITION OF SIDE NUMBER

| SIDE NUMBER | SIDE CONSTITUTING NODE STRING |
|---|---|
| 1 | $n_1, n_2$ |
| 2 | $n_2, n_3$ |
| 3 | $n_3, n_1$ |
| 4 | $n_2, n_5$ |
| 5 | $n_3, n_6$ |
| 6 | $n_1, n_4$ |
| 7 | $n_4, n_5$ |
| 8 | $n_5, n_6$ |
| 9 | $n_6, n_4$ |

FIG.36A

FACE LIST

| LIST NUMBER | ELEMENT NUMBER | FACE NUMBER |
|---|---|---|
| 1 | E1 | 1 |
| 2 | E1 | 2 |
| 3 | E1 | 4 |
| 4 | E2 | 1 |
| 5 | E1 | 3 |
| 6 | E2 | 2 |
| 7 | E2 | 3 |
| 8 | E2 | 4 |

FIG.36B

INDEX TABLE

| INDEX VALUE | NUMBER OF CORRESPONDING FACES | FIRST LIST NUMBER |
|---|---|---|
| . | 0 | |
| 6 | 1 | 1 |
| 7 | 1 | 2 |
| 8 | 2 | 3 |
| 9 | 2 | 5 |
| 10 | 1 | 7 |
| . | 0 | |
| 12 | 1 | 8 |

FIG.38A

SIDE LIST

| | LIST NUMBER | ELEMENT NUMBER | SIDE NUMBER |
|---|---|---|---|
| * | 1 | E1 | 1 |
| | 2 | E1 | 3 |
| | 3 | E2 | 1 |
| * | 4 | E1 | 2 |
| | 5 | E1 | 6 |
| | 6 | E2 | 2 |
| * | 7 | E1 | 4 |
| * | 8 | E2 | 4 |
| | 9 | E1 | 5 |
| | 10 | E2 | 3 |
| * | 11 | E2 | 6 |
| * | 12 | E2 | 5 |

FIG.38B

INDEX TABLE

| INDEX VALUE | NUMBER OF CORRESPONDING SIDES | FIRST LIST NUMBER |
|---|---|---|
| . | 0 | |
| 3 | 1 | 1 |
| 4 | 2 | 2 |
| 5 | 3 | 4 |
| 6 | 2 | 7 |
| 7 | 2 | 9 |
| 8 | 1 | 11 |
| 9 | 1 | 12 |

FIG. 41A

FACE LIST

| LIST NUMBER | ELEMENT NUMBER | SIDE NUMBER |
|---|---|---|
| 1 | E1 | 1 |
| 2 | E1 | 2 |
| 3 | E1 | 4 |
| 4 | E2 | 1 |
| 5 | E1 | 3 |
| 6 | E2 | 2 |
| 7 | E2 | 3 |
| 8 | E3 | 1 |
| 9 | E3 | 3 |
| 10 | E2 | 4 |
| 11 | E3 | 2 |
| 12 | E3 | 4 |

FIG. 41B

INDEX TABLE

| INDEX VALUE | NUMBER OF CORRESPONDING FACES | FIRST LIST NUMBER |
|---|---|---|
| . | 0 | |
| 6 | 1 | 1 |
| 7 | 1 | 2 |
| 8 | 2 | 3 |
| 9 | 2 | 5 |
| 10 | 2 | 7 |
| 11 | 1 | 9 |
| 12 | 2 | 10 |
| . | 0 | |
| 15 | 1 | 12 |

FIG.45A

SIDE LIST

| LIST NUMBER | ELEMENT NUMBER | SIDE NUMBER |
|---|---|---|
| 1 | F1 | 1 |
| 2 | F2 | 3 |
| 3 | F1 | 3 |
| . | | |
| 5 | F1 | 2 |
| . | | |
| 7 | F2 | 1 |
| . | | |
| 18 | | |

FIG.45B

INDEX TABLE

| INDEX VALUE | NUMBER OF CORRESPONDING SIDES | FIRST LIST NUMBER |
|---|---|---|
| . | 0 | |
| 3 | 2 | 1 |
| 4 | 2 | 3 |
| 5 | 4 | 5 |
| . | | |

FIG.46A

ELEMENT LIST

| LIST NUMBER | ELEMENT NUMBER |
|---|---|
| 1 | E1 |
| 2 | E2 |
| 3 | E3 |

FIG.46B

INDEX TABLE

| INDEX VALUE | NUMBER OF CORRESPONDING ELEMENTS | FIRST LIST NUMBER |
|---|---|---|
| . | 0 | |
| 10 | 1 | 1 |
| . | 0 | |
| 13 | 2 | 2 |
| 14 | 0 | |

FIG.49A

SEGMENT LIST

| LIST NUMBER | SEGMENT NODE STRING | | | |
|---|---|---|---|---|
| 1 | | | | |
| 2 | | | | |
| 3 | | | | |
| [EXPRESSION(1)] | | | | |

ROW ↓

$$[\text{EXPRESSION}(1)] = \sum_{i=1}^{elem} S_i$$

FIG.49B

INDEX TABLE

| INDEX VALUE | LIST NUMBER STRING | | | |
|---|---|---|---|---|
| 1 | | | | |
| 2 | | | | |
| 3 | | | | |
| [EXPRESSION(2)] | | | | |

ROW ↓

$$[\text{EXPRESSION}(2)] = \sum_{i=0}^{m-1} (N-i)$$

FIG.51A (a) FACE LIST

| LIST NUMBER | FACE CONSTITUTING NODE STRING | | | INDEX VALUE |
|---|---|---|---|---|
| 1 | 1 | 2 | 3 | → 6 |
| 2 | 1 | 4 | 2 | → 7 |
| 3 | 2 | 4 | 3 | → 9 |
| 4 | 3 | 4 | 1 | → 8 |
| 5 | 3 | 1 | 4 | → 8 |
| 6 | 3 | 5 | 1 | → 9 |
| 7 | 1 | 5 | 4 | → 10 |
| 8 | 4 | 5 | 3 | → 12 |

FIG.51B (b) INDEX TABLE

| INDEX VALUE | LIST NUMBER STRING | | | | |
|---|---|---|---|---|---|
| · | | | | | |
| 6 | 1 | | | | |
| 7 | 2 | | | | |
| 8 | 4 | 5 | | | |
| 9 | 3 | 6 | | | |
| 10 | 7 | | | | |
| · | | | | | |
| 12 | 8 | | | | |

(a) SIDE LIST

| LIST NUMBER | SIDE CONSTITUTING NODE STRING | | INDEX VALUE |
|---|---|---|---|
| 1 | 1 | 2 | → 3 |
| 2 | 2 | 3 | → 5 |
| 3 | 3 | 1 | → 4 |
| 4 | 2 | 4 | → 6 |
| 5 | 3 | 4 | → 7 |
| 6 | 1 | 4 | ⋮ |
| 7 | 3 | 1 | |
| 8 | 1 | 4 | |
| 9 | 4 | 3 | |
| 10 | 1 | 5 | |
| 11 | 4 | 5 | |
| 12 | 3 | 5 | |

(b) INDEX TABLE

| INDEX VALUE | LIST NUMBER STRING | | | | |
|---|---|---|---|---|---|
| • | | | | | |
| 3 | 1 | | | | |
| 4 | 3 | 7 | | | |
| 5 | 2 | 6 | 8 | | |
| 6 | 4 | 10 | | | |
| 7 | 5 | 9 | | | |
| 8 | 12 | | | | |
| 9 | 11 | | | | |
| • | | | | | |

METHOD AND APPARATUS FOR PROCESSING FINITE ELEMENT MESHING MODEL

BACKGROUND OF THE INVENTION

The present invention relates to a method and an apparatus for performing various processes for two-dimensional or three-dimensional finite element meshing models for use in, e.g., finite element analysis or boundary element analysis. More specifically, the present invention relates to detection of data errors in formed element meshing diagrams, relates to extraction of contours and vertices (acute portions in three-dimensional models and corners in two-dimensional models) of finite element meshing models, which can be used in displaying finite element meshing models and detecting errors that the meshing models have, and relates to extraction of sides, faces, and elements from finite element meshing models, which is useful in extracting a specific side, face, or finite element (these will be collectively referred to as segments hereinafter) from a finite element meshing model and usable in extraction of counters, surfaces, and overlapping elements of a finite element meshing model, extraction of adjacent elements in the model, and extraction of an element including an arbitrary point of the model.

With the recent rapid progress of computers, numerical analytic methods such as a finite difference method, a finite element method, and a boundary element method have become frequently used. Generally, these numerical analytic methods make use of a finite element meshing model formed by meshing an analytic model into a number of finite elements (meshing models used in the finite difference method, the finite element method, and the boundary element method will be collectively referred to as finite element meshing models hereinafter). Recently, three-dimensional element meshing models are commonly used because the computer performance has been improved.

(I) First, in data analysis using the finite element method, finite element meshing data formed by meshing an analytic model into finite elements is necessary. Generally, this finite element meshing data is interactively formed by an analyst by using a computer (particularly EWS). The element meshing data thus formed often has errors excluding input errors such as shape input errors.

Commonly, errors in element meshing data are classified into two categories: nonfatal errors which increase calculation errors by an analytic solver, but have no influence on calculations and fatal errors which make an analytic solver inexecutable or which lead to solutions under conditions different from those intended by an analyst. The former errors are generally caused by the shapes of individual elements, e.g., flat elements and distorted elements. These errors are detected by checking the shapes of individual elements. On the other hand, the latter errors result from, e.g., mismatching in links between elements. The latter errors will be described in more detail below.

Assume that thin plate-like elements in which all nodes are present on a two-dimensional plane will be called two-dimensional elements and elements having a volume and a three-dimensional shape will be called three-dimensional elements. Assume also that models consisting of two-dimensional elements will be called two-dimensional models and models consisting of three-dimensional elements will be called three-dimensional models.

Generally, element meshing data must satisfy the following conditions.

(1) No elements overlap each other.
(2) An analytic region is filled with elements.
(3) No overlapping nodes exist at the same position.
(4) No node is present on sides (faces in the case of a three-dimensional element) of an element.
(5) No constricted part is present in which elements of an analytic model connect to each other at one node (on one side in the case of a three-dimensional model).
(6) A node which is not used in the constitution of an element does not exist (such a node is referred as a floating node hereinafter).

FIGS. 9A to 10H are diagrams showing inappropriate meshing without satisfying these conditions. In these drawings, white and black dots indicate nodes, $n_1$, $n_2$, . . . indicate node numbers, and $E_1$, $E_2$, . . . indicate element numbers.

FIGS. 9A to 9F illustrate examples of inadequate element meshing in two-dimensional models. These figures are inappropriate for the following reasons.

In FIG. 9A, elements $E_1$ and $E_2$ are triangular elements consisting of nodes ($n_1 n_2 n_3$) and ($n_3 n_4 n_1$), respectively, and $E_3$ is a quadrangular element consisting of nodes ($n_1 n_2 n_3 n_4$). Accordingly, the element $E_3$ overlaps the elements $E_1$ and $E_2$ (item (1) above).

In FIG. 9B, elements $E_1$, $E_2$, $E_3$, and $E_4$ are triangular elements consisting of nodes ($n_2 n_3 n_5$), ($n_3 n_4 n_5$), ($n_1 n_2 n_4$), and ($n_2 n_4 n_5$), respectively. An error occurs because the node $n_5$ which is supposed to be present at the position of the asterisk in FIG. 9B exists inside the element $E_3$. The elements $E_1$, $E_2$, and $E_4$ partially overlap the element $E_3$ (item (1) above).

In FIG. 9C, a hatched element consisting of nodes ($n_1 n_2 n_3$) is missing (item (2) above).

In FIG. 9D, elements $E_1$, $E_2$, $E_3$, and $E_4$ are triangular elements consisting of nodes ($n_1 n_2 n_5$), ($n_2 n_3 n_5$), ($n_3 n_4 n_6$), and ($n_4 n_1 n_6$), respectively. The nodes $n_5$ and $n_6$ are present at the same position (item (3) above).

FIG. 9E, elements $E_1$, $E_2$, and $E_3$ are triangular elements consisting of nodes ($n_1 n_2 n_4$), ($n_2 n_3 n_5$), and ($n_3 n_4 n_5$), respectively. The node $n_5$ exists on one edge of the element $E_1$ (item (4) above).

FIG. 9F is an element meshing diagram including two triangular elements $E_1$ and $E_2$. A constricted part is formed at a node $n_1$ (item (5) above).

FIGS. 10A to 10H illustrate examples of inadequate element meshing in three-dimensional models. The element meshing diagrams in FIGS. 10A to 10H are inappropriate for the following reasons.

In FIG. 10A, elements $E_1$ and $E_2$ are triangular prism elements consisting of nodes ($n_1 n_2 n_3 n_5 n_6 n_7$) and ($n_1 n_3 n_4 n_5 n_7 n_8$), and an element $E_3$ is a hexahedral element consisting of nodes ($n_1 n_2 n_3 n_4 n_5 n_6 n_7 n_8$). The element $E_3$ overlaps the elements $E_1$ and $E_2$ (item (1) above).

In FIG. 10B, elements $E_1$, $E_2$, $E_3$, $E_4$, and $E_5$ are tetrahedral elements consisting of nodes ($n_1 n_2 n_3 n_4$), ($n_3 n_4 n_6 n_5$), ($n_4 n_1 n_6 n_5$), ($n_1 n_3 n_6 n_5$), and ($n_1 n_3 n_4 n_5$), respectively. An error occurs since the node $n_5$ which is supposed to exist inside the tetrahedron ($n_1 n_3 n_4 n_6$) is present inside the element $E_3$. The elements $E_1$ to $E_5$ partially overlap each other (item (1) above).

FIG. 10C is an element meshing diagram including triangular prism elements $E_1$ and $E_2$ and a hexahedral element $E_3$. These elements contact each other only on one side $n_1 n_2$ to form a constricted part (item (5) above).

In FIG. 10D, elements $E_1$, $E_2$, $E_3$, and $E_4$ are tetrahedral elements consisting of nodes ($n_1 n_2 n_3 n_4$), ($n_1 n_6 n_2 n_5$), ($n_7n_5n_4n_1$), and ($n_8n_5n_2n_4$), respectively. An element consisting of nodes ($n_1n_5n_2n_4$) is missing (item (2) above).

In FIG. 10E, elements $E_1$, $E_2$, $E_3$, and $E_4$ are triangular prism elements consisting of nodes ($n_1n_2n_9n_5n_6n_{11}$), ($n_2n_3n_9n_6n_7n_{11}$), ($n_3n_4n_{10}n_7n_8n_{12}$), and ($n_4n_1n_{10}n_8n_5n_{12}$), respectively. The nodes $n_9$ and $n_{10}$ exist in the same position and the nodes $n_{11}$ and $n_{12}$ exist in the same position (item (3) above).

In FIG. 10F, elements $E_1$, $E_2$ and $E_3$ are triangular prism elements consisting of nodes ($n_1n_2n_9n_5n_6n_{10}$), ($n_2n_3n_9n_6n_7n_{10}$), and ($n_1n_3n_4n_5n_7n_8$), respectively. The nodes $n_9$ and $n_{10}$ exist on faces of the element $E_3$ (item (4) above).

In FIG. 10G, elements $E_1$ and $E_2$ are triangular prism elements consisting of nodes ($n_1n_2n_3n_4n_5n_6$) and ($n_3n_7n_6n_8n_9n_{10}$). The node $n_7$ exists on one face of the element $E_1$ (item (4) above).

FIG. 10H is an element meshing diagram, analogous to FIG. 10C, including elements $E_1$ and $E_2$. These elements contact each other only on one side $n_1n_2$ to form a constricted part (item (5) above).

Explanation of item (6) described above is omitted from these drawings.

The following five methods are commonly used as the conventional methods of detecting these fatal errors in element meshing data.

(1) Method of drawing free edges

A side used only by one element (i.e., a side, or an edge in the case of a three-dimensional element, not shared by two or more elements; which will be referred to as a free edge hereinafter) is extracted from an element meshing diagram and displayed. If there is mismatching between elements inside the element meshing diagram, a side where this mismatching occurs is displayed to show that there is an error. Accordingly, this method can find errors of items (2), (3), (4), and (5) above.

(2) Method of calculating area (volume) and barycenter

The areas (the volumes in the case of three-dimensional elements) of individual elements in an element meshing diagram are accumulated and compared with the value calculated from an analytic region. Also, the barycenter of a whole element meshing diagram is obtained from the areas (or volumes) of individual elements in the diagram and compared with the value calculated from an analytic region. This method can find errors of items (1) and (2) above.

(3) Method of extracting overlapping elements

This method extracts elements constituted by the same nodes. These extracted elements are overlapping elements. This method can find errors of item (1) above.

(4) Method of extracting floating node

This method checks whether each node is used in the constitution of an element. This method can find errors of item (6) above.

(5) Method of displaying element in reduced scale

This method reduces each element about its barycenter, displays the reduced elements, and checks errors of all elements in the displayed meshing diagram. This method can find all errors described above.

Of these five methods, the method (1) is generally used most frequently because the effect is largest and the processing is simple. The algorithm of the method (1) will be described in detail below.

FIG. 11 is a flow chart for explaining the algorithm of the method (1) for two-dimensional models. In FIG. 11, reference symbols R1 to R6 denote processes, and arrows in an opposite direction to the processing flow indicate repetition. Symbols $E_n$, $l_i$, and $l_j$ beside these arrows indicate the repeating numbers. $E_n$ is the total number of elements in an element meshing diagram, $l_i$ is the total number of sides constituting an element number $E_i$, and $l_j$ is the total number of sides constituting an element number $E_j$ (these symbols have the respective same meanings throughout the remainder of this specification).

A process of extracting and displaying a free edge is as follows.

(1) In process R1, the element $E_i$ to be checked is set. In process R2, a side to be checked is set.

(2) In process R3, the element $E_j$ to be compared is set. In process R4, a side to be compared is set ($E_i \neq E_j$).

(3) In process R5, the node numbers at the two ends of the sides are compared to check whether these sides are the same. If the sides are the same, the repetition of processes R3, R4, and R5 is terminated, and the flow returns to process R1 to set a new side to be checked.

(4) If there is no same side, it is determined that this side is a free edge, and a diagram is displayed in process R6.

(5) The manipulations in processes R1 to R6 described in items (1) to (4) above are repeated for all elements.

In the case of three-dimensional models, the same processing is performed by replacing sides in this processing with edges of elements.

When the number of sides (edges) constituting one element is fixed at $l_n$, the total repeating number for performing this processing is represented by the following expression:

$$(E_n \times l_n)^2/2 \tag{1}$$

If a meshing diagram consists of identical shape elements, the total repeating numbers of triangular and quadrangular elements in two-dimensional models and of tetrahedral, pentahedral, and hexahedral elements in three-dimensional models are calculated from expression (1) as shown in the column "conventional method (1)" in FIG. 12.

Unfortunately, the following problems arise when these conventional element meshing data error detection methods explained above are executed to find errors in element meshing data.

In the method (1), it is necessary to finally output free edges to a graphic terminal or a plotter to allow an analyst to visually check and judge the result. For this purpose a display device is necessary. Also, the judgment of an analyst may lead to overlook. Especially when a very small portion is present in large-scale element meshing data or analytic region, the size of a side is relatively small compared to the size of the analytic region. Consequently, it is very difficult to reliably detect these sides. Additionally, it takes a long time to make general users who do not know the finite element method very well understand the meaning of the processing.

In the method (2), if an area (volume) or the position of a barycenter is wrong, this means some elements comprise errors but an element having an error cannot be specified. Consequently, a long time and much labor are required to find an element with the error. The method (2) also has a fatal drawback to be described later.

In the method (5), all elements must be checked and this requires a long time and much labor. Additionally, an element meshing diagram in which elements are reduced is basically, graphically displayed on a two-dimensional plane. Therefore, this method is difficult to apply to three-dimensional models.

Moreover, to perform a complete check, it is basically necessary to execute all of these five methods described above, and this requires a long calculation time and a long work time. Also, errors cannot be found in some cases only by executing the five methods. This will be briefly described below.

Generally, when a quadrangular (hexahedral) element contains triangular (triangular prism) elements as illustrated in FIG. 9A or 10A, only the methods (2) and (5) are effective among other methods. In the method (2), a problem arises if the areas (volumes) of the elements $E_1$ to $E_3$ are much smaller than the largest element. That is, the volumes or weights of these elements are sometimes canceled in a computer during the course of accumulating the areas (volumes) or weights of the individual elements, and this makes error detection impossible. This is the fatal drawback of the method (2). On the other hand, the method (5) cannot perform check if the number of elements is very large or cannot perform a three-dimensional check. This applies to the errors in FIGS. 9B and 10B.

In the method (1), the locations of errors can be readily known in two-dimensional models because free edges are in a one-to-one correspondence with the outlines of the analytic models. In three-dimensional models, however, the outlines are not necessarily represented by free edges. This often gives rise to confusion during the course of finding the locations of errors. This will be described below with reference to FIG. 13.

In FIG. 13, elements $E_1$ and $E_2$ are triangular prism elements consisting of nodes ($n_1 n_2 n_3 n_5 n_6 n_7$) and ($n_1 n_3 n_4 n_5 n_7 n_8$), respectively, and the broken line, i.e., a line constituted by nodes $n_1$ and $n_5$ is an outline. No problem arises if an outline is formed only by a single element. However, if an outline is shared by two elements as in this case, this outline is not displayed to result in confusion. Especially in predictive meshing diagrams in which outlines are in many instances not displayed for the reason above, the locations of errors of elements cannot be found even if these errors are displayed.

(II) Second, in displaying finite element meshing models, contours of the finite element meshing models are extracted and displayed in many cases. Contours indicate edges in the case of three-dimensional finite element models and, more specifically, are constituted by sides (boundaries between faces constituting elements) of elements. Contours are thus extracted and displayed because displaying all finite elements is time-consuming. In a three-dimensional model consisting of n elements, the number of contours is the triple root of n if it is calculated simply. This means that the display time can be greatly shortened, and this is particularly effective in display in the stage of trial and error for determining a visual point. Also, a number of diagrams must be displayed within short time periods in animation display of time-series analytical results, and one conventional method made this performable within a short time by the use of contours (Japanese Patent Laid-Open No. 4-346178).

Contours are also used to find mismatching between elements contained in an element meshing model, e.g., missing of an element (a meshing model is not completely filled with elements), a floating node (a node existing on a side of an element), and overlapping of nodes (two or more nodes are present at the same point). These findings are done by displaying contours, more specifically, by finding a contour present inside an element meshing model. That is, contours are supposed to be displayed only on the edges of a meshing model. Therefore, if a contour exists inside a meshing model, this means that there is mismatching between elements in that portion.

Conventionally, contours are substituted by sides (free edges) not shared by a plurality of elements. More specifically, contours are extracted by removing sides shared by two or more elements from all sides constituting all elements.

The conventional method of extracting contours (free edges) will be described below with reference to the flow chart in FIG. 21.

In step S801, an element (Ei) as an object to be checked is set. In step S802, one side of the element is set. In step S803, it is checked whether an element, except for Ei, having the same side as the set side is present. The same side means a side having the same node numbers at its two ends as those of the set side. In step S804, whether the set side is a free edge is checked. If it is determined in step S803 that an element having the same side is present, this side is not a free edge. If there is no element having the same side, this side is a free edge. If the set side is a free edge, the side is registered in a memory in step S805. If the set side is not a free edge, the flow advances to step S806 to proceed on to the next processing.

To perform the above processing for all sides of the element Ei, whether all sides are completely checked is checked in step S806. If NO in step S806, the flow returns to step S802 to set the next side. If YES is determined in step S807, the flow returns to step S801 to perform all these processing steps for all elements. When all elements are completely checked, in step S808 the registered free edges (contours) are displayed on a graphic display.

In this processing, the loop from step S806 to step S802 is repeated the same number of times as the number of sides constituting the element Ei. FIG. 22 shows the numbers of sides of principal three-dimensional elements.

In the processing shown in the flow chart of FIG. 21, the free edge determination in step S803 can be performed within a nearly fixed period of time, independently of the number of elements of a model, by checking only sides having the same sum of node numbers at their two ends as that of the set side. This is described in Japanese Patent Laid-Open No. 4-346178.

The flow chart in FIG. 21 shows that the time required for free edge extraction in this conventional method is directly proportional to the following expression:

$$\sum_{i=1}^{elem} L_i \qquad (2)$$

where Li is the number of sides of an element Ei and elem is the number of elements.

The procedure of extracting free edges will be described in more detail below with reference to FIG. 21 by using a meshing model shown in FIG. 23.

FIG. 23 is a meshing diagram consisting of four triangular prism elements, in which reference symbols E1 to E4 denote element numbers. Black dots indicate nodes, and the numbers described near these nodes are node numbers. The elements E1 to E4 consist of the following nodes.

E1: $n_1$–$n_3$–$n_4$–$n_5$–$n_7$–$n_8$
E2: $n_1$–$n_2$–$n_3$–$n_5$–$n_6$–$n_7$
E3: $n_5$–$n_7$–$n_8$–$n_9$–$n_{11}$–$n_{12}$
E4: $n_5$–$n_6$–$n_7$–$n_9$–$n_{10}$–$n_{11}$

From this meshing model, free edges are extracted by the following procedure.

(1) An element E1 is set (step S801).
(2) A side $n_1$–$n_3$ of the element E1 is set (step S802).
(3) Whether there is an element having the side $n_1$–$n_3$ is checked (step S803). Since an element E2 has a side consisting of the same nodes, it is determined that the side $n_1$–$n_3$ is not a free edge (step S804).

(4) Since the side $n_1$–$n_3$ is not a free edge, the flow returns from step S806 to step S802, and a new side $n_3$–$n_4$ is set (step S802).

(5) Free edge check is similarly performed for the side $n_3$–$n_4$ (step S803). Since no element having the same side as this is found, it is determined that this side is a free edge (step S804).

(6) The side $n_3$–$n_4$ is registered as a free edge (step S805).

(7) The manipulations (2) to (6) are repetitively executed for all of the remaining sides of the element E1. Consequently, sides $n_4$–$n_1$ and $n_4$–$n_8$ are additionally registered as free edges.

(8) The above operation is performed for the elements E2 to E4 by the loop returning from step S807 to step S801. As a result, nine sides ($n_1$–$n_2$, $n_2$–$n_3$, $n_2$–$n_6$, $n_8$–$n_{12}$, $n_6$–$n_{10}$, $n_{11}$–$n_{12}$, $n_{12}$–$n_9$, $n_9$–$n_{10}$, $n_{10}$–$n_{11}$) are additionally registered as free edges.

FIG. 24 is a diagram formed by drawing the free edges extracted by the above operation (step S808). In FIG. 24, lines indicated by the broken lines, as hidden lines, in FIG. 23, are left indicated by the broken lines. A line connecting the nodes $n_1$–$n_9$ and $n_3$–$n_{11}$ is not displayed even though the line is an edge of the model, but this is not an error but the characteristic feature of a free edge (i.e., a side not shared by a plurality of elements).

In this operation shown in FIG. 21, the loop from step S807 to step S801 is repeated four times, and the loop from step S806 to step S802 is repeated nine times. Therefore, these loops are repeated a total of 36 times (in expression (2), Li is always 9 and the number of elements is 4).

Although the operation for three-dimensional models is described above, contours are similarly effective for two-dimensional finite element models and can be used to increase the display speed and find mismatching between segments. In two-dimensional models, contours indicate boundaries between analytic models (analytic regions). As in the case of three-dimensional models, contours correspond to free edges (sides not shared by a plurality of elements). In three-dimensional models, as illustrated in FIG. 24, there are sides not extracted as free edges although the sides are contours. In two-dimensional models, on the other hand, contours completely agree with free edges. Free edges in two-dimensional models can be extracted following the same procedure as for three-dimensional models shown in the flow chart of FIG. 21.

FIGS. 25A and 25B illustrate an example of extraction of free edges in two-dimensional element meshing models. FIG. 25A shows an element meshing model. This model consists of four quadrangular elements E1 to E4, and the constituent nodes of these elements are as follows.

E1: $n_1$–$n_8$–$n_6$–$n_2$
E2: $n_2$–$n_6$–$n_7$–$n_3$
E3: $n_4$–$n_7$–$n_9$–$n_5$
E4: $n_6$–$n_8$–$n_9$–$n_7$

Assume that in this model, nodes $n_3$ and $n_4$ are supposed to be the same node and an element is missing in a triangular region $n_3$–$n_4$–$n_7$ indicated by a hatched region by a data formation error. FIG. 25B shows displayed free edges of this meshing diagram. A contour connecting nodes $n_3$–$n_4$–$n_7$ is extracted and thereby mismatching in the element meshing model can be extracted.

In the above description, it is assumed that all elements are objects to be displayed. However, only some elements can be displayed depending on the type of model. That is, if each element has an attribute (e.g., material properties), contours can be extracted by using only elements having some attributes (this applies to the remainder of this specification).

In the above conventional contour extraction method using free edges, however, in the case of three-dimensional models it is in some instances impossible to find mismatching in element meshing contained in an analytic model. This will be described below by using an element meshing model shown in FIG. 26.

FIG. 26 is a meshing diagram consisting of four triangular prism elements, in which reference symbols E1 to E4 denote element numbers. Black dots and the numbers described near these black dots have the same meanings as in FIG. 23. The elements E1 to E4 are triangular prism elements consisting of the following nodes.

E1: $n_1$–$n_2$–$n_4$–$n_5$–$n_6$–$n_8$
E2: $n_2$–$n_3$–$n_4$–$n_6$–$n_7$–$n_8$
E3: $n_5$–$n_7$–$n_8$–$n_9$–$n_{11}$–$n_{12}$
E4: $n_5$–$n_6$–$n_7$–$n_9$–$n_{10}$–$n_{11}$

In this element meshing model, element meshing is mismatched in a face containing nodes $n_5$–$n_6$–$n_7$–$n_8$. That is, the elements E1 and E2 are meshed by a line connecting nodes $n_6$–$n_8$, but the elements E3 and E4 are meshed by a line connecting nodes $n_5$–$n_7$. Consequently, faces of the elements are discontinuous on a face $n_5$–$n_6$–$n_7$–$n_8$.

FIG. 27 shows free edges extracted and displayed from the above element meshing model by the conventional method. In FIG. 27, twelve free edges are extracted and displayed. However, all of the free edges displayed in FIG. 27 can be called contours (edges of the meshing model). Accordingly, it is impossible to find mismatching in the meshing model from this free edge diagram. Generally, the conventional method using free edges can find, in the case of a three-dimensional model, missing of elements, floating nodes, and overlapping nodes in the meshing model. However, this conventional method cannot find the discontinuity of faces of elements as described above.

On the other hand, even in two-dimensional models, it is sometimes not possible to find mismatching between elements. As an example, in FIG. 25A, if the element E2 is very small compared to the whole analytic region, particularly if the nodes $n_3$, $n_4$, and $n_7$ are very close to each other, a depression formed by the nodes $n_3$, $n_4$, and $n_7$ of the free edges shown in FIG. 25B becomes very small. As a consequence, this depression can be overlooked in some instances.

(III) Third, in displaying the external shape of a three-dimensional finite element meshing model, the surfaces of the model are often extracted. This is because displaying all elements is time-consuming. That is, the processing time is shortened by displaying only the surfaces of a three-dimensional model by hidden face processing, instead of displaying the whole model as a solid. Generally, the surfaces of a finite element model are the same as faces (to be referred to as free faces hereinafter) not shared by a plurality of elements. Accordingly, the surfaces are extracted by extracting these free faces.

Also, contours of models are often displayed as in the case of display of surfaces. Contours are edges on the surfaces of a model and, more specifically, constituted by sides (boundaries between faces constituting elements) of elements. This is a more simplified display form than the surface display. In a three-dimensional model consisting of n elements, the number of surfaces is the square root of n and the number of contours is the triple root of n if the calculations are done simply. Contours are commonly substituted by sides (free edges) not shared by a plurality of elements.

The characteristic feature of these simplified display methods is to be able to perform display within short time periods. Accordingly, the methods are effective in display in the stage of trial and error for determining a visual point. Also, a number of diagrams must be displayed within short time periods in animation display of time series analytical results, and one conventional method made this performable within a short time by the use of surfaces and contours as described above (Japanese Patent Laid-Open No. b 4-346178).

Contours are also used to find mismatching between elements contained in an element meshing model, e.g., missing of an element (a meshing model is not completely filled with elements), a floating node (a node existing on a side of an element), and overlapping of nodes (two or more nodes are present at the same point). These findings are done by displaying contours to check whether there is a contour present inside a model. That is, contours are supposed to be displayed only on the surfaces of a meshing model, and a contour is formed inside a meshing model due to any of these mismatchings.

As described above, free faces consist of faces of elements, free edges consist of sides of elements, and these faces and sides can be considered as parts constituting elements. Accordingly, these parts will be collectively referred to as segments hereinafter.

Segments such as free faces and free edges can be extracted by removing segments not shared by a plurality of elements. Various algorithms have been proposed as this method of removing shared segments at a high speed. These algorithms will be described below.

The first method is to mesh and group a meshing model into several regions. That is, one rectangular parallelpiped region containing a model is assumed and meshed into several partial regions, and elements inside each partial region and on the boundaries of the region are grouped. To check whether each segment is shared, only segments of elements in the same region (the same group) are checked. This method is effective when elements are uniformly distributed over a region, but the effect is insignificant if elements are concentrated into one portion. Therefore, the method is generally not used frequently.

The second method is an improvement of reducing the time required for one check. This method is described as a method of extracting free faces at a high speed in "Nakada et al.: Improvements in Three-Dimensional Meshing Diagram Formation Algorithm, Japan Simulation Society Ninth Simulation Technology Conference, pp. 61–64 (1990)". That is, this method uses the maximum value of node numbers constituting each segment as an index of the segment and immediately determines that segments are not the same if the indices of these segments disagree. Unfortunately, this method is not frequently used either because the method is not related to the improvement of decreasing the number of checks.

The third method uses the sum of nodes constituting each segment as an index of the segment and, in checking segments, checks only segments having the same index. The algorithm of this method is described as a method of extracting free faces and free edges in Japanese Patent Laid-Open No. 4-346178. This method is being extensively used since programming is easy and the effect is independent of the state of meshing.

FIG. 48 shows a flow chart of this method. A procedure of extracting segments not shared by a plurality of elements will be described below with reference to FIG. 48.

Prior to extracting segments not shared by a plurality of elements, a segment list and an index table are formed (steps B701 and B702). The segment list and the index table will be described next.

The segment list is a list registering all segments and consists of two items, "list number" and "segment node string", as illustrated in FIG. 49A. The list numbers are consecutive integral values starting from 1 and are addresses indicating the row numbers in this list. The segment node string is formed by arranging the numbers of nodes constituting each segment. Accordingly, the segment list in FIG. 29A registers segments of each element independently of those of other elements. Consequently, the number of rows in this list is given by expression (3) below:

$$\sum_{i=1}^{elem} S_i \tag{3}$$

where Si is the number of segments constituting the ith element and elem is the number of elements.

The index table consists of "index value" and "list number string" shown in FIG. 49B. The index values correspond to the index numbers of segments and are consecutive integral values starting from 1. These index values are addresses representing the row numbers in this table. The list number strings indicate the list numbers in the segment list. It is necessary to provide the same number of list number strings as the number of segments having the same index value. If the index value of a segment is known, the locations (addresses) in the segment list of segments having this index value can be known by using this table. In this table, it is necessary to provide the same number of rows as the number of possible index values. The maximum value of the sums of node numbers constituting segments is given by expression (4) below:

$$\sum_{i=0}^{m-1} (N-i) \tag{4}$$

where N is the number of nodes of a model and m is the number of nodes constituting one segment.

To extract segments, the segment list is formed in step B701 in FIG. 48. This is done by sequentially registering segments of individual elements in the segment list. In step B702, the index values of the individual segments in the segment list formed in step B701 are obtained, and the list numbers in the segment list are registered in the rows of the corresponding index values in the index table. The formation of the segment list and the index table is thus completed.

Segments not shared by a plurality of elements are extracted by removing segments consisting of the same nodes from the list number strings in the index table formed. Steps B703 to B706 indicate a process of removing segments consisting of the same nodes.

In step B703, an index value (k) as a removable object is set. The number of segments registered in the kth row in the index table is checked. If the number is 1 or less, it is determined that this segment is not shared by a plurality of elements, and the flow advances to step B706. If two or more segments having the same index value exist, identical segments (segments consisting of the combination of the same nodes) in the segments in the kth row are removed from the index table in step B705. As described above, nodes constituting each segment can be obtained by referring to the list number in the segment list which corresponds to the list number string. The processing is step B705 is done by comparing the node numbers thus obtained.

In step B706, whether this operation is performed for all index values is checked. If all index values are not completely checked, the flow returns to step B703 to start checking the next index value. If all index values are completely checked, the processing of removing segments shared by a plurality of elements is completed. The segments remaining in the index table at that time are segments not shared by a plurality of elements.

Details of the above operation will be described below by taking extraction of free faces from an element meshing model as an example.

FIG. 50 is a meshing model consisting of two three-dimensional models. In FIG. 50, black dots indicate nodes and the numbers near these nodes indicate node numbers (this holds for the remainder of this specification). Elements E1 and E2 are tetrahedral elements consisting of nodes $n_1$–$n_2$–$n_3$–$n_4$ and $n_3$–$n_1$–$n_4$–$n_5$, respectively. The element E1 consists of four faces $n_1$–$n_2$–$n_3$, $n_1$–$n_4$–$n_2$, $n_2$–$n_4$–$n_3$, and $n_3$–$n_4$–$n_1$. The element E2 consists of four faces $n_3$–$n_1$–$n_4$, $n_3$–$n_5$–$n_1$, $n_1$–$n_5$–$n_4$, and $n_4$–$n_5$–$n_3$.

The process of extracting free faces from this meshing model will be described below with reference to the flow chart in FIG. 48.

(1) In step B701, the constituent nodes of the faces of the element E1 are sequentially registered in the list shown in FIG. 49A. This manipulation is also performed for the faces of the element E2, thereby obtaining a segment list (face list) shown in FIG. 51A.

(2) In step B702, the index value (the sum of the numbers of the nodes constituting a face) of each face in the face list obtained in the above step is calculated, and the list numbers in the face list are registered in the rows of the respective corresponding index values in the index table. An index table shown in FIG. 51B is obtained by registering all faces.

(3) In steps B703, B704, and B705, list numbers indicating overlapping faces (consisting of the same node numbers) are removed from the index table. This is done by removing faces (in the same row of the index table) having the same value and consisting of the combination of the same nodes. In this example, nothing is performed for index values, except index values 8 and 9, because the number of the registered faces is 1 or less in these index values. In each of the index values 8 and 9, however, two faces are registered. Therefore, the node numbers of these two faces are checked (by referring to the list numbers 4 and 5 or 3 and 6), thereby checking whether the two faces are the same. Since both of the two faces of the index value 8 consist of nodes 1, 3, and 4, it is determined that these two faces are the same, and the list numbers 4 and 5 are removed from the index table.

The faces (of list numbers 1, 2, 3, 6, 7, and 8) remaining in the index table after the above processing are free faces.

Extraction of free edges from element meshing models can be accomplished only by replacing faces, in the free face extraction process described above, with sides. The process of extracting free edges from the meshing model in FIG. 50 will be described next.

(1) In step B701 in FIG. 48, the constituent nodes of the sides of the element E1 are sequentially registered in the list shown in FIG. 49A. This manipulation is also performed for the sides of the element E2, thereby forming a segment list (side list) shown in FIG. 52A.

(2) In step B702, the index value (the sum of the numbers of the nodes constituting a side) of each side in this list is calculated, and the list numbers in the side list are registered in the corresponding rows of the index table. An index table in FIG. 52B is obtained by registering all sides.

(3) In steps B703, B704, and B705, list numbers indicating the same side are removed from this index table. In this example, nothing is done for index values 3, 8, and 9 because the number of registered sides is 1 or less in these index values. Since two or more sides are registered in each of index values 4, 5, 6, and 7, the node numbers of sides are checked in each index number to check whether overlapping sides are present. Consequently, it is determined that two sides in each of the index values 4 and 7 and two sides (list numbers 6 and 8) in the index value 5 are the same, and so these list numbers are removed from the index table.

The sides (of list numbers 1, 2, 4, 10, 12, and 11) remaining in the index table after the above processing are free edges.

FIG. 53 is a diagram formed by drawing the free edges thus extracted. In FIG. 53, the broken line indicates a segment indicated by the broken line in FIG. 50.

It is often necessary to know an element inside which a point present in an element meshing model is positioned. This is necessary when the field at that point is to be calculated, and the field at the point can be readily calculated by extracting an element containing the point and analyzing the element.

Conventionally, the extraction of an element including such a point is done by checking whether an element includes the point, and this check is performed for all elements. In the worst case, the check must be performed the number of times corresponding to the number of elements. In the case of a meshing model consisting of n elements, the average number of checks is n2.

Unfortunately, the segment list and the index table used in the conventional method have the drawback that the way these list and table store data is wasteful and in this way they waste memories. This drawback will be described below.

The segment list requires the same number of memories as the number of nodes constituting a segment for each segment. In the case of the face list shown in FIG. 51A, for example, three integral values (node numbers) must be registered for one segment. Accordingly, if the number of nodes constituting a segment is large, a large quantity of memories are required. Also, it is generally necessary to prepare identical number of memories for individual segments for the sake of convenience of a computer. The result is that memories are wastefully used for a segment constituted by a smaller number of nodes than the maximum number of nodes.

In the index table, on the other hand, it is always necessary to prepare larger memories for all index values since the number of segments to be registered for each index value is unknown. In the index table shown in FIG. 51B, for example, memories are so prepared as to be able to register five list numbers for each index value. In effect, however, only a maximum of two (index values 8 and 9) are used. Also, as can be seen from FIG. 51B, the number of segments registered in an index value differs from one index value to another. However, as in the case of segments, it is necessary to prepare identical number of memories for all index values. Consequently, memories are wastefully used for an index value having few segments.

As described above, the conventional method wastes memories. As a consequence, a large amount of memories are required for large-scale models (models having a large number of elements), and so computers incorporating only a small amount of memories cannot process such models.

Assuming, for example, that free faces are extracted from a meshing model consisting of 1,000,000 hexahedral elements and 1,000,000 nodes, memories used by the conventional segment list and index table in this case will be calculated and described in detail below.

First, memories required by the face list are calculated. Since faces constituting each element are quadrangles, segment information requires memories corresponding to four integers (16 bytes if 4 bytes are necessary for each integer; this holds for the remainder) per segment. The number of rows in the list is 6,000,000 from expression (3) because one element consists of six faces. Accordingly, 96M (16×6,000,000) bytes of memories are required for the segment list.

Memories necessary for the index table are calculated next. The present inventors experientially know that the maximum number of segments having the same index value is usually 8 to 10 in one meshing model. Therefore, if this table is allowed to register up to 10 segments (faces) having the same index value, 40 bytes (4 bytes×10) of memories are used per index value. The number of rows in the table is approximately 4,000,000 (accurately (4,000,000−3)). Accordingly, approximately 160 Mbytes (40×4,000,000) of memories are required for the index table.

As a result, a total of 256 Mbytes (96M+160M) of memories are necessary for this meshing model. This memory capacity is large even for present computers, and so general computers cannot process this model.

Also, the conventional index table can no longer perform processing if the number of segments having the same index value exceeds a limiting range. For example, the index table shown in FIG. 51B becomes unable if the number of segments having the same index value is 6 or more. This conflicts with the above explanation that the maximum number of segments having the same index value is 8 to 10. However, the case explained above is merely a general case and based on the fact that 10 or more segments are possible.

The conventional method of displaying free edges in place of contours also has the drawback that a line which is supposed to be displayed as a contour is not displayed. As an example, in the contours illustrated in FIG. 53, lines consisting of nodes $n_1$–$n_4$, $n_4$–$n_3$, and $n_3$–$n_1$ are not displayed even though these lines should be displayed because they are the edges of the model.

Moreover, in the conventional method of extracting an element including a point, it is necessary to check whether an element includes a point for all elements. Accordingly, if a large number of points exist, a long time is required for the extraction.

SUMMARY OF THE INVENTION

As described above, the conventional method of item (1) above has the drawback that it is difficult to reliably detect errors in element meshing data even by paying close attention and using much labor to perform the error detection.

The present invention has been made in consideration of the above problem and has as its object to easily find and classify errors in element meshing data and automatically correct some errors.

To achieve the above object, the present invention checks the following three items for all nodes.

(1) The number of elements sharing boundaries between elements (to be referred to as surrounding elements hereinafter) which surround a node.

(2) The total sum of the angles of the surrounding elements around the node.

(3) If boundary faces each consisting of only one element (these faces will be called free faces hereinafter) are extracted from the boundaries between the surrounding elements, whether all these free faces connect to each other through sides (only in the case of a three-dimensional model).

Also, a maximum angle $\phi_{max}$ and a minimum angle $\phi_{min}$ of the external shape of an analytic model are used as input data for the check.

Of the above three items, the position of each node in an analytic model is known by items (1) and (2). If the results in the two methods are conflicting, it is determined that there is an error in a part of an element constituted by this node. Also, an error in the external shape of a three-dimensional model is found by item (3). If an outline having an angle outside the range of the maximum angle $\phi_{max}$ and the minimum angle $\phi_{min}$ of the external shape of an analytic model is found when these angles are used as input data, this portion is regarded as an error. That is, the standards of error determination can be changed in accordance with the type of an alytic model.

Also, the present invention has been made to solve the problem of item (2) above and has as its object to provide a method and apparatus for extracting contours and vertices from finite element meshing models, which can readily find the discontinuity (including very small errors in a two-dimensional model) of faces of elements in a three-dimensional model and mismatching between the elements.

To achieve the above object, a method of extracting a contour from a finite element meshing model according to the present invention comprises the steps of extracting a free face not shared by a plurality of elements from a three-dimensional finite element meshing model, and extracting a contour by using data of the extracted free face.

A method of extracting a contour and a vertex from a finite element meshing model according to the present invention comprises the steps of extracting a free face not shared by a plurality of elements from a three-dimensional finite element meshing model, extracting a contour by using data of the extracted free face, and extracting a vertex by using data of the extracted contour.

In the free face extraction step, a free face is extracted from an element by checking, for all faces of the element, whether a face of the element is shared by another element, in the contour extraction step, whether two faces having one side of an element as sides thereof are extracted as free faces is checked, and, if both of the two faces are extracted as free faces, it is determined that the side is a contour, and in the vertex extraction step, whether a side having one node of each element as an end point thereof is extracted as a contour is checked, and, if all of the sides are extracted as contours, it is determined that the node is a vertex.

In the contour extraction step, if the number of free faces extracted from one element is not more than 1, it is determined that all sides of the element are not contours. In the vertex extraction step, if the number of contours extracted from one element is 2 or less, it is determined that all nodes of the element are not vertices.

The method further comprises the step of extracting overlapping contours, nodes at two ends of which have the respective same node numbers, from the extracted contours, and using the overlapping of the contours in checking mismatching between elements in the element meshing model. The method further comprises the step of checking a meshing model by displaying vertices in a diagram which displays contours or free edges of the model.

A method of extracting a vertex from a finite element meshing model according to the present invention comprises the steps of extracting a free edge from a two-dimensional finite element meshing model, and obtaining a vertex from data of the extracted free edge.

In the free edge extraction step, a free edge of one element is extracted by checking, for all sides of the element, whether a side of the element is shared by another element, and in the vertex extraction step, whether two sides having one node of each element as end points thereof are free edges is checked, and, if both of the two sides are free edges, it is determined that the node is a vertex. In the vertex extraction step, if the number of free edges extracted from one element is 1 or less, it is determined that all nodes of the element are not vertices. The method further comprises the step of checking a meshing model by displaying vertices in a diagram which displays contours or free edges of the model.

An apparatus for extracting a contour from a finite element meshing model according to the present invention comprises free face extracting means for extracting a free face from an element by checking, for all faces of the element, whether a face of the element is shared by another element, first contour determining means for determining that all sides of an element are not contours, if the number of free faces extracted from the element is 1 or more, and second contour determining means for checking, if the number of free faces extracted from one element is 2 or more, whether two faces having one side of the element as sides thereof are extracted as free faces, and, if both of the two faces are extracted as free faces, determining that the side is a contour. The apparatus further comprises mismatching checking means for extracting overlapping contours, nodes at two ends of which have the respective same node numbers, from the extracted contours, and checking mismatching between elements in the element meshing model on the basis of the overlapping of the contours.

An apparatus for extracting a contour and a vertex from a finite element meshing model according to the present invention comprises free face extracting means for extracting a free face from an element by checking, for all faces of the element, whether a face of the element is shared by another element, first contour determining means for determining that all sides of an element are not contours, if the number of free faces extracted from the element is 1 or less, second contour determining means for checking, if the number of free faces extracted from one element is 2 or more, whether two faces having one side of the element as sides thereof are extracted as free faces, and, if both of the two faces are extracted as free faces, determining that the side is a contour, first vertex determining means for determining that all nodes of an element are not vertices, if the number of contours extracted from the element is 2 or less, and second vertex determining means for checking, if the number of contours extracted from one element is 3 or more, whether a side having one node of the element as an end point thereof is extracted as a contour, and, if all the sides are extracted as contours, determining that the node is a vertex. The apparatus further comprises meshing model checking means for checking a meshing model by displaying vertices in a diagram which displays contours or free edges of the model.

An apparatus for extracting a vertex from a finite element meshing model according to the present invention comprises free edge extracting means for extracting a free edge from an element by checking, for all faces of the element, whether a face of the element is shared by another element, first vertex determining means for determining that all nodes of an element are not vertices, if the number of free edges extracted from the element is 1 or less, and second vertex determining means for checking, if the number of free edges extracted from one element is 2 or more, whether two sides having one node of the element as end points thereof are extracted as free edges, and, if both of the two edges are extracted as free edges, determining that the node is a vertex. The apparatus further comprises meshing model checking means for checking a meshing model by displaying vertices in a diagram which displays contours or free edges of the model.

In the above arrangements, attention is focused on information of surfaces (free faces) of an element meshing model. If faces adjacent to each other in one element are free faces, both of the two faces are necessarily contours of the analytic model. Accordingly, contours are obtained even for a portion in which faces of elements are discontinuous. Also, in the present invention, vertices are supposed to be positioned at corners of contours. Therefore, if a vertex is positioned in some other portion, this indicates that there is mismatching between elements in this portion of the vertex.

The present invention also has been made to solve the problem of item (3) above and has as its object to provide a method and apparatus for extracting sides, faces, and elements from finite element meshing models, which can extract segments from large-scale meshing models even by using computers incorporating only a small amount of memories, which can faithfully display contours, and which can extract an element including an arbitrary point in a model at a high speed.

To achieve the above object, a method of extracting a side, a face, or an element from finite element meshing data according to the present invention, in which if elements and nodes constituting the elements are so stored as to correspond to each other, one side, face, or element is regarded as one segment, and the segment is extracted from a finite element meshing model, comprising the steps of assigning to each segment an index value characterizing a combination of nodes constituting the segment, forming a segment list in which pieces of information of segments having the same index value are consecutively arranged and an index table showing a relationship between the index values and positions in the segment list, and extracting segments having the same index value on the basis of the segment list and the index table, thereby obtaining information of nodes constituting the extracted segments.

The information stored in the segment list is expressed by a first identifier which specifies an element having each segment and a second identifier which indicates the ordinal number of the segment in the element. The segments stored in the segment list are arranged in decreasing or increasing order of index value. The first identifier is multiplied by a predetermined integral value equal to or larger than the number of segments constituting one element, and the second identifier is added to the product, thereby storing the first and the second identifiers as one integral value. The information of each index value in the index table is expressed by the number of segments corresponding to the index value and a pointer indicating a first position in the segment list from which the segments are stored. The pointer is multiplied by an integral value equal to or larger than 10, and the number of segments is added to the product, thereby storing the number and the pointer as one integral value.

The method further comprises the step of extracting a plurality of elements, as adjacent elements, constituted by segments consisting of the same nodes among other extracted segments. The method further comprises the step of removing segments consisting of the same nodes from the segment list, thereby allowing only segments not overlapping each other to remain in the segment list.

A method of extracting an element including a point $P_e$ in a finite element meshing model according to the present invention comprises the steps of obtaining, starting from a known point $P_0$ included in a given element $E_0$, a face $F_0$ of the element $E_0$ which intersects a line segment connecting two points $P_e$ and $P_0$, obtaining an element $E_1$ adjacent to the element $E_0$ through the face $F_0$ as a boundary, obtaining a face $F_1$, other than the face $F_0$, of the element $E_1$, which intersects the line segment connecting the points $P_e$ and $P_0$, repeating processing of obtaining an element $E_2$ adjacent to the element $E_1$ through the face $F_1$, and extracting an element including the point $P_e$ by tracing the adjacent elements.

A method of extracting a side from a finite element meshing model according to the present invention comprises the steps of extracting free faces from a three-dimensional finite element model, regarding the free faces as shell-like, two-dimensional elements and extracting adjacent two-dimensional elements, calculating an angle $\theta$ formed by the adjacent two-dimensional elements, and extracting a boundary between the two two-dimensional elements as a contour if a value of the angle $\theta$ satisfies $0 \leq \theta < (\pi - \partial)$ or $(\pi + \partial) < \theta < 2\pi$ where $\partial$ is a tolerance. The method further comprises the step of adding a three-dimensional meshing model consisting of shell-like, two-dimensional elements to the extracted free faces and extracting adjacent two-dimensional elements, wherein a boundary between the two two-dimensional elements is extracted as a contour if a value of the angle $\theta$ satisfies $\partial \leq \theta < (\pi - \partial)$ or $(\pi + \partial) < \theta < 2\pi - \partial$ where $\partial$ is a tolerance.

An apparatus for extracting a side, a face, or an element from finite element meshing data according to the present invention comprises means for storing elements and nodes constituting the elements so that the elements and the nodes correspond to each other, means for regarding one side, face, or element as one segment and assigning to each segment an index value characterizing a combination of nodes constituting the segment, means for forming a segment list in which pieces of information of segments having the same index value are consecutively arranged and an index table showing a relationship between the index values and positions in the segment list, and means for extracting segments having the same index value on the basis of the segment list and the index table and obtaining information of nodes constituting the extracted segments on the basis of a correspondence between each element and the nodes constituting the element.

The information stored in the segment list is expressed by a first identifier which specifies an element having each segment and a second identifier which indicates the ordinal number of the segment in the element. The segments stored in the segment list are arranged in decreasing or increasing order of index value. The first identifier is multiplied by a predetermined integral value equal to or larger than the number of segments constituting one element, and the second identifier is added to the product, thereby storing the first and the second identifiers as one integral value. The information of each index value in the index table is expressed by the number of segments corresponding to the index value and a pointer indicating a first position in the segment list from which the segments are stored. The pointer is multiplied by an integral value equal to or larger than 10, and the number of segments is added to the product, thereby storing the number and the pointer as one integral value.

In the above arrangements, in the segment list, each segment is expressed by two items, the element number and the local segment number, regardless of the number of constituting nodes. Also, the index table is expressed by two items, the number of corresponding segments and the first list number, regardless of the number of segments having the same index value. As a result, in the segment list and the index table only two integers of memories are consumed per segment and per index value, respectively. This makes effective use of memories feasible. Additionally, since contours are extracted as edges between free faces, all contours are extracted without any omission. Furthermore, an element including a point is extracted by tracing adjacent elements. Therefore, an element of interest can be reached by advancing retrieval almost linearly and hence is reached within a short time period.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3A to 3D are views for explaining details of the process flow in the first embodiment of the present invention;

FIGS. 6A to 6D are views for explaining details of the process flow in the second embodiment of the present invention;

FIGS. 7A to 7D are views for explaining details of the process flow in the second embodiment of the present invention;

FIG. 12 is a view comparing the repeating number of data error detection in a conventional method with that in the present invention;

FIG. 20A is a block diagram showing the configuration of a computer in this embodiment;

FIGS. 32A and 32B are views showing the formats of a list and a table formed during the processing in the seventh embodiment;

FIGS. 34A and 34B are views for explaining segments in the seventh embodiment;

FIGS. 36A and 36B are views for explaining practical processing when segments are faces in the seventh embodiment;

FIGS. 38A and 38B are views for explaining practical processing when segments are sides in the seventh embodiment;

FIGS. 41A and 41B are views for explaining practical processing when segments are faces in the eight embodiment;

FIGS. 45A and 45B are views for explaining practical processing in the tenth embodiment;

FIGS. 46A and 46B are views for explaining the eleventh embodiment;

FIGS. 49A and 49B are views showing the formats of a list and a table formed during the processing in the prior art;

FIGS. 51A and 51B are views for explaining practical processing when segments are faces in the prior art;

DESCRIPTION OF THE PREFERRED EMBODIMENTS

The characteristic features of the present invention will become apparent by the following description of several preferred embodiments of the invention. Note that the present invention is not limited to these embodiments and also contains combinations of the embodiments.

Figure 8A:
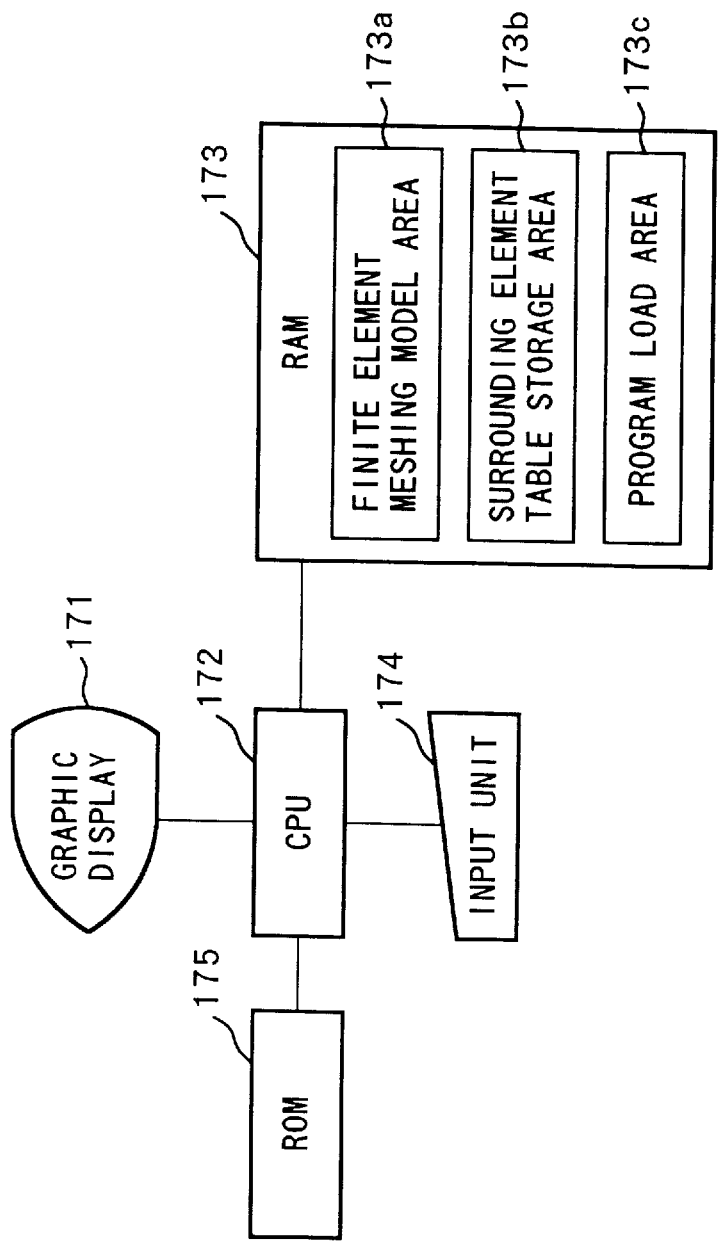
FIG. 8A is a block diagram showing the configuration of a computer system which realizes the first and second embodiments.
Figure 8B:
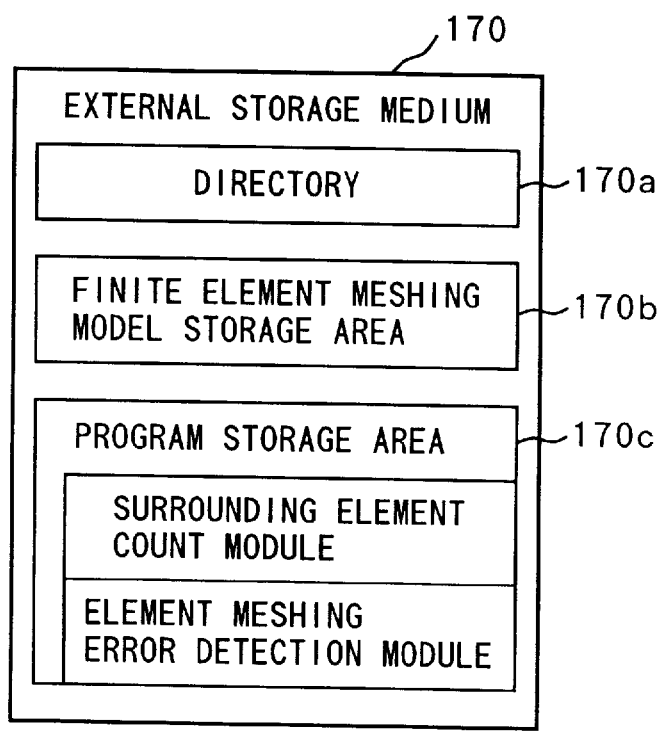
FIG. 8B is a view showing an example of the configuration of an external storage medium used when data and programs are loaded in a RAM 173 in FIG. 8A.
Figure 9A:
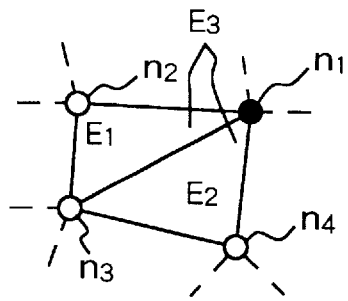
FIGS. 9A to 9F are views showing examples of errors in meshing diagrams of two-dimensional models.
Figure 9B:
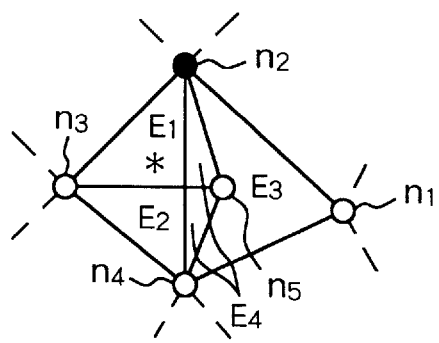
Figure 9C:
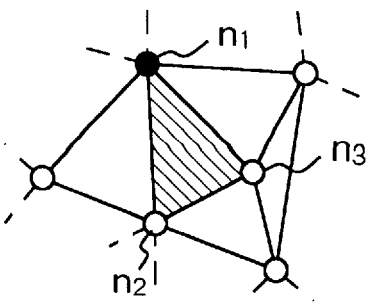
Figure 9D:
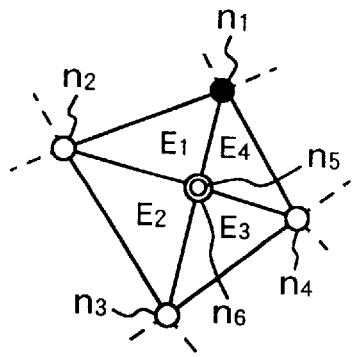
Figure 9E:
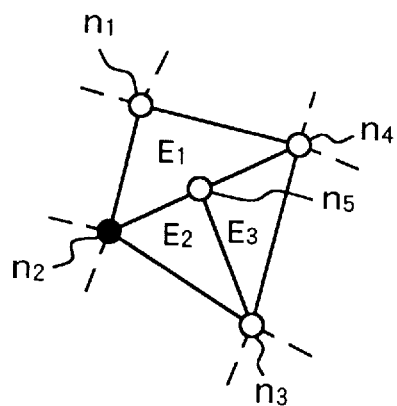
Figure 9F:
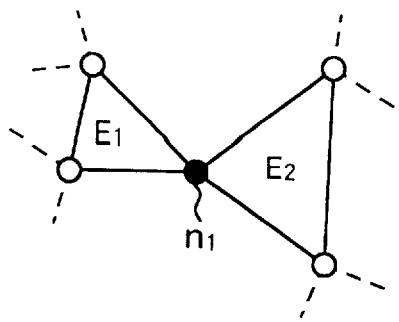

FIG. 8A is a block diagram showing the configuration of a computer for effectuating the first and second embodiments. In FIG. 8A, the computer comprises a display unit 171 such as a graphic display (CRT or FLCD); a CPU 172 for controlling arithmetic operations; a RAM 173 as an auxiliary storage. The RAM 173 has an area 173a for storing data of finite element meshing models, an area 173b for storing a table formed in accordance with the correspondence of surrounding elements (sides and faces) of nodes or sides, and an area 173c used when programs are externally downloaded. An input unit 174 is a keyboard or a pointing device which inputs data and operation instructions, or an interface for a floppy disk drive or a communication device which inputs data of finite element meshing models or programs. A ROM 175 stores control procedures of the CPU 172. The CPU 172 processes input data from the input unit 174 in accordance with the procedures stored in the ROM 175 or with programs loaded from the input unit 174 into the RAM 173, and displays the result on the display unit 171. FIG. 8B shows the configuration of an external storage medium 170 such as a floppy disk. This external storage medium 170 has a directory 170a, a finite element meshing model storage area 170b, and a program storage area 170c including a surrounding element count module and an element meshing error detection module.

(First Embodiment)

As the first embodiment of the present invention, a case in which the present invention is applied to a two-dimensional model will be described below.

Figure 1:
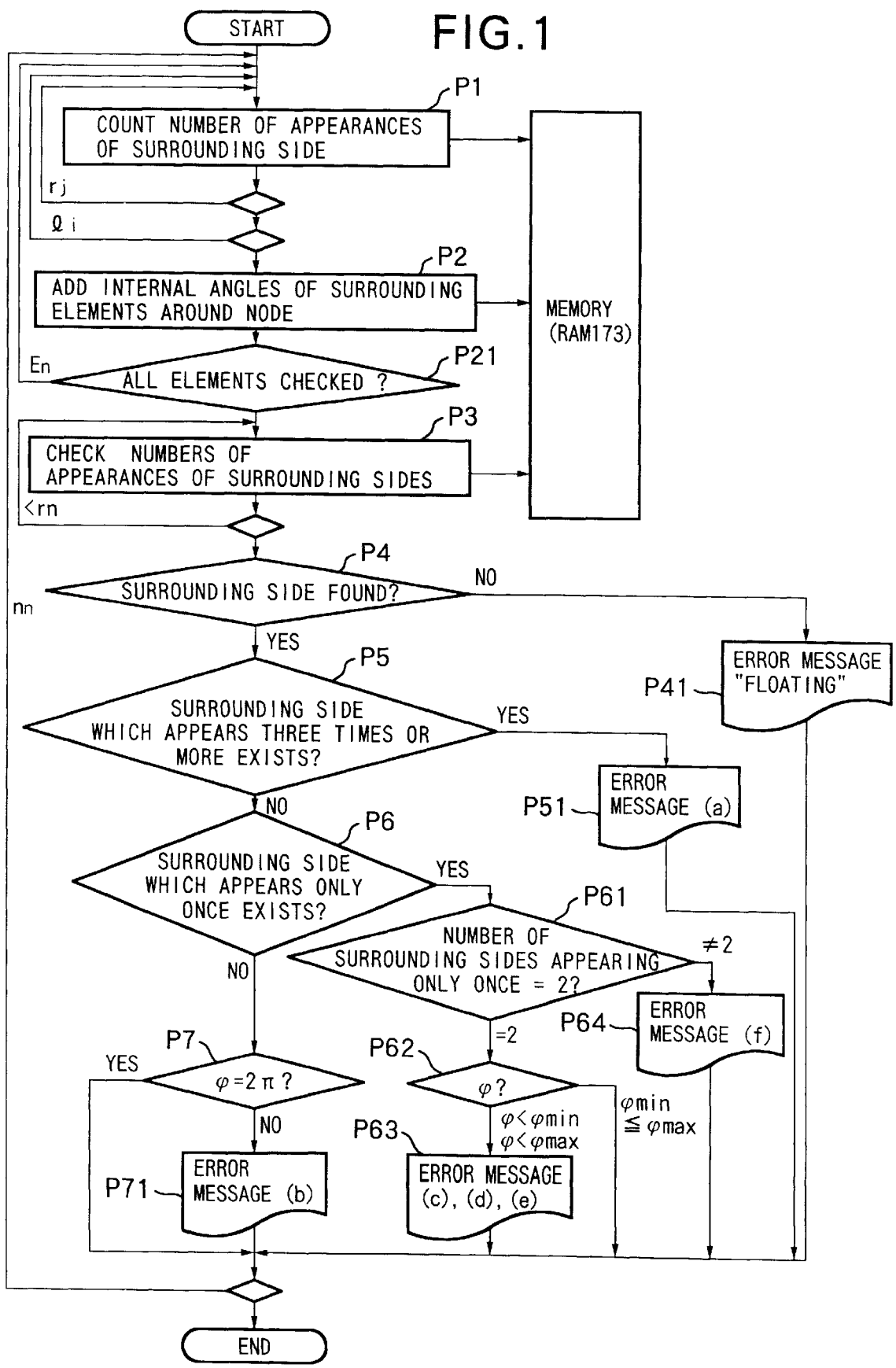
FIG. 1 is a flow chart for explaining the flow of the first embodiment of the present invention.
Figure 2:
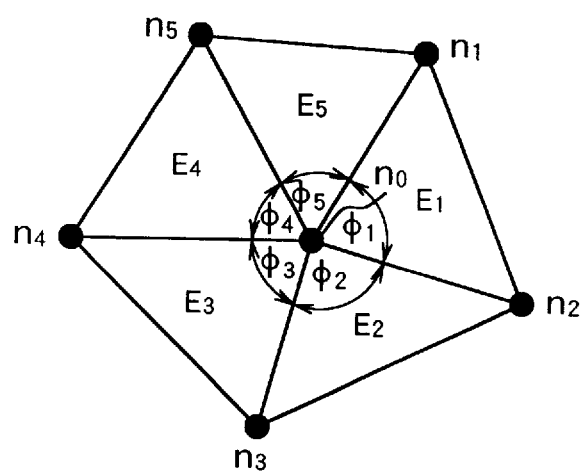
FIG. 2 is an element meshing diagram for explaining details of the process flow in the first embodiment of the present invention.
Figure 11:
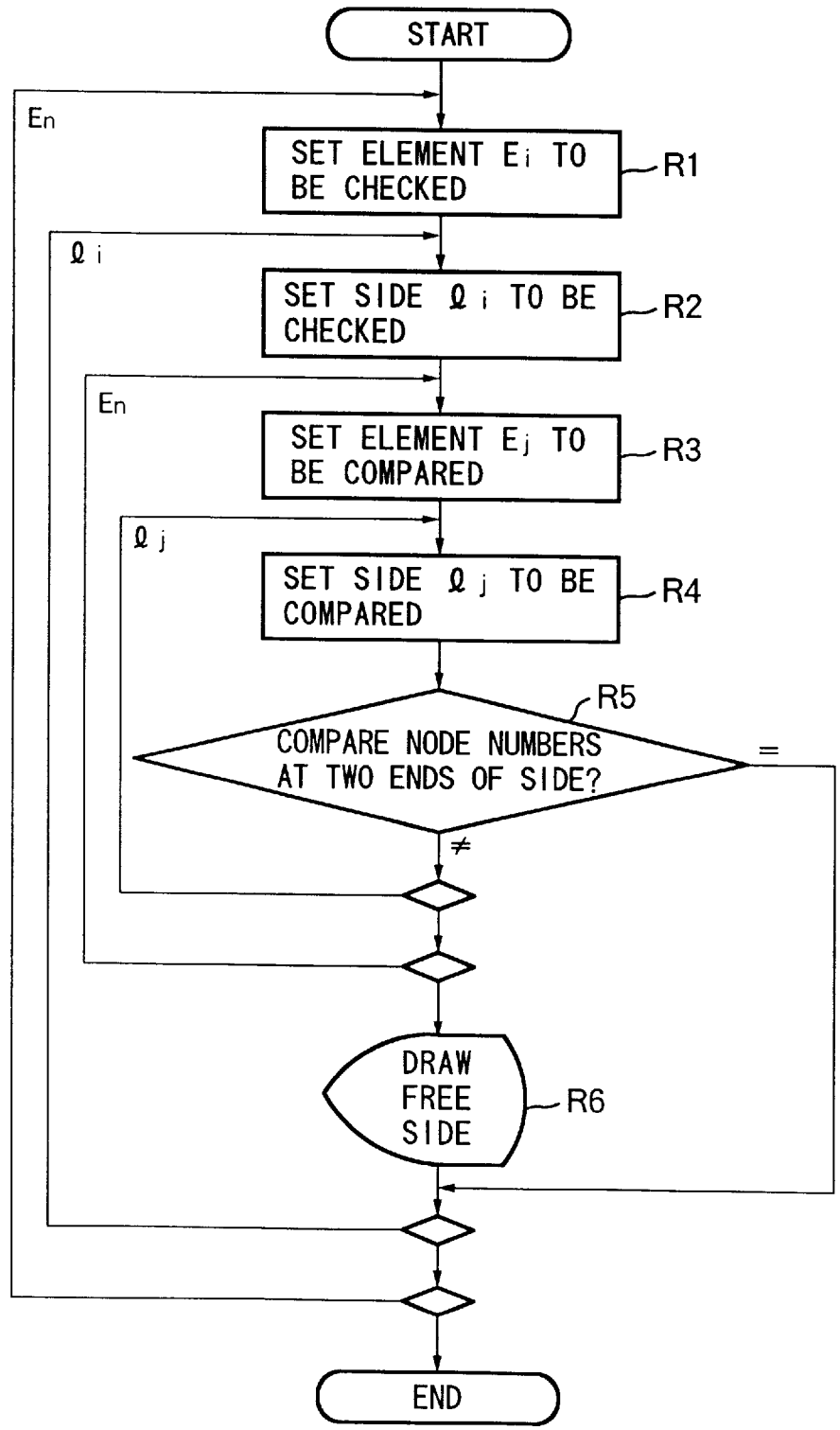
FIG. 11 is a flow chart for explaining a conventional algorithm for detecting errors in element meshing data in a two-dimensional model and the problem of the algorithm.
Figure 13:
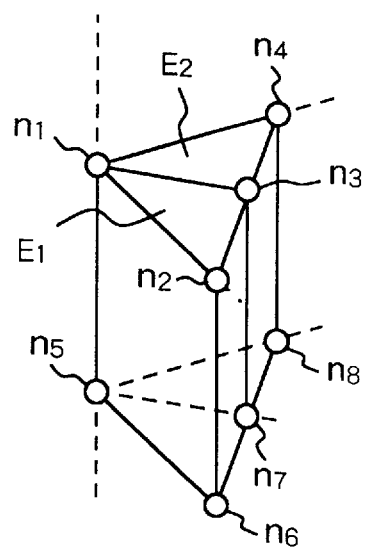
FIG. 13 is a view for explaining the process flow of a conventional element meshing data error detection method and the problem of the method.

FIGS. 1 to 3D are views for explaining this embodiment. FIG. 1 is a flow chart for finding errors in an element meshing diagram. In FIG. 1, reference symbols P1, P2, . . . denote processes; $n_t$, the total number of nodes; $r_j$ and $r_n$, the numbers of rows in tables shown in FIGS. 3A to 3D; and $E_n$ and $l_i$, the repeating numbers of elements and sides, respectively, as in FIG. 11. Note that in FIG. 1, a new element setting process and a new node setting process in each repetition which correspond to processes R1 and R2 in FIG. 11 are omitted. FIGS. 2 to 3D are views for explaining details of the process flow in FIG. 1. FIG. 2 is an element meshing diagram taken as an example, and FIGS. 3A to 3D illustrate a process of forming tables in process P1 in FIG. 1 in the element meshing diagram in FIG. 2. In FIGS. 2 to 3D, an element $E_1$ and a node $n_0$, for example, are the same as the element $E_1$ and the node $n_0$ in FIGS. 9A to 9F. In the tables shown in FIGS. 3A to 3D, the columns "node $n_i$" and "node $n_j$" show the numbers of nodes directly connecting to the node $n_0$ through sides $n_0n_i$ and $n_0n_j$ of the element $E_n$ having the node $n_0$ as its constituent node. The columns "side $n_0n_i$" and "side $n_0n_j$" show the numbers of appearances of these sides. The numerical values shown in FIGS. 3A to 3D are stored in the area $173b$ in FIG. 8A.

The element meshing diagram around the node $n_0$ is checked by the process, shown in the flow chart of FIG. 1, for finding errors in an element meshing diagram.

[Process P1]

In process P1, the number of elements having boundaries (to be referred to as surrounding sides hereinafter) of elements surrounding the node $n_0$, FIG. 2, as their own sides, is counted. This manipulation is done by performing the processing explained below and forming a table P1-(4) in FIG. 3D.

P1-(1)

The element $E_1$ having the node $n_0$ as its constituent node is extracted, and numbers $n_1$ and $n_2$ of two nodes directly connecting to $n_0$ through sides are stored in the columns "$n_i$" and "$n_j$", respectively. Also, information indicating that sides $n_0n_j$ and $n_0n_2$ have appeared once is stored in the columns "side $n_0n_i$" and "side $n_0n_j$", respectively, thereby obtaining a table P1-(1) in FIG. 3A.

P1-(2)

The second element $E_2$ having the node $n_0$ as its constituent node is extracted, and numbers $n_2$ and $n_3$ of two nodes directly connecting to $n_0$ through sides are added to the columns "$n_i$" and "$n_j$", respectively. Whether sides $n_0n_2$ and $n_0n_3$ have already appeared is checked by checking the elements previously stored in this table, i.e., the element $E_1$ stored in P1-(1) (therefore, $r_j=1$ in FIG. 1). Since the side $n_0n_2$ has appeared once, 2 and 1 are stored. At the same time, the column of the number of appearances of the side $n_0n_2$ of the element $E_1$ is rewritten by 2. The result is a table P1-(2) in FIG. 3B.

P1-(3)

The third element $E_3$ having the node $n_0$ as its constituent node is extracted, and numbers $n_3$ and $n_4$ of two nodes directly connecting to $n_0$ through sides are added to the columns "$n_i$" and "$n_j$", respectively. Whether sides $n_0n_3$ and $n_0n_4$ have already appeared is checked by checking the elements previously stored in this table, i.e., the elements $E_1$ and $E_2$ ($r_j=2$). Since the side $n_0n_3$ has appeared once as a side of $E_2$, 2 and 1 are stored. At the same time, the column of the number of appearances of the side $n_0n_3$ of the element $E_2$ is rewritten by 2. Consequently, a table P1-(3) in FIG. 3C is obtained.

P1-(4)

The above operation is repeatedly executed for all elements having the node $n_0$ as their constituent nodes. The result is P1-(4) in FIG. 3D. Note that in FIG. 1, $r_n$ indicates the number of rows (in this embodiment $r_n=5$) in the final table.

[Process P2]

In process P2, the internal angles around the node $n_0$ of the surrounding elements are added to obtain a total sum $\phi$. That is, the total sum $\phi$ of the internal angles in FIG. 2 is given by the following equation:

$$\phi = \phi_1 + \phi_2 + \phi_3 + \phi_4 + \phi_5 (= 2\pi) \quad (5)$$

Note that this process of adding the internal angles can be performed rapidly when it is done during the repetition of $E_n$ as in process P1 as illustrated in FIG. 1.

[Process P3]

In process P3, the numbers of appearances (the columns "side $n_0n_i$" and "side $n_0n_j$" in P1-(4) in FIG. 3D) of surrounding sides are checked from P1-(4) (FIG. 3D) formed in process P1, and are classified into four categories below:

(1) The number of appearances of a surrounding side is "0", i.e., P1-(4) in FIG. 3D has no row ($r_n=0$)

(2) "3" or more is present as the number of appearances of a surrounding side.

(3) "1" is present as the number of appearances of a surrounding side.

(4) All numbers of appearances of surrounding sides are "2".

In the case of item (3) above, the number of surrounding sides which appear once are simultaneously counted.

The element meshing diagram in FIG. 2 corresponds to (4).

If this processing corresponds to item (2) above, the operation can escape the repetition during the course of the processing. Therefore, as illustrated in FIG. 1, the processing is completed when repeated to the row number $r_n$ in P1-(4) of FIG. 3D.

[Process P4]

In process P4, item (1) classified in process P3 is branched.

If the number of appearances of a surrounding side is "0" (i.e., if $n_0$ surrounding side exists), this means that the node $n_0$ is a floating node. Accordingly, the flow advances to process P41 to output a message indicating that this node is a floating node and proceeds on to a check of the next node.

[Process P5]

In process P5, item (2) classified in process P3 is branched.

That is, the presence of a surrounding side which appears three times or more indicates that some surrounding elements of the node $n_0$ overlap each other. The error explained earlier in FIG. 9A is found by performing this check for nodes indicated by the black dots in FIG. 9A (each black dot in FIGS. 9A to 10H indicate a node at which an error can be found). The flow branches to process P51 to output a message indicating that there are overlapping elements and proceeds on to a check of the next node.

[Process P6]

In process P6, item (3) classified in process P3 is branched.

That is, the presence of a surrounding side which appears only once shows that the node $n_0$ is positioned on the outer circumference of the analytic model and this surrounding side appearing once is an outline. Accordingly, the flow advances to process P61 to check the number (already counted in process P3) of surrounding sides whose number of appearances is "1", thereby confirming that the number is "2". If the number is other than "2", this indicates that this analytic model has a constricted part shown in FIG. 9F. Therefore, a message indicating this information is output in process P64, and the flow advances to a check of the next node.

If the number of surrounding sides whose number of appearances is "1" is 2 in process P61, the sum $\phi$ of the internal angles around the node $n_0$ is checked in process P62. If $\phi$ falls outside the range of the maximum angle $\phi_{max}$ and the minimum angle $\phi_{min}$ of the external shape of the analytic model given by the analyst, this means that there is an error shown in FIG. 9C, 9D, or 9E. Accordingly, a message indicating this information is output in process P63, and the flow advances to a check of the next node.

If φ is within the range of the data given by the analyst, no problem arises and hence the flow directly advances to a check of the next node.

[Process P7]

In process P7, item (4) classified in process P3 is processed.

That is, when all numbers of appearances of surrounding sides are "2", the node $n_0$ is positioned inside the analytic model. Therefore, in process P7 whether the sum of the internal angles around the node is 2 π (radian) is checked. If the sum is not 2 π, there is an error shown in FIG. 9B. Accordingly, a message indicating this error is output in process P71. If the sum is 2 π, the flow directly advances to a check of the next node because there is no problem. In the case of the meshing diagram shown in FIG. 2, it is determined in this processing that there is no abnormality in elements around the node $n_0$.

Processes P1 to P7 explained in FIG. 1 are repetitively executed for all nodes.

In this processing, if the number of sides constituting one element is held constant at $l_n n$, the total repeating number is approximated by the following expression:

$$n_n \times r_n \times (E_n \times l_n/2 + 1) \qquad (6)$$

Assume that $n_n$ is $E_n/2$ and $r_n$ is 6 in a triangular element and $n_n$ is $E_n$ and $r_n$ is 4 in a quadrangular element. In this case, if an element meshing diagram consists only of triangular elements ($l_n=3$) and quadrangular elements ($l_n=4$), the total repeating numbers in this embodiment are as illustrated in the rows of "two-dimensional model" in FIG. 12.

If φ in process P62 is within the range of data given by the analyst, surrounding sides whose number of appearances is "1" represent the outlines of the analytic model. Therefore, the check can be performed more reliably when it is done by graphically displaying these surrounding sides.

In this embodiment, various errors in an element meshing diagram are found and the corresponding messages are output. However, it is also possible to automatically make corrections for the following items.

(1) In process P41, erase a node to which a message indicating a floating node is output.

(2) In process P51, display a node to which a message indicating overlapping elements is output, i.e., display an element having a surrounding side which appears three times or more. Ask the analyst whether this element can be erased. If the answer is YES, erase the element.

(Second Embodiment)

As the second embodiment of the present invention, a case where the present invention is applied to a three-dimensional model will be described below.

Figure 4A:
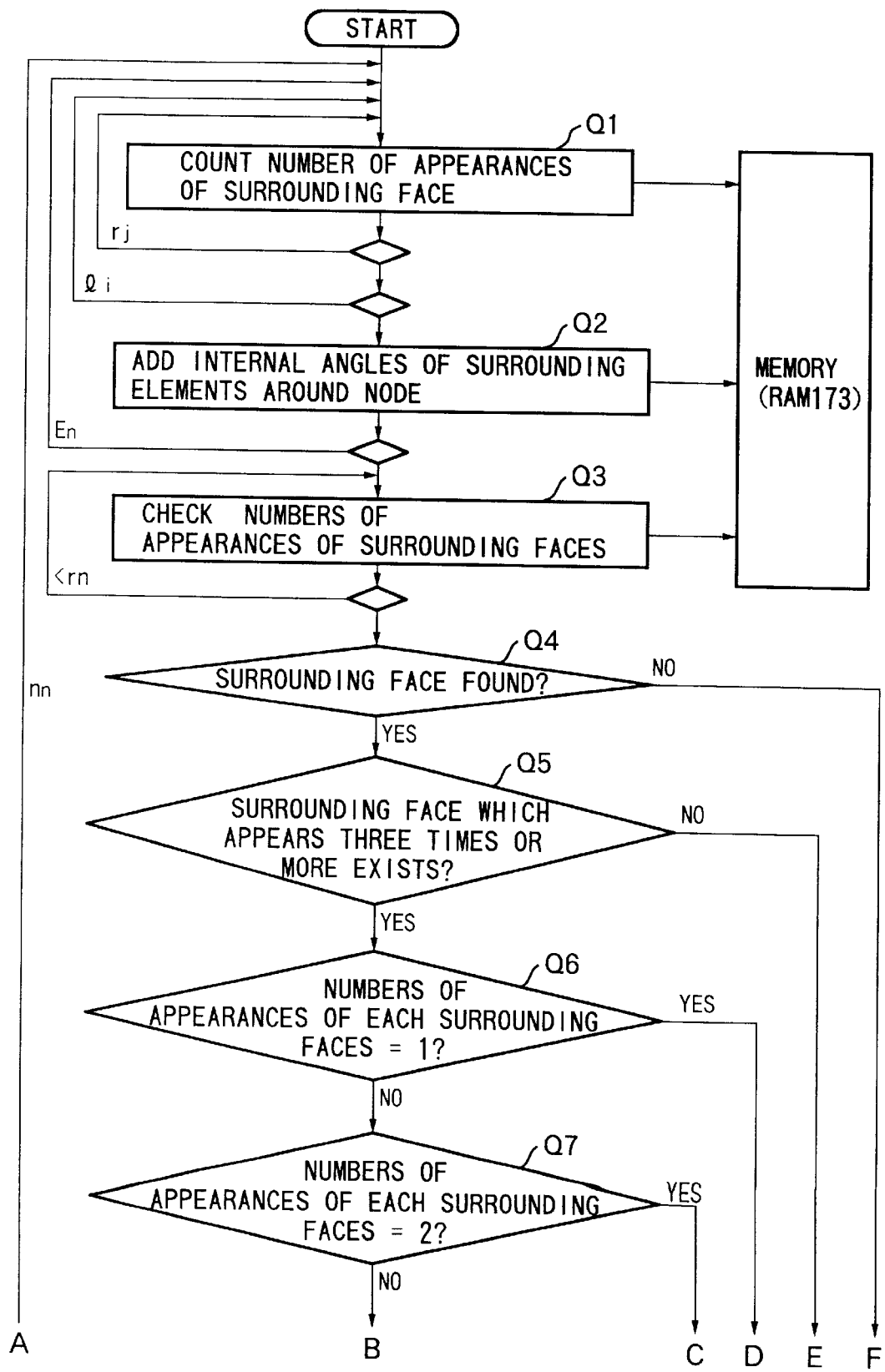
FIG. 4A is a flow chart for explaining the flow of the second embodiment of the present invention.
Figure 4B:
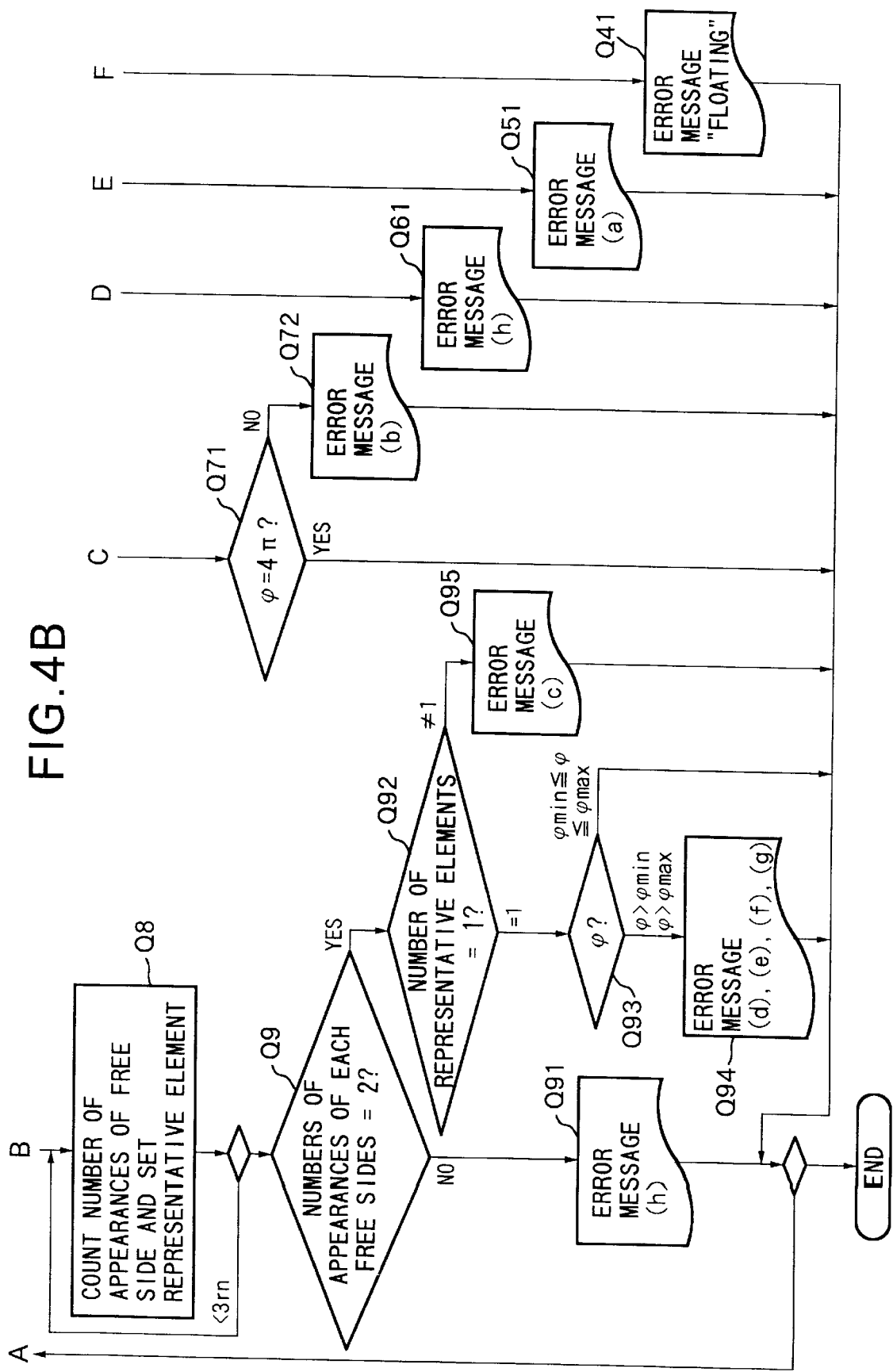
FIG. 4B is a flow chart for explaining the flow of the second embodiment of the present invention.
Figure 5:
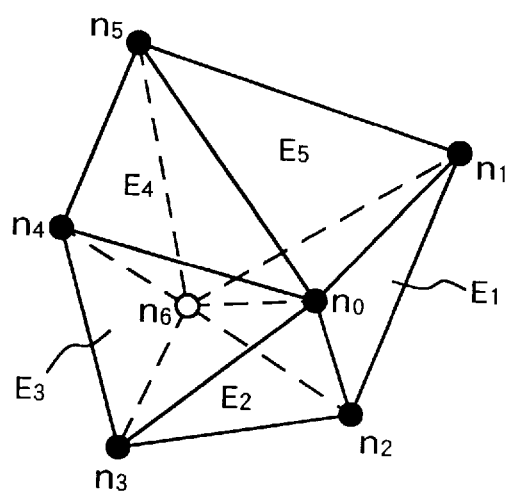
FIG. 5 is an element meshing diagram for explaining details of the process flow in the second embodiment of the present invention.

FIGS. 4A to 7D are views for explaining this embodiment. FIGS. 4A and 4B are flow charts for explaining processing of finding errors in an element meshing diagram. In FIGS. 4A and 4B, reference symbols Q1, Q2, ... denote processes; $r_j$ and $r_n$, the numbers of rows in FIGS. 6A to 6D; $l_i$, the number of faces constituting an element; and $n_n$ and $E_n$, the total number of nodes and the total number of elements, respectively, as in FIG. 1. Note that as in FIG. 1, processes of setting new elements and nodes during repetition are omitted. FIGS. 5 to 7D are views for explaining details of the flow of this processing shown in FIGS. 4A and 4B. FIG. 5 is an element meshing diagram as one example, and FIGS. 6A to 6D show a process of forming tables formed in process Q1 in FIG. 4A in the element meshing diagram in FIG. 5. In FIGS. 5 to 7D, an element $E_1$ and a node $n_0$, for example, are the same as the element $E_1$ and the node $n_0$ in FIG. 10. In the tables shown in FIGS. 6A to 6D, the columns "node $n_i$", "node $n_j$", and "node $n_k$" indicate the numbers of nodes $n_i$, $n_j$, and $n_k$, respectively, directly connecting to the node $n_0$ through edges of the element $E_n$ having the node $n_0$ as its constituent node. In this embodiment, checks corresponding to elements having the shapes of a triangular pyramid, a triangular prism, and a hexahedron will be described, and quadrangular pyramid elements are not taken into consideration. Tables having the numerical values shown in FIGS. 6A to 6D are stored in the area 173b shown in FIG. 8A.

Element segmentation around the node $n_0$ is checked by the processes, shown in the flow charts of FIGS. 4A and 4B, for finding errors in element meshing diagrams.

The individual processes in FIGS. 4A and 4B will be described below.

[Process Q1]

In process Q1, the number of elements having boundary faces (to be referred to as surrounding faces hereinafter) of elements surrounding the node $n_0$ shown in FIGS. 6A to 6D, as their own faces, is counted. This manipulation is done by performing the following processing and forming a table Q1-(4) in FIG. 6D.

Q1-(1)

The element $E_1$ having the node $n_0$ as its constituent node is extracted, and numbers $n_1$, $n_2$, and $n_6$ of three nodes directly connecting to the node $n_0$ through edges are stored in the columns "$n_i$", "$n_j$", and "$n_k$", respectively. Also, information indicating that faces $n_0 n_1 n_2$, $n_0 n_2 n_6$, and $n_0 n_6 n_1$ have appeared once are stored in the columns "face $n_0 n_k n_i$", "face $n_0 n_k n_i$", and "face $n_0 n_k n_i$", respectively, thereby obtaining a table Q1-(1) in FIG. 6A.

Q1-(2)

The second element $E_2$ having the node $n_0$ as its constituent node is extracted, and numbers $n_2$, $n_3$, and $n_6$ of three nodes directly connecting to the node $n_0$ through edges are newly stored in the columns "$n_i$", "$n_j$", and "$n_k$", respectively. Whether faces $n_0 n_2 n_3$, $n_0 n_3 n_6$, and $n_0 n_6 n_2$ have already appeared is checked by checking the elements previously stored in this table, i.e., the element $E_1$ stored in Q1-(1) (therefore, $r_j=1$ in FIG. 4A). Since the face $n_0 n_6 n_2$ has appeared once, 1, 1, and 2 are stored. At the same time, the column of the number of appearances of the face $n_0 n_6 n_2$ of the element $E_1$ is rewritten by 2. Consequently, a table Q1-(2) in FIG. 6B is obtained.

Q1-(3)

The third element $E_3$ having the node $n_0$ as its constituent node is extracted, and numbers $n_3$, $n_4$, and $n_6$ of three nodes directly connecting to the node $n_0$ through edges are newly stored in the columns "$n_i$", "$n_j$", and "$n_k$", respectively. Whether faces $n_0 n_3 n_4$, $n_0 n_4 n_6$, and $n_0 n_6 n_3$ have already appeared is checked by checking the elements previously stored in this table, i.e., the elements $E_1$ and $E_2$ ($r_j=2$). Since the face $n_0 n_6 n_3$ has appeared once as a face of $E_2$, 1, 1, and 2 are stored. At the same time, the column of the number of appearances of the face $n_0 n_6 n_3$ of the element $E_2$ is rewritten by 2, thereby obtaining a table Q1-(3) in FIG. 6C.

Q1-(4)

The above operation is repeatedly executed for all elements having the node $n_0$ as their constituent nodes. The result is the table Q1-(4) in FIG. 6D. Note that in FIG. 4A, $r_n$ indicates the final number of rows in the table (in this embodiment $r_n=5$).

[Process Q2]

In process Q2, the solid angles around the node of the surrounding elements are added to calculate a total sum $\phi$. That is, assuming the solid angles with respect to $n_0$ are defined such that angles formed by the faces $n_1n_2n_6$, $n_2n_3n_6$, $n_3$, $n_4n_6$, and $n_5n_1n_6$ are $\phi_1$, $\phi_2$, $\phi_3$, $\phi_4$, and $\phi_5$, respectively, the total sum $\phi$ of these solid angles is represented by the following equation:

$$\phi=\phi_1+\phi_2+\phi_3+\phi_4+\phi_5 \qquad (7)$$

This process of adding the solid angles can be rapidly performed when it is done during the repetition of $E_n$ such as in process Q1 as shown in FIG. 4A.

[Process Q3]

In process Q3, the numbers of appearances of surrounding faces are checked from Q1-(4) (FIG. 6D) formed in process Q1, and are classified into the following five categories:

(1) The number of appearances of a surrounding face is "0", i.e., Q1-(4) in FIG. 6D has no row ($r_n=0$).

(2) "3" or more is present as the number of appearances of a surrounding face.

(3) All numbers of appearances of surrounding faces are "1".

(4) All numbers of appearances of surrounding faces are "2".

(5) The numbers of appearances of surrounding faces consist of "1" and "2".

The element meshing diagram in FIG. 5 corresponds to (5).

If this processing corresponds to item (2) above, the operation can escape the repetition during the course of the processing. Therefore, as illustrated in FIG. 4A, the processing is completed when repeated to the row number $r_n$ in Q1-(4) in FIG. 6D.

[Process Q4]

In process Q4, item (1) classified in process Q3 is branched.

If the number of appearances of a surrounding face is "0" (i.e., if no surrounding face exists), this means that the node $n_0$ is a floating node. Accordingly, the flow advances to process Q41 to output a message indicating that this node is a floating node and passes on to a check of the next node.

[Process Q5]

In process Q5, item (2) classified in process Q3 is branched.

That is, the presence of a surrounding node which appears three times or more indicates that some surrounding elements of the node $n_0$ overlap each other The error explained earlier in FIG. 10A is found by performing this check for nodes indicated by the black dots in FIG. 10A. The flow branches to process Q51 to output a message indicating that there are overlapping elements and passes on to a check of the next node.

[Process Q6]

In process Q6, item (3) classified in process Q3 is branched.

Figure 10A:
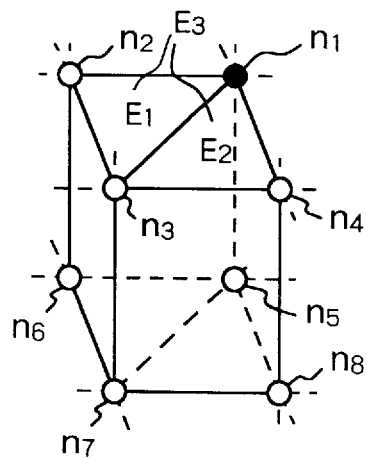
FIGS. 10A to 10H are views showing examples of errors in meshing diagrams of three-dimensional models.
Figure 10B:
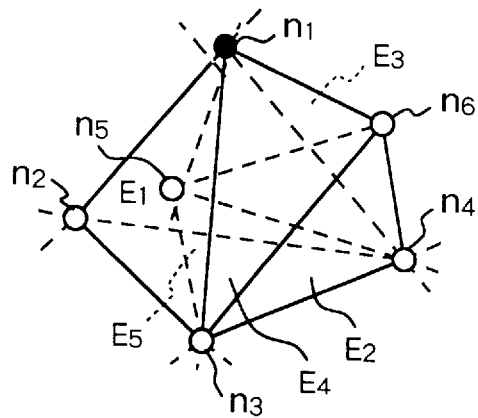
Figure 10C:
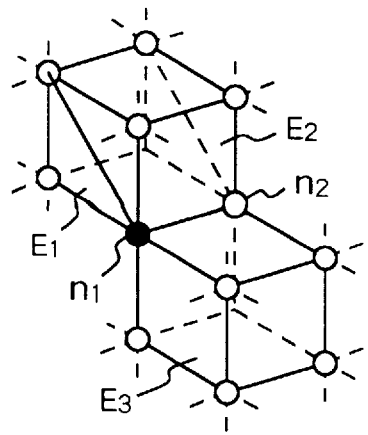
Figure 10D:
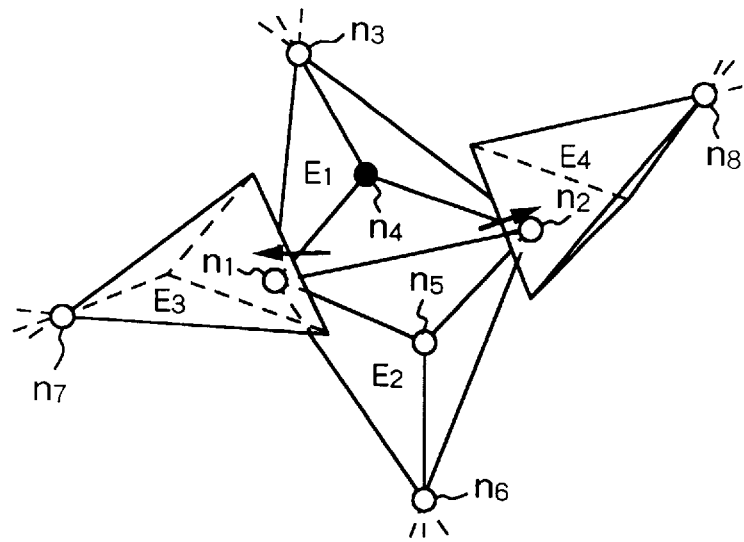
Figure 10E:
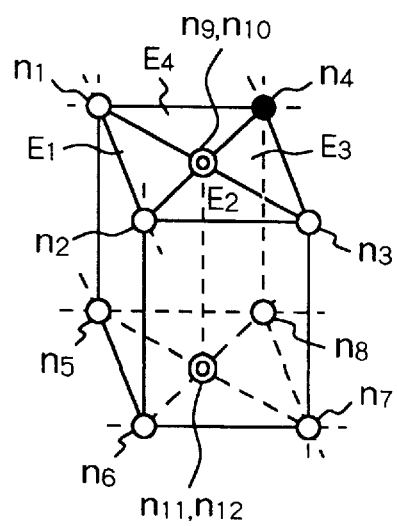
Figure 10F:
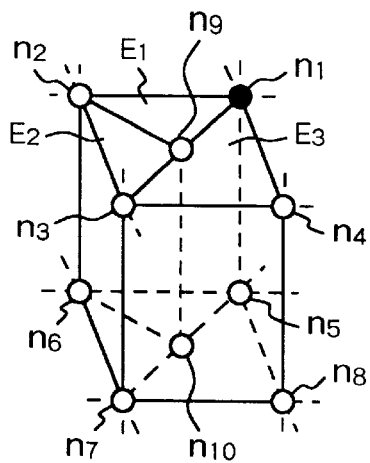
Figure 10G:
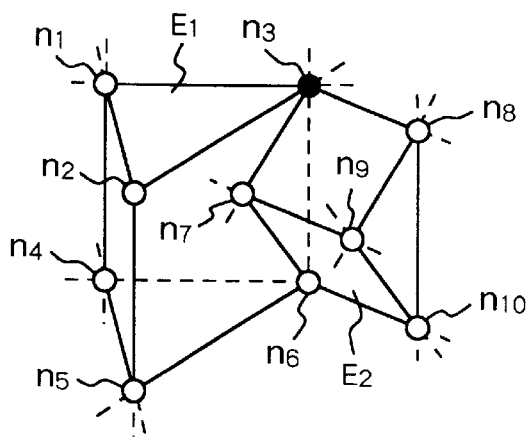
Figure 10H:
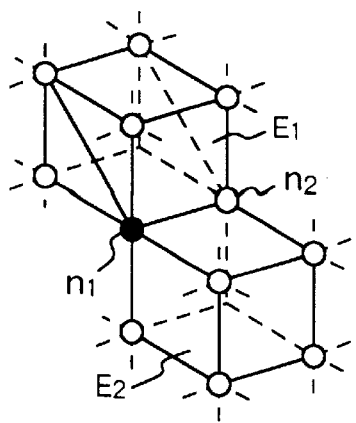

That is, when all numbers of appearances of surrounding faces are "1", the node no is not positioned in a constricted part as illustrated in FIG. 10H. Accordingly, the flow advances to process Q61 to output a message indicating this and passes on to a check of the next node.

[Process Q7]

In process Q7, item (4) classified in process Q3 is processed.

That is, when all numbers of appearances of surrounding faces are "2", the node $n_0$ is positioned inside the analytic model. Therefore, in process Q71, whether the sum of the solid angles of the elements around the node $n_0$ is $4\pi$ (radian) is checked. If the sum is not $4\pi$, there is an error shown in FIG. 10B. Accordingly, a message indicating this information is output in process Q72. If the sum is $4\pi$, the flow directly advances to a check of the next node because there is no problem.

[Process Q8]

In process Q8, item (5) classified in process Q3 is processed.

When the numbers of appearances of surrounding faces consist of "1" and "2", the node $n_0$ is positioned on the outer circumferential face of the analytic model. Surrounding faces which appear once are free faces. Therefore, connection of these free faces is checked by the following method to detect data errors in the element meshing diagram.

FIGS. 7A to 7D are views for explaining a process of forming tables for checking the connection of free faces relating to the node $n_0$. In these tables, nodes $n_i$ and $n_j$ are the numbers of two nodes, except $n_0$, of a free face in FIGS. 6A to 6D, sides $n_0n_i$ and $n_0n_j$ are the numbers of appearances of the sides $n_0n_i$ and $n_0n_j$ of the free face, and a representative element is the representative number of an element having the free face. The process will be described below with reference to FIGS. 7A to 7D.

Q8-(1)

Whether the first row $E_1$ in $Q_1$-(4) of FIG. 6D has a free face is checked. Since the face $n_0n_1n_2$ is a free face, the node numbers $n_1$ and $n_2$ are stored in the columns "node $n_i$" and "node $n_j$", respectively. Also, 1s are stored as the numbers of appearances of sides $n_0n_j$ and $n_0n_2$ in the columns "side $n_0n_i$" and "side $n_0n_j$", respectively. In the column "representative element", $E_1$ as the number of an element having this free face is stored. Consequently, Q8-(1) in FIG. 7A is obtained.

If the element $E_1$ has other free faces, the same processing is performed for all these free faces.

Q8-(2)

Whether the second row $E_2$ in Q1-(4) of FIG. 6D has a free face is checked. Since the face $n_0n_2n_3$ is a free face, the node numbers $n_2$ and $n_3$ are added to the columns "node $n_i$" and "node $n_j$", respectively. Subsequently, whether the sides $n_0n_2$ and $n_0n_3$ have already appeared in this table is checked for all sides stored in the table. Since the side $n_0n_2$ has appeared once in the first row, 2 and 1 are stored in the columns "side $n_0n_i$" and "side $n_0n_j$", respectively. At the same time, the column "side $n_0n_2$" in the first row is changed to 2. The fact that the side $n_0n_2$ has already appeared as a side of a free face of the element $E_1$ indicates that the face $n_0n_2n_3$ connects to the free face $n_0n_1n_2$ of the element $E_1$ through the side $n_0n_2$. Accordingly, $E_1$ which is the number of an element having the first one of these connecting faces is stored as the representative element. The result is Q8-(2) in FIG. 7B.

Q8-(3)

Whether the third row $E_2$ in the table Q1-(4) of FIG. 6D has a free face is checked. Since the face $n_0n_3n_4$ is a free face, the node numbers $n_3$ and $n_4$ are added to the columns "node $n_i$" and "node $n_j$", respectively. Subsequently, whether the sides $n_0n_3$ and $n_0n_4$ have already appeared in this table is checked for all sides stored in the table. Since the side $n_0n_3$ has appeared once in the second row, 2 and 1 are stored in the columns "side $n_0n_i$" and "side $n_0n_j$", respectively. At the same time, the column "side $n_0n_3$" in the second row is changed to 2. Also, since it can be considered that the face $n_0n_3n_4$ connects to the free face $n_0n_1n_2$ of the element $E_1$ for the same reason as above, the element number $E_1$ is stored as the representative element.

Q8-(4)

The above operation is repetitively executed for all free faces in Q1-(4) of FIG. 6D, thereby obtaining Q8-(4) in FIG. 7D.

[Process Q9]

From the table Q8-(4) in FIG. 7D thus formed, the numbers of appearances of the sides $n_0n_i$ and $n_0n_j$ of the free faces are checked.

If there is a side whose number of appearances is other than "2", this indicates that the corresponding node is positioned in a constricted part as illustrated in FIG. 10H. Accordingly, a message indicating this information is output in process Q91, and the flow passes on to a check of the next node.

If all numbers of appearances are "2", the flow advances to process Q92 to check the number of the representative elements from Q8-(4) in FIG. 7D. If there are two or more different representative elements, the element meshing diagram is constricted by the node. Therefore, a message indicating this information is output in process Q95, and the flow passes on to a check of the next node.

If there is only one representative element, the sum $\phi$ of the solid angles of the elements around the node is checked in process Q93. If $\phi$ is outside the range of a maximum angle $\phi_{max}$ and a minimum angle $\phi_{min}$ of the external shape of the analytic model given by the analyst, this demonstrates that the model has any of the errors shown in FIGS. 10D to 10G. Therefore, a message indicating this information is output in process Q94, and the flow advances to a check of the next node.

If $\phi$ is inside the range of the data given by the analyst, the flow directly advances to a check of the next node because there is no problem.

Processes Q1 to Q9 explained in FIGS. 4A and 4B are repeatedly executed for all nodes.

In this processing, assuming that the number of faces constituting one element is fixed to $l_n$, the total repeating number is approximated by the following expression:

$$n_n \times r_n \times (E_n \times l_n/2 + 4) \tag{8}$$

Assume that $n_n$ is $E_n/6$ and $r_n$ is 16 in a tetrahedral element, $n_n$ is $E_n/2$ and $r_n$ is 12 in a pentahedral element, and $n_n$ is $E_n$ and $r_n$ is 8 in a hexahedral element. In this case, if an element meshing diagram consists of elements of the same shape, the total repeating numbers in this embodiment are obtained from the above expression as shown in the rows of "three-dimensional model" in FIG. 12.

Note that as in the first embodiment, if $\phi$ is within the data range given by the analyst in process Q93, a surrounding face whose number of appearances is "1" represents the outer circumference of the analytic model. Therefore, data error detection can be performed more reliably by graphically displaying and checking this surrounding face.

In this embodiment, various errors in element meshing diagrams are found and the corresponding messages are output. However, it is also possible to automatically make corrections for the following items.

(1) In process Q41, erase a node to which a message indicating a floating node is output.

(2) In process Q51, display a node to which a message indicating overlapping elements is output, i.e., display an element having a surrounding face which appears three times or more. Ask the analyst whether this element can be erased. If the answer is YES, erase the element.

Also, in this embodiment the data error detection method restricted to elements excluding quadrangular pyramids is described. However, element meshing diagrams including quadrangular pyramids can be readily processed by adding one column to the table formed in FIGS. 6A to 6D.

Note that the flow charts shown in FIGS. 1, 4A, and 4B are merely examples of realizing the present invention. In particular, the parts before and after the procedure of branching using the boundaries of elements and the procedure of branching based on the sum of internal angles are not limited to those in the above embodiments.

As is apparent from the above description, the first and second embodiments can provide finite element meshing diagram data error detection methods capable of reducing the load on an analyst, easily finding and classifying errors, automatically correcting some errors, and reducing the check time.

More specifically, the following effects are achieved.

(1) Graphic display devices such as graphic terminals and plotters are unnecessary.

(2) No detection error occurs due to overlook because an analyst does not judge anything.

(3) Since all processes are done automatically, it is not necessary to educate general users who do not understand finite element method very well.

(4) Some errors can be automatically corrected.

(5) Even three-dimensional models can be easily processed.

(6) Errors which cannot be found in conventional data error detection methods can be found.

Also, as can be seen from FIG. 11, the calculation time required for the processing is almost the same as or shorter than that when only the conventional method (1) is performed. The checks can be performed within a much shorter calculation time than when all of the five conventional methods are performed.

FIG. 20A is a block diagram of a computer system used to extract and display free edges in the third to sixth embodiments.

In FIG. 20A, the computer system comprises a display unit 71 such as a graphic display; a central processing unit (CPU) 72 for arithmetic operations and control; and a RAM 73 as a temporary storage. This RAM 73 includes a finite element meshing model area 71a for storing data of finite element meshing models, a free face storage area 71b for storing extracted free faces, a contour storage area 71c for storing extracted free edges (contours), an overlapping contour storage area 71d for storing extracted overlapping contours, a vertex storage area 71e for storing extracted vertices, and a program load area 73f used when programs are externally downloaded and executed.

An input unit 74 is a keyboard or a pointing device for input data and operation instructions or an interface for a floppy disk drive or a communication device for inputting data of finite element meshing models. A ROM 75 stores procedures of the CPU 72. Normally, data is input from the input unit 74, and the CPU 72 processes the input data in accordance with the procedures stored in the ROM 75 and displays the results on the display unit 71.

Figure 20B:
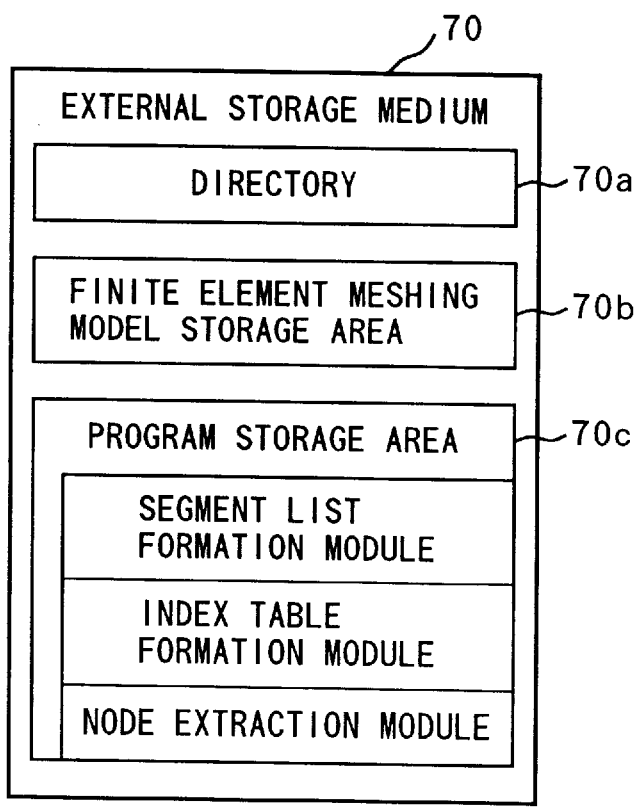
FIG. 20B is a view showing an example of the configuration of an external storage medium used when data and programs are loaded in a RAM 73 in FIG. 20A.
Figure 21:
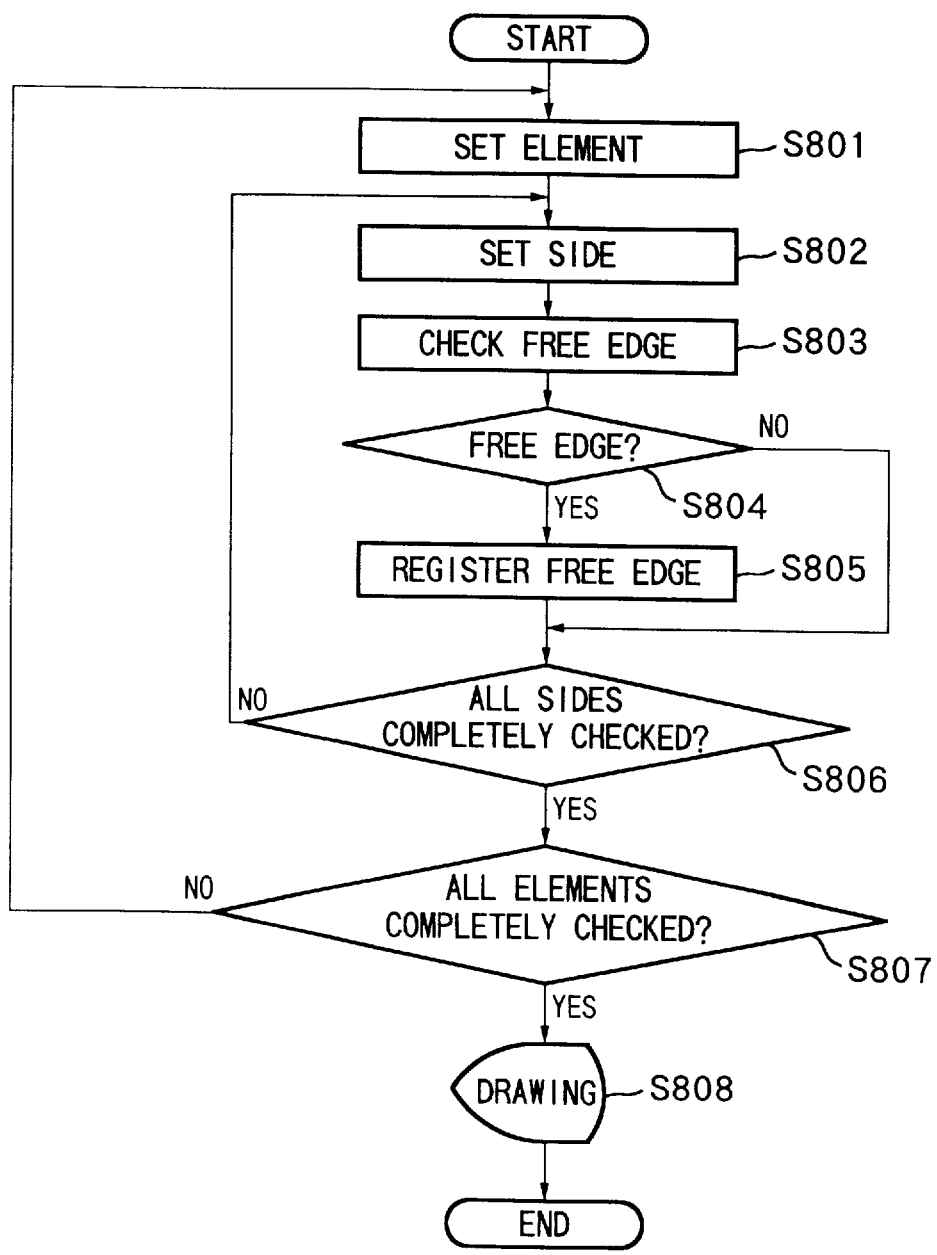
FIG. 21 is a flow chart for explaining a conventional process flow.

When data or programs are downloaded from an external storage medium 70, the external storage medium 70 has a configuration such as the one shown in FIG. 20B which includes a directory 70a, a finite element meshing model storage area 70b, and a program storage area 70c including a segment list formation module, an index table formation module, and a node extraction module.

(Third Embodiment)

Figure 14:
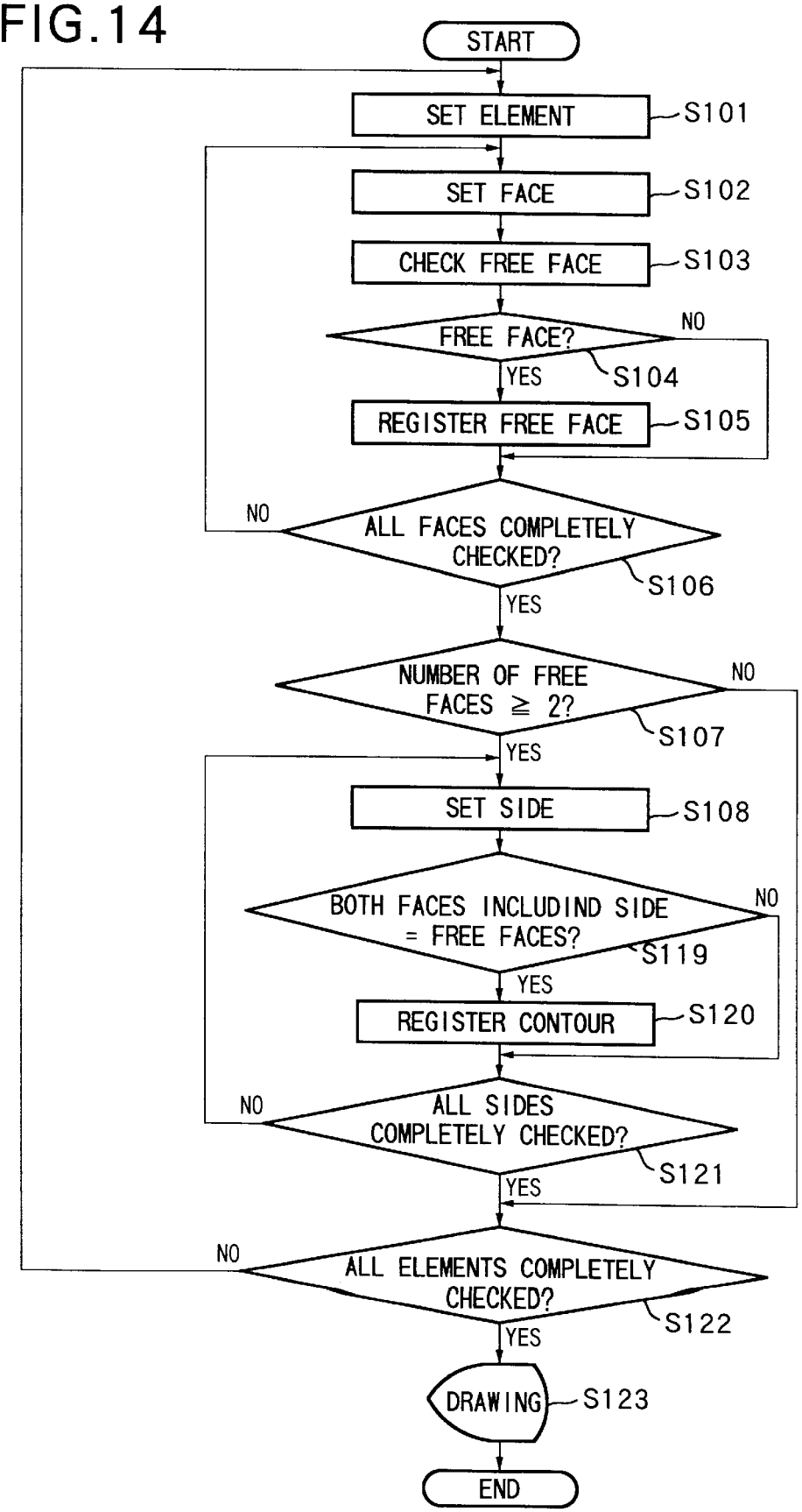
FIG. 14 is a flow chart showing the process flow in the third embodiment of the present invention.

FIG. 14 shows the flow of processing of extracting contours for explaining the third embodiment of the present invention. The process of extracting contours will be described below with reference to FIG. 14.

In step S101, an element (Ei) as an object to be checked is set. In steps S101 to S106, free faces of the element Ei are extracted. That is, one face of the element Ei is set in step S102, and whether an element having the same face as the set face is present in addition to the element Ei is checked in step S103. The same face means a face whose constituent nodes have the same numbers as those of the constituent nodes of the set face. In step S104, whether the set face is a free face is checked. If it is determined in step S103 that there is an element having the same face, this face is not a free face. If there is no such element, this face is a free face. If the face is a free face, the flow advances to step S105 to register the face. If the face is not a free face, the flow advances to step S106 to proceed on to the next processing. The above processing is performed for all faces of the element Ei by returning the flow from step S106 to step S102. In this way, it is possible to check whether each of all faces of the element Ei is a free face.

In step S107, whether the number of free faces of the element Ei is 1 or less is checked. Since a contour is not constituted by one or less face, it is determined that all sides of this element are not contours. Thereafter, the flow advances to step S122 to pass on to the next element.

If two or more free faces are present, one side (Lj) of the element Ei is set in step S108. In step S119, whether two faces of the element Ei having Lj as their sides (two faces having Lj as their edges and present on the two sides of Lj) are free faces is checked. If the two faces are free faces, Lj is registered as a contour in step S120. If NO in step S119, the flow advances to step S121. This check is performed for all sides of the element Ei by returning the flow from step S121 to step S108.

The above operation is performed for all elements through the loop returning from step S122 to step S101, and the extracted contours are displayed in step S123.

In the above processing, the determination of free faces shown in step S103 is performed only for faces having the same sum of node numbers constituting the faces. Therefore, the processing can be done within an almost fixed time period independently of the number of elements of a model. This is described in Japanese Patent Laid-Open No. 4-346178.

Figures 22, 23:
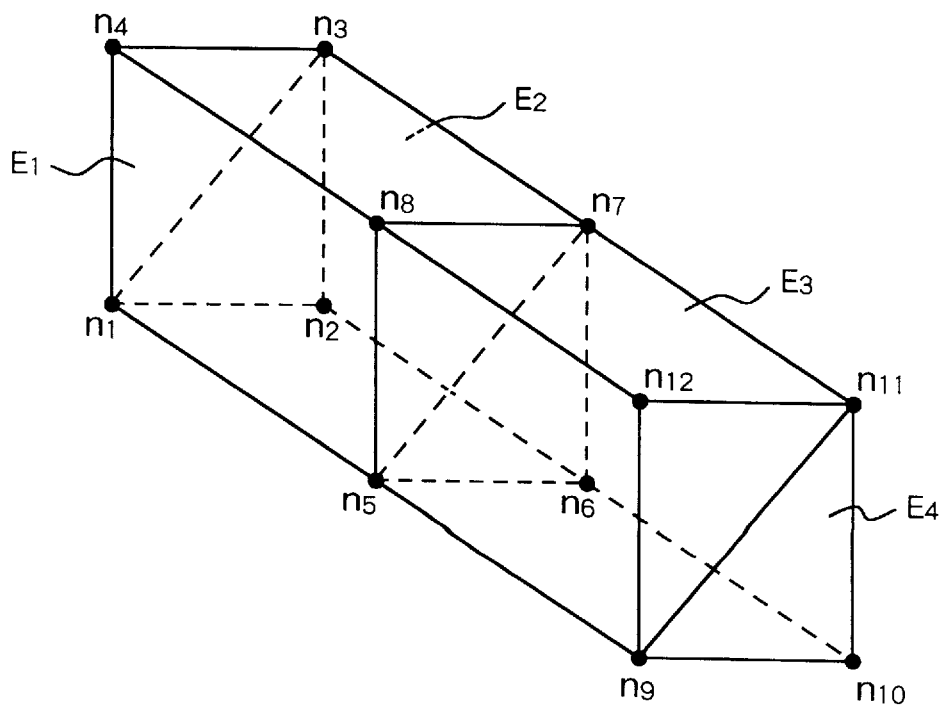
FIG. 22 is a view for explaining the repeating number.
FIG. 23 is a view for explaining an actual finite element meshing model.
Figure 24:
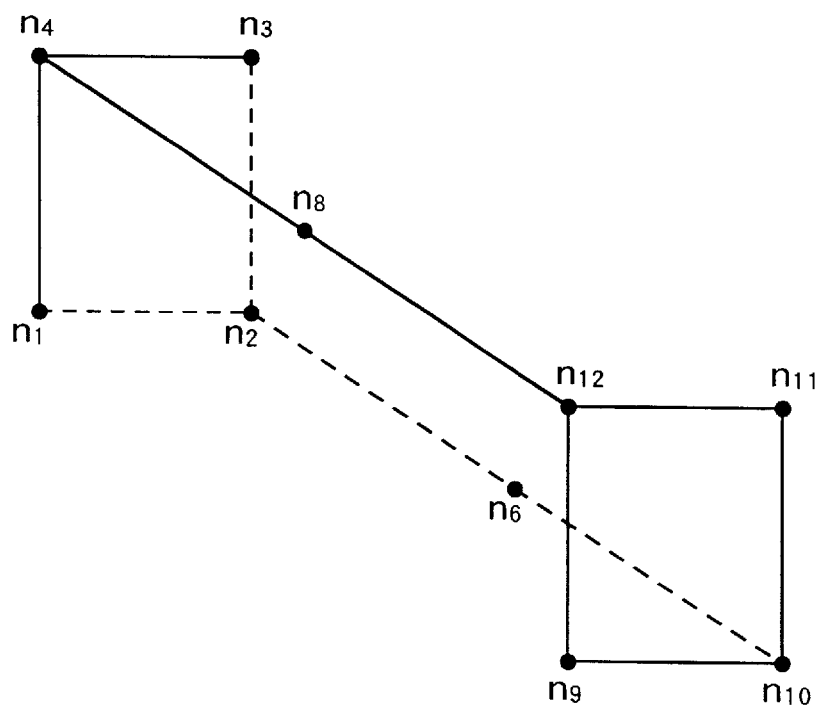
FIG. 24 is a view for explaining an actual finite element meshing model.

The repeating number of the loop from step S106 to step S102 in this processing is the number of faces constituting the element Ei. FIG. 22 shows the numbers of faces of principal three-dimensional elements. The repeating number of the loop from step S121 to step S108 in FIG. 14 is the number of sides constituting the element Ei. However, general element meshing models do not have two or more free faces because most elements are positioned inside the meshing models. As a result, the flow advances from step S107 to step S122 for most elements, and so this loop is executed very rarely.

Accordingly, the time required for this method to extract contours is nearly directly proportional to the following expression:

$$\sum_{i=1}^{elem} F_i \qquad (9)$$

where Fi is the number of faces of the element Ei and elem is the number of elements.

FIG. 22 shows that the number of faces is always smaller than the number of sides in three-dimensional elements. Accordingly, expression (4) is always smaller than expression (3). That is, in this embodiment, it is possible to extract contours within shorter time periods than in conventional free edge extraction methods.

Also, the contours extracted by this embodiment are extracted as edges of free faces. Therefore, it is possible to extract even mismatching in a meshing model in which faces of elements are discontinuous.

Figure 26:
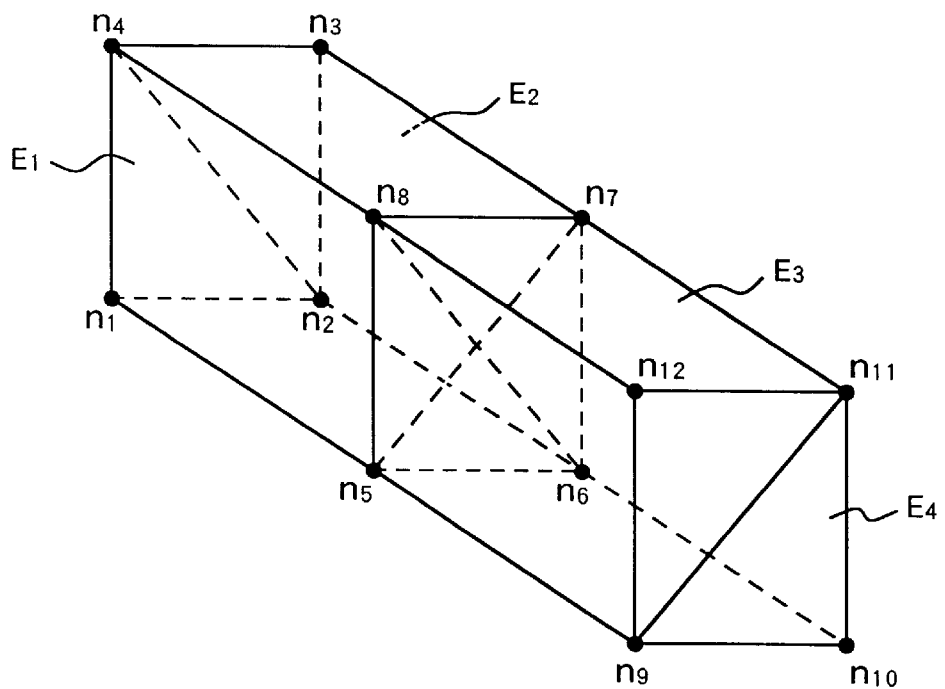
FIG. 26 is a view for explaining an actual finite element meshing model.
Figure 27:
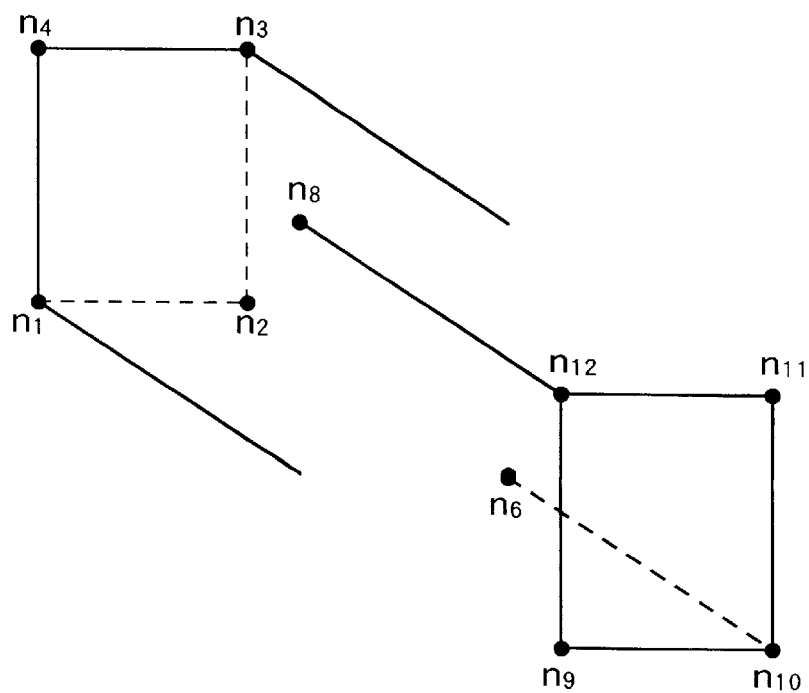
FIG. 27 is a view for explaining an actual finite element meshing model.

The process of contour extraction according to this embodiment will be described in detail below by using the meshing model shown in FIG. 26 used in "BACKGROUND OF THE INVENTION".

In this embodiment, contours are extracted by the following procedure. First, free faces are registered.

(1) An element E1 is set (step S101).

(2) A face $n_1-n_2-n_4$ of the element E1 is set (step S102).

(3) Whether another element having the face $n_1-n_2-n_4$ is present is checked (step S103). Consequently, no other element having the same face as this face is found, and so it is determined that this face is a free face (step S104).

(4) The face $n_1-n_2-n_4$ is registered as a free face (step S105).

(5) The flow returns from step S106 to step S102, and a new face $n_2-n_4-n_8-n_6$ is set.

(6) The free face check is similarly performed for the face $n_2-n_4-n_8-n_6$ (step S103). Since an element E2 has a face consisting of the same nodes, it is determined that the face $n_2-n_4-n_8-n_6$ is not a free face (step S104).

(7) Since the face $n_2-n_4-n_8-n_6$ is not a free face, the flow returns from step S106 to again set a new face.

(8) The manipulations in (2) to (7) are executed for all remaining faces of the element E1. Consequently, three faces ($n_1-n_5-n_8-n_4$, $n_1-n_5-n_6-n_2$, and $n_5-n_6-n_8$) are further registered as free faces.

The flow then passes on to registration of free edges.

(9) A total of four faces are registered as free faces for the element E1. Therefore, the flow advances from step S107 to set one side $n_1-n_4$ of the element E1 (step S108).

(10) Since both of two faces $n_1-n_2-n_4$ and $n_1-n_5-n_8-n_4$ having the side $n_1-n_4$ as their edges are free faces, the flow advances from determination in step S119 to register the side $n_1-n_4$ as a contour (step S120).

(11) The flow returns from step S121 to S108 to set a new side $n_2-n_4$.

(12) Of two faces $n_1-n_2-n_4$ and $n_2-n_4-n_8-n_6$ having the side $n_2-n_4$ as their edges, the latter is not a free face (step S119). Therefore, the flow advances from step S121 to again set a new side (step S108).

(13) The manipulations in (10) to (12) are performed for all remaining sides of the element E1. The result is that sides $n_1-n_2$, $n_1-n_5$, $n_5-n_8$, and $n_5-n_6$ are newly registered as contours.

(14) The above operation is performed for remaining elements E2 to E4 by returning the flow from step S122 to step S101. As a consequence, eleven sides ($n_2-n_3$, $n_3-n_4$, $n_3-n_7$, $n_7-n_8$, $n_6-n_7$, $n_8-n_{12}$, $n_9-n_{12}$, $n_{11}-n_{12}$, $n_6-n_{10}$, $n_9-n_{10}$, and $n_{10}-n_{11}$) are additionally registered as free edges. Note that the sides $n_5-n_6$, $n_6-n_7$, $n_7-n_8$, and $n_8-n_5$ are registered twice.

Figure 15:
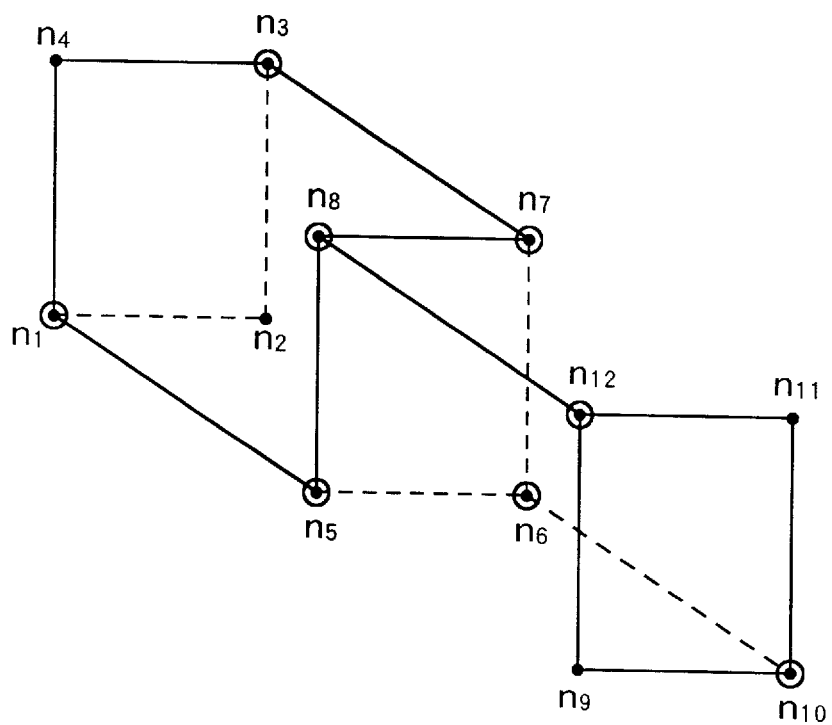
FIG. 15 is a view showing the processing result in the third embodiment of the present invention.

FIG. 15 shows the contours extracted and drawn by the above operation (step S123). In FIG. 15, lines displayed by the broken lines as hidden lines in FIG. 23 are left displayed by the broken lines. FIG. 15 shows lines $n_5-n_6$, $n_6-n_7$, $n_7-n_8$, and $n_8-n_5$ which are obviously not contours. This indicates that connection of elements is not continuous in a region surrounded by nodes $n_5$, $n_6$, $n_7$, and $n_8$.

In this embodiment, the extraction of contours and the extraction of free faces are simultaneously performed. That is, if all faces registered in step S105 in FIG. 14 are stored, this means that all free faces are extracted and hence means that free faces and contours are simultaneously extracted. Free faces represent the surfaces of analytic models and are very useful in displaying three-dimensional element meshing models with hidden lines.

Also, free faces are conventionally extracted by a program different from a program for extracting contours. The method of the present invention combines these free face and contour extraction programs into a single program.

(Fourth Embodiment)

In the third embodiment, mismatching between elements is found by displaying extracted contours. However, the presence of mismatching between elements can be readily found by checking whether overlapping contours exist in extracted contours. This will be described in detail below.

In the third embodiment, an edge of two adjacent free faces in one element is extracted as a contour. Accordingly, two faces with respect to the extracted contour are necessarily free faces. If contours overlap each other, faces of two elements having these sides (contours) are different (if the faces are the same, they cannot be free faces). Assuming that all elements of a finite element model connect to each other through faces (i.e., there is no constricted part in which elements connect through one side), these two faces are present on the same plane. Therefore, it can be said that faces of elements are necessarily discontinuous in that portion.

More specifically, contours extracted in the third embodiment are necessarily unique (there are no overlapping contours) if there is no mismatching between elements (if elements connect to each other through one face). Therefore, faces between elements are necessarily discontinuous in a portion having overlapping contours.

In this fourth embodiment, therefore, mismatching in an element meshing model is checked by extracting overlapping contours from contours extracted in the third embodiment, thereby further facilitating the finding of mismatching between elements in the third embodiment.

Figure 16:
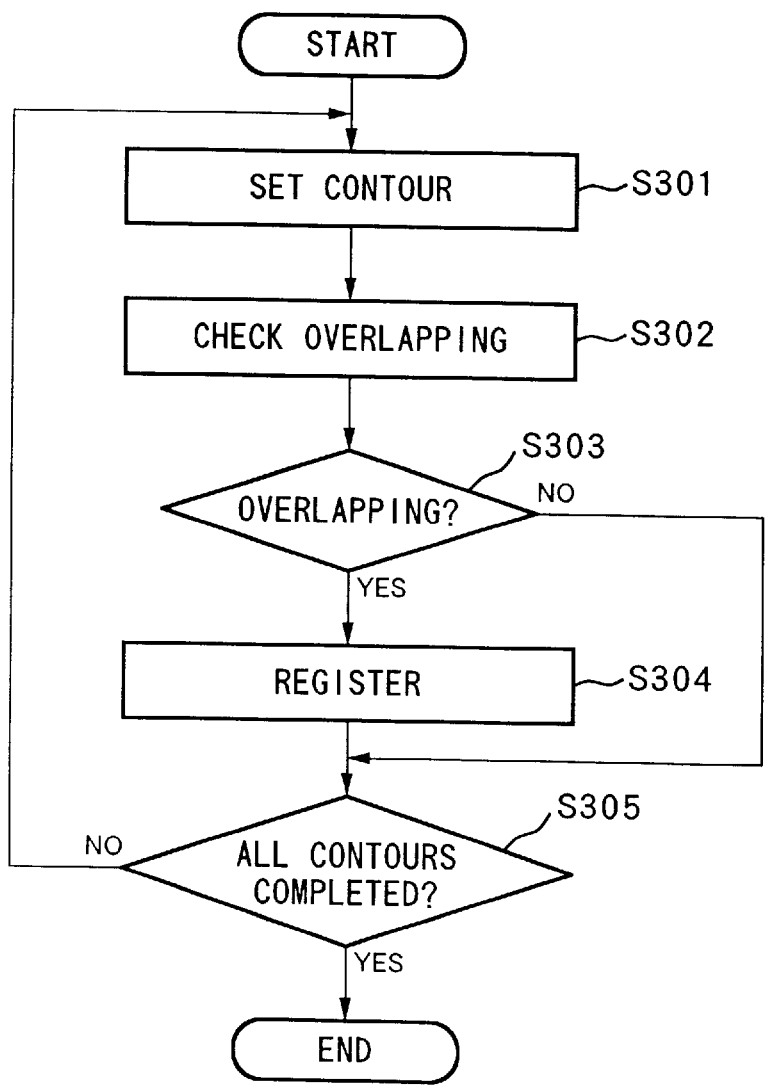
FIG. 16 is a flow chart showing the process flow in the fourth embodiment of the present invention.

FIG. 16 shows the flow of processing of extracting overlapping contours. Note that this processing can be performed in units of elements in addition to FIG. 14 or can be performed after all elements are checked in FIG. 14.

In step S301, one contour (Oi) is set. In step S302, whether there is a contour overlapping (having the same node numbers at its two ends as the node numbers of) the set contour is checked. If a contour overlapping the contour Oi is present, this overlapping contour is registered in step S304. If there is no overlapping contour, the flow advances to step S305 to pass on to the next processing. This processing is performed for all contours by the loop returning from step S305 to step S301, thereby extracting all overlapping contours.

The overlap check in step S302 must basically be performed for all contours except Oi. However, the processing time can be shortened by previously grouping contours having the same sum of node numbers at the two ends and checking only these contours having the same sum.

The overlapping contours extracted in the above processing are so displayed that they can be distinguished in the process of displaying contours (step S123 in FIG. 14). When these contours are so displayed as to be distinguishable, the presence of mismatching between elements in these portions can be readily found.

Note that as the method of distinguishing between overlapping contours and contours not overlapping, it is preferable to display these two types of contours by changing at least one of the color, the type (e.g., broken lines, alternate long and short dashed lines, wave lines, or double lines), and the thickness of lines by which the two are displayed. The alarm effect of informing abnormality (mismatching between elements) is enhanced by changing the color of the lines. The method of changing the line type or the line thickness can be used in monochromatic graphic displays.

It is also possible to display only overlapping contours. By displaying overlapping contours, the presence of mismatching between elements in a model can be confirmed.

Furthermore, by checking the presence of overlapping contours, it is possible to check at least the presence of mismatching between elements contained in a model without displaying other contours. This is effective in checking input data prior to calculations.

(Fifth Embodiment)

In the third embodiment, contours are extracted from free faces of elements. By further advancing this method, it is possible to extract vertices (acute portions) of a meshing model from these contours. Mismatching between elements in an element meshing model can be found more reliably by the use of vertices. This will be described below with reference to FIGS. 15 and 17. Note that the processing in FIG. 17 can be performed in units of elements in addition to FIG. 14 or can be performed after all elements are checked in FIG. 14.

After the presence of contours is checked for all sides of an element Ei, if the number of the contours is 2 or less, there is no vertex formed by two or less sides. In step S401, therefore, it is determined that all constituent nodes of the element Ei are not vertices, and no processing is performed. On the other hand, if three or more contours are extracted, one constituent node ($n_i$) of Ei is set in step S402. In step S403, whether all sides of the element Ei having the node $n_i$ as their end points are contours is checked. If all sides are contours, the node $n_i$ is registered as a vertex in step S404. If there is a side which is not a contour, the flow advances to step S405. The flow then returns from step S405 to step S402 to perform this operation for all constituent nodes of the element Ei.

All vertices of a meshing model are extracted when this operation is incorporated into FIG. 14 and the extractions of free faces and contours are simultaneously performed for all elements.

Details of the above operation will be described by using the meshing model in FIG. 26.

(1) The number of contours in an element E1 is checked (step S401). Since the number of contours is 5, a node $n_1$ is set (step S402).

(2) whether three sides $n_1$–$n_5$, $n_1$–$n_4$, and $n_1$–$n_2$ having the node $n_1$ as their end points are contours is checked (step S403).

(3) Since all of the three sides are contours, the node $n_1$ is registered as a vertex (step S404).

(4) The flow returns to step S402 to set a node $n_2$, and whether three sides $n_1$–$n_2$, $n_2$–$n_4$, and $n_2$–$n_6$ having the node $n_2$ as their end points are contours is checked (step S403).

(5) Since the side $n_2$–$n_4$ (and the side $n_2$–$n_6$) is not a contour, the flow returns from step S405 to step S402 to set the next node.

(6) The above processing is performed for all nodes of the element E1. As a result, the nodes $n_1$ and $n_5$ are extracted as vertices.

(7) This operation is performed for elements E2 to E4 after free faces and contours are extracted.

As a result of the above processing, eight nodes $n_1$, $n_3$, $n_5$, $n_6$, $n_7$, $n_8$, $n_{10}$, and $n_{12}$ are extracted. FIG. 15 shows the vertices extracted by this operation, in which black dots indicating the nodes are enclosed with circles. If there is no mismatching in an element meshing model, these extracted vertices are positioned in acute portions of the meshing model and not shared by a plurality of elements.

In this embodiment, however, the vertices $n_5$, $n_6$, $n_7$, and $n_8$ are present on edges of the meshing model. From this, it is readily known that element meshing has mismatching in this portion. In the third embodiment, mismatching between elements in a meshing model is found by displaying only contours. However, mismatching can be found more reliably by simultaneously displaying vertices as described above.

(Sixth Embodiment)

In the above third to fifth embodiments, the methods of extracting segments constituting elements in the order of contours and vertices, i.e., from high-order to low-order segments, via free faces, have been described by taking one three-dimensional meshing model of the embodiments as an example. When this is applied to two-dimensional element meshing models, it is readily possible to extract vertices, via free edges, from the two-dimensional models. In this sixth embodiment, a method of checking a two-dimensional element meshing model by extracting vertices from the meshing model will be described.

Figure 18:
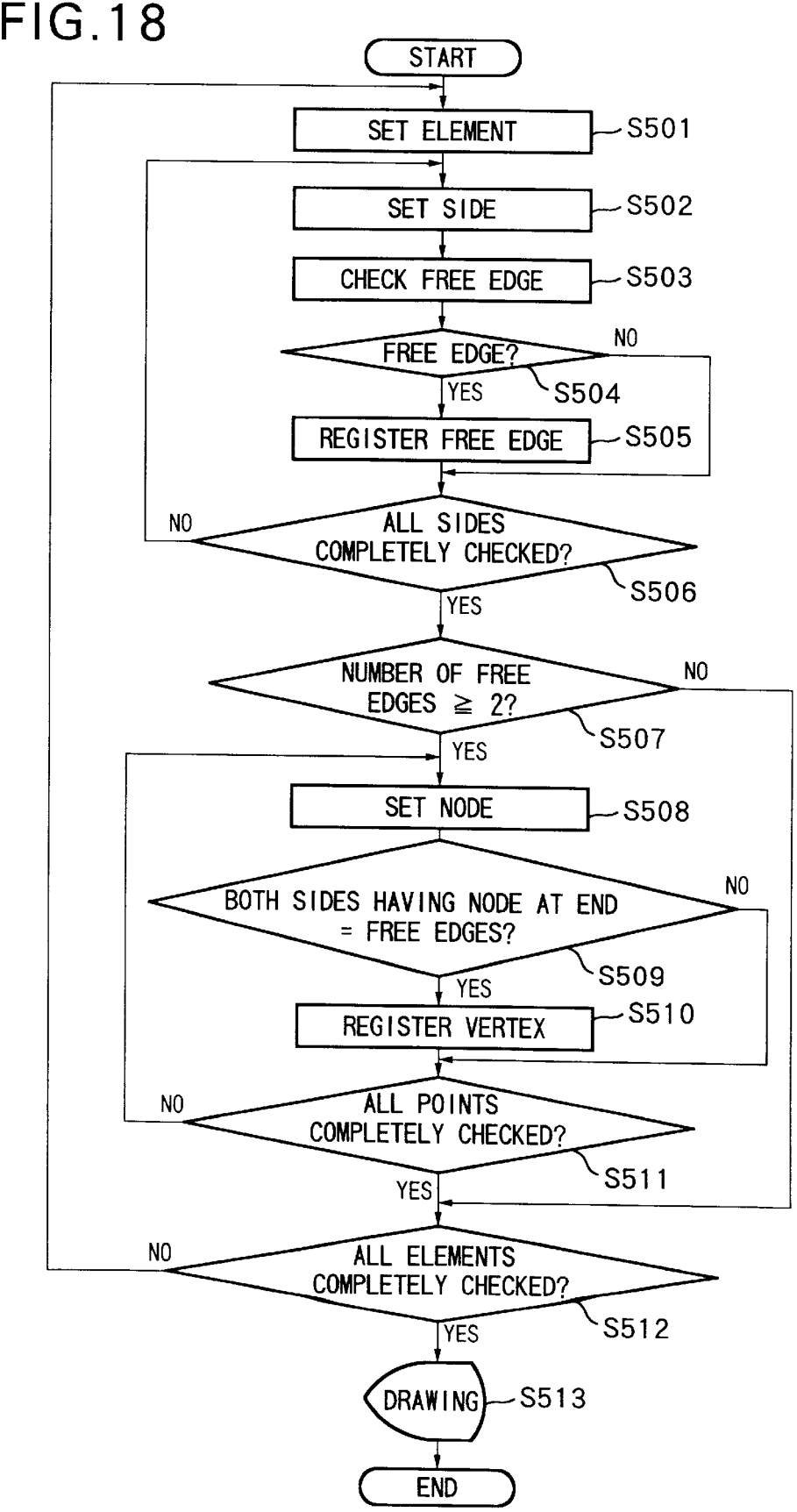
FIG. 18 is a flow chart showing the process flow in the sixth embodiment of the present invention.

FIG. 18 shows the process of extracting vertices from two-dimensional meshing models according to this embodiment. FIG. 18 is equivalent to replacing faces and sides in FIG. 14 with sides and nodes, respectively. Therefore, details of the process will be omitted and only the summary of the process will be described.

First, an element (Ei) is set in step S501, and free edges are extracted from sides of the element Ei in steps S502 to S506. By using the extracted free edges, vertices are extracted in steps S501 to S511. In step S507, if the number of the free edges of the element Ei is one or less, it is determined that there is no vertex because a vertex is not formed by one or less side. Accordingly, the flow advances from step S507 to step S512. In step S509, whether both of two sides having nodes at their end points are free edges is checked.

As in the case of three-dimensional models, if this element meshing model has no mismatching, the vertices thus obtained are positioned in corner portions of the meshing model (analytic region) and not shared by a plurality of elements. Therefore, these vertices are simultaneously displayed on contours and the positions of the vertices are checked. In this manner, mismatching between elements in the meshing model can be found.

Figure 19:
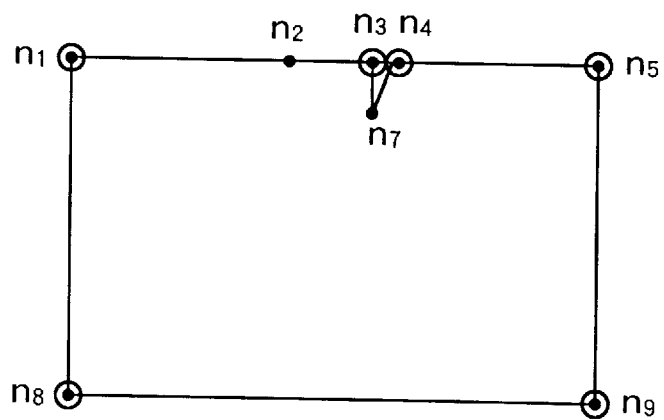
FIG. 19 is a view showing one application of the sixth embodiment of the present invention.
Figure 25A:
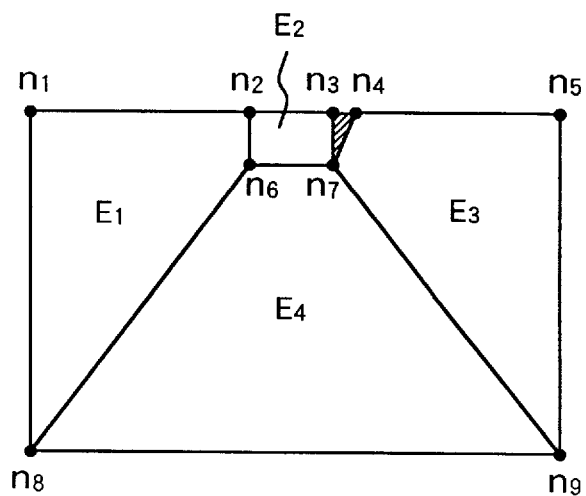
FIGS. 25A and 25B are views for explaining an actual finite element meshing model.

FIG. 19 is a view in which the vertices extracted from an element meshing model shown in FIG. 25A by using this method are displayed together with free edges. The vertices are enclosed by circles.

Figure 25B:
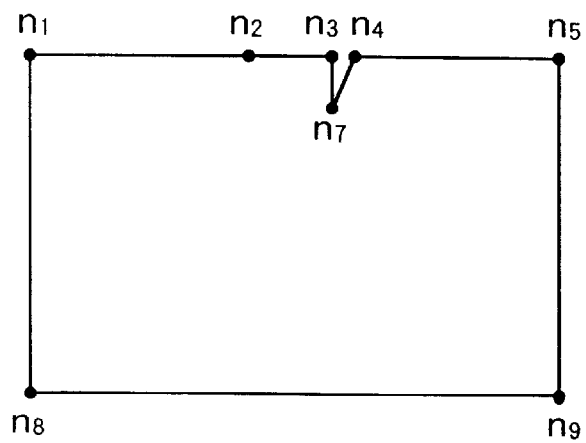

In FIG. 19, vertices $n_3$ and $n_4$ are positioned in the middle of a side $n_1$–$n_5$. This shows that there is mismatching (in this case, the corner of the model) between elements in this portion of the vertices $n_3$ and $n_4$. Consequently, a data error can be easily found. This method is similarly effective when an element E2 is very small with respect to the whole analytical region in FIG. 25A and so the depression in the free edges of nodes $n_3$, $n_4$, and $n_7$ is very small in FIG. 25B, since the vertices $n_3$ and $n_4$ are necessarily extracted.

Note that mismatching in finite element meshing models can be found more effectively by combining the embodiments described above. Note also that these embodiments have been described by using elements used in a finite difference method, a finite element method, and a boundary element method. However, the present invention is obviously applicable to data having structures similar to these structures.

It is evident from the above results that the third to sixth embodiments can provide methods and apparatuses for extracting contours and vertices from finite element meshing models, which can easily find discontinuities (including very small errors in two-dimensional models) between faces of elements in three-dimensional models and mismatching between elements.

More specifically, the following effects are achieved for three-dimensional models by the use of the contour extraction methods according to the present invention and the extracted contours.

(1) It becomes possible to find mismatching in element meshing models which cannot be found using conventional contours (free edges).

(2) Contours can be extracted within shorter time periods than in conventional methods.

(3) In the stage of extracting contours, free faces useful in displaying element meshing diagrams also can be extracted.

(4) The programs of extracting free faces and contours can be combined into a single program. This simplifies the program management.

Also, the following effects are obtained by checking overlapping of contours extracted in the present invention.

(1) Mismatching between elements can be found more easily than when contours are simply displayed.

(2) The presence/absence of mismatching can be found without displaying contours.

Furthermore, mismatching between elements can be checked more reliably by simultaneously displaying vertices and contours extracted by the present invention.

Figure 47A:
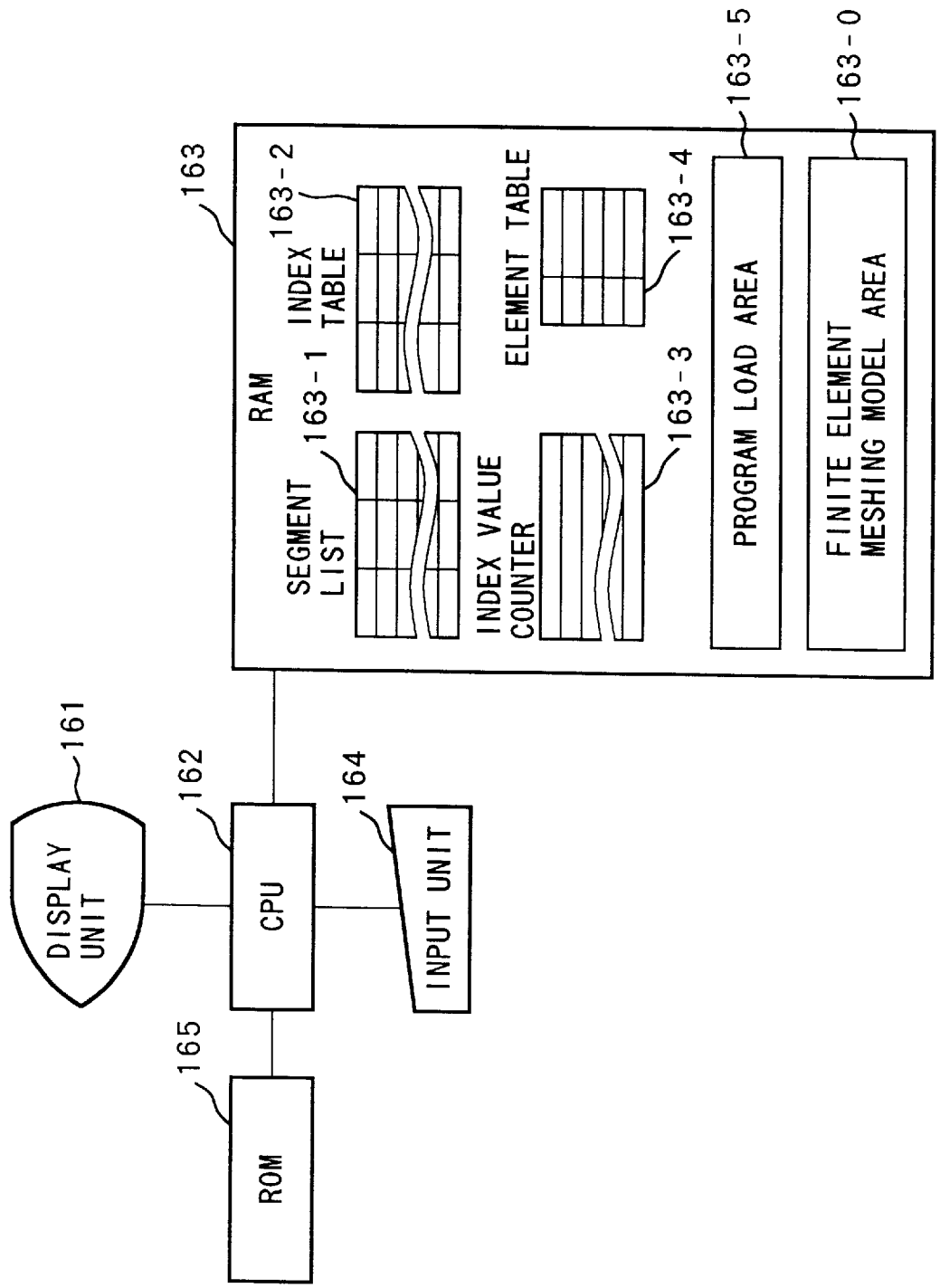
FIG. 47A is a block diagram showing the configuration of a computer which realizes this embodiment.

FIG. 47A is a block diagram of a computer system for extracting free faces and free edges from finite element meshing models and displaying the extracted segments according to the seventh to eleventh embodiments.

In FIG. 47A, the computer system comprises a display unit 161 for displaying finite element meshing models or extracted free faces and free edges; a central processing unit (CPU) 162 for arithmetic operations and control; and a RAM 163 as a temporary storage. This RAM 163 includes an area 163-0 for storing finite element meshing models, a segment list area 163-1 for storing a segment list, an index table area 163-2 for storing an index table, an index value counter area 163-3 for storing the counts of index values, an element table area 163-4 for storing strings of nodes for defining individual elements, and a program load area 163-5. An input unit 164 inputs data of finite element meshing models and instructions. This input unit 164 includes a storage medium such as a floppy disk and a communication line. A ROM 165 stores procedures of the CPU 162. Normally, the input unit 164 inputs data and instructions, and the CPU 162 extracts free faces and free edges from the input finite element meshing models in accordance with the input instructions and the procedures stored in the ROM 165 and displays the results on the display unit 161.

Figure 47B:
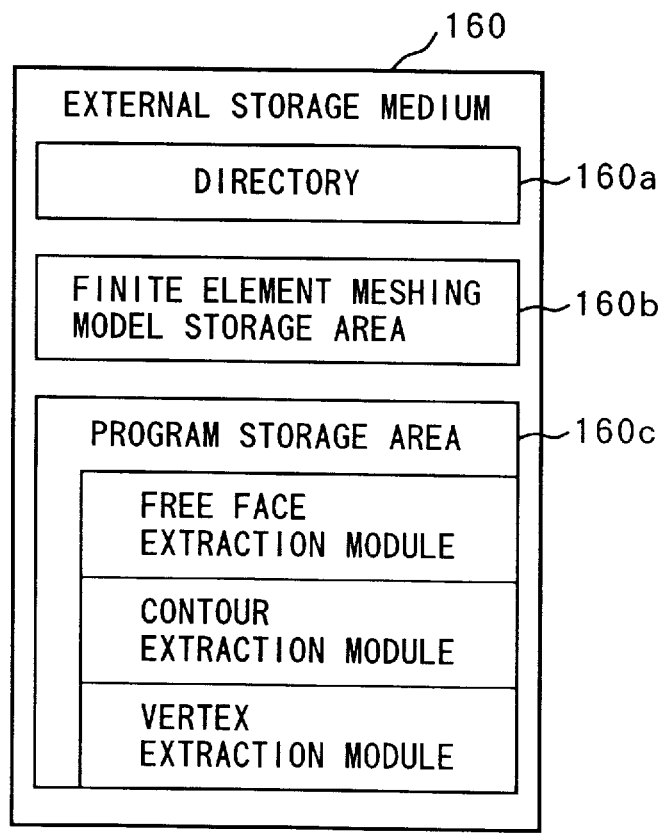
FIG. 47B is a view showing an example of the configuration of an external storage medium used when data and programs are loaded in a RAM 163 in FIG. 47A.
Figure 48:
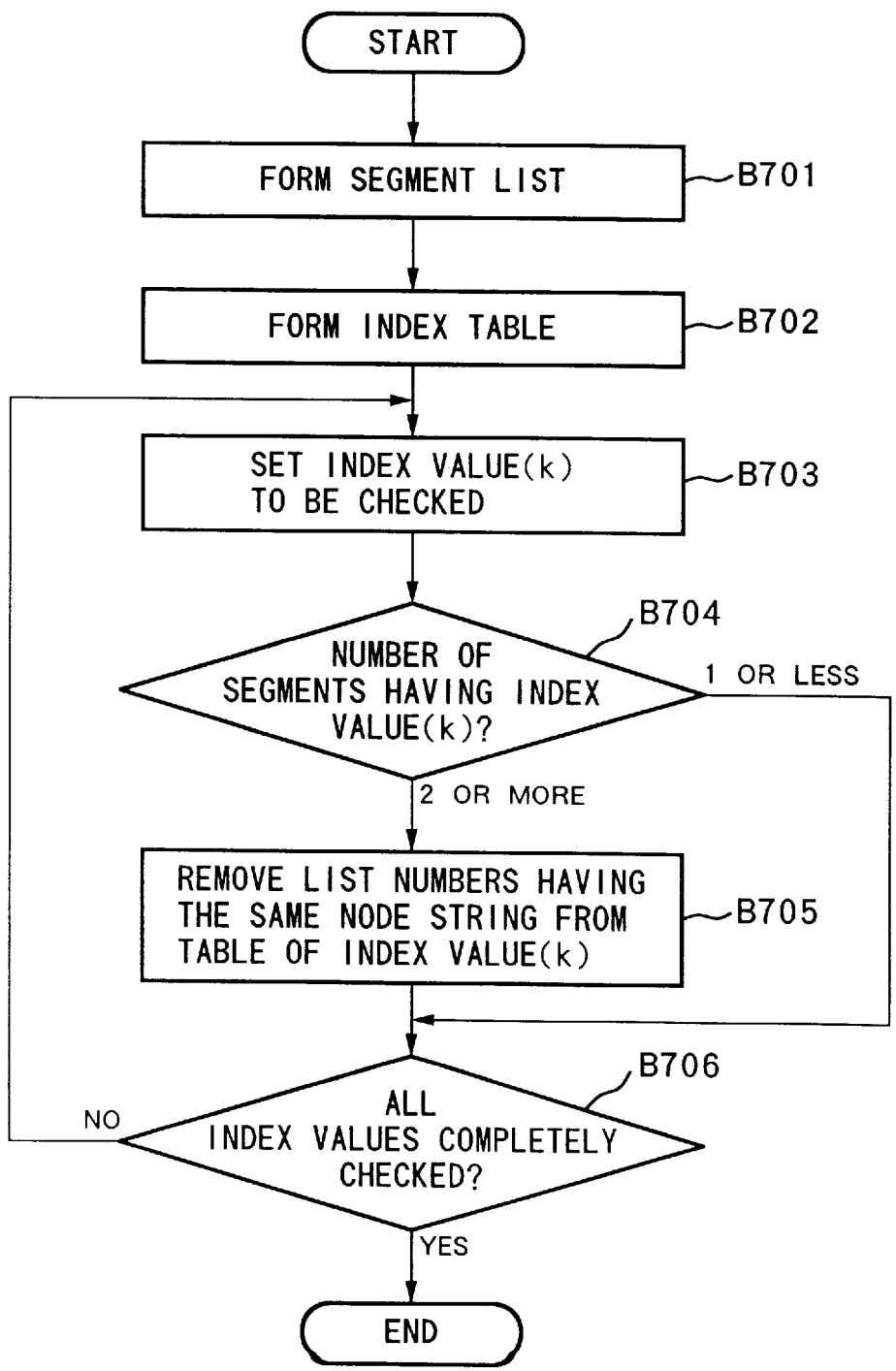
FIG. 48 is a flow chart for explaining one prior art.

When data or programs are downloaded from an external storage medium 160, the external storage medium 160 has a configuration such as shown in FIG. 47B which includes a directory 160*a*, a finite element meshing model storage area 160*b*, and a program storage area 160*c* consisting of a free face extraction module, a contour extraction module, and a vertex extraction module.

(Seventh Embodiment)

FIGS. 28 to 31 illustrate the flows of processing of extracting segments not shared by a plurality of elements according to this embodiment. FIGS. 32A and 32B show the formats of a segment list and an index table formed in this embodiment.

In this embodiment, as illustrated in FIG. 32A, the segment list is constituted by three items, "list number", "element number", and "local segment number". This list is identical with conventional segment lists except the order of segments registered in the list and the method of expressing segments in the list. Accordingly, the number of rows in this list is given by expression (3) presented earlier. The differences of this list from conventional lists will be described below.

First, in this list segments having the same index value (the sum of node numbers constituting a segment as in conventional lists) are registered in consecutive list numbers. For example, segments are registered in increasing order of index value with respect to list numbers. Also, in this list, one segment is expressed by an element number and a local segment number. This will be described in detail below.

Generally, strings of node numbers constituting elements of an element meshing model are registered in a memory in accordance with a fixed definition predetermined in accordance with the shapes of elements. Accordingly, for all segments in an element, the combination of nodes constituting a segment is uniquely determined from the node number string registered in the memory. Therefore, by previously assigning numbers (called local segment numbers) to all segments for each element shape, a node string constituting a segment can be uniquely obtained from the segment number of the segment.

Details of this will be described below with reference to FIGS. 33, 34A, and 34B.

Figure 33:
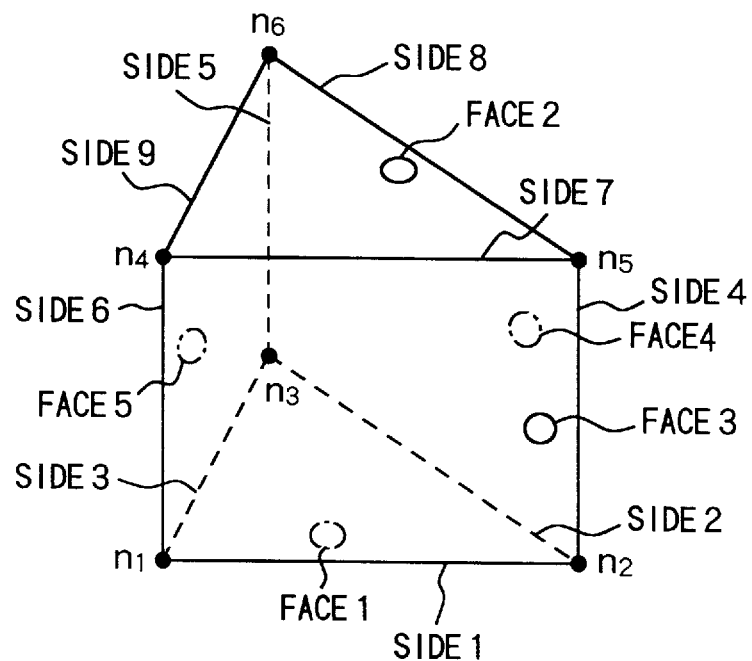
FIG. 33 is a view for explaining segments in the seventh embodiment.

FIG. 33 shows a triangular prism element consisting of nodes $n_1$ to $n_6$. Assume that the nodes of this triangular prism element are always registered in a memory in the order of $n_1$, $n_2$, $n_3$, $n_4$, $n_5$, and $n_6$. That is, the nodes of the bottom-surface triangle are first registered, the nodes of the top-surface triangle are then registered, and the first and fourth registered nodes are connected through one side. Also, the direction of rotation (registration) of the nodes on the bottom surface is the same as that on the top surface. Accordingly, faces constituting this element are five faces shown in FIG. 34A. Therefore, face numbers 1 to 5 as shown in FIG. 34A are assigned to these five faces. FIG. 33 shows the numbers of the five faces thus assigned in FIG. 34A.

Assuming that $n_1$ to $n_6$ are general node numbers, each face in FIG. 34A can be regarded as a face constituted by nodes registered in locations corresponding to $n_1$ to $n_6$ in a memory. As an example, the face number 1 can be regarded as a face constituted by nodes registered first, second, and third in a memory. Accordingly, in any triangular prism element, it is possible to uniquely obtain the combination of nodes constituting a face by specifying the face number of the face.

This also holds for sides and other general segments. FIG. 34B shows node strings of sides constituting the triangular prism element, and side numbers assigned to these sides are illustrated in FIG. 33. For example, the side number 1 indicates a side consisting of nodes ($n_1$ and $n_2$) registered first and second in a memory.

As described above, all segments can be expressed by using the element numbers and the local segment numbers of the segments, and nodes constituting each segment can be obtained from these two data. That is, for any segment it is only necessary to register the two data in the segment list.

The index table used in this embodiment will be described next. As illustrated in FIG. 32B, the index table consists of three items, "index value", "number of corresponding segments", and "first list number". Index values are consecutive integral values starting from 1, as in conventional index tables, and are used as addresses indicating row numbers in the table. The addresses are made correspond to the index values of segments. Accordingly, the number of rows required in this table is given by the same expression (4) as in conventional tables. In this embodiment, this table registers the number (the number of corresponding segments) of segments having each index value and the first list number indicating the first address in the segment list which corresponds to the index value.

This will be described in detail below. In the following description, numerals and characters in parentheses indicate the correspondence to FIGS. 32A and 32B.

As already described, in the segment list of this embodiment, segments having the same index value are sequentially registered in consecutive list numbers. The number of corresponding segments and the first list number in this index table indicate the number of segments having each index value and the first row number in the list in which these segments are registered. Accordingly, when a certain segment is given, segments having the same index value as the given segment can be easily retrieved by using the segment list and the index table.

More specifically, an index value (=3) is calculated from nodes of a given segment, and the row of the calculated index value in the index table is referred to. Consequently, the number (=2) of segments having the same index value as the given segment and the first list number (=1) are obtained. The individual segments can be known by referring to the number of corresponding segments (=2) of rows starting with the first list number (=1) in the segment list. Note that the segments herein identified are given in the form of an element number and a local segment number. As described previously, however, these segments can be readily converted into strings of node numbers constituting the segments by referring to strings of node numbers constituting elements registered in a memory and to the assignment of local segment numbers.

The procedure of forming the segment list and the index table and the flow of processing of extracting segments not shared by a plurality of elements by using these list and table will be described below with reference to FIG. 28.

Figure 28:
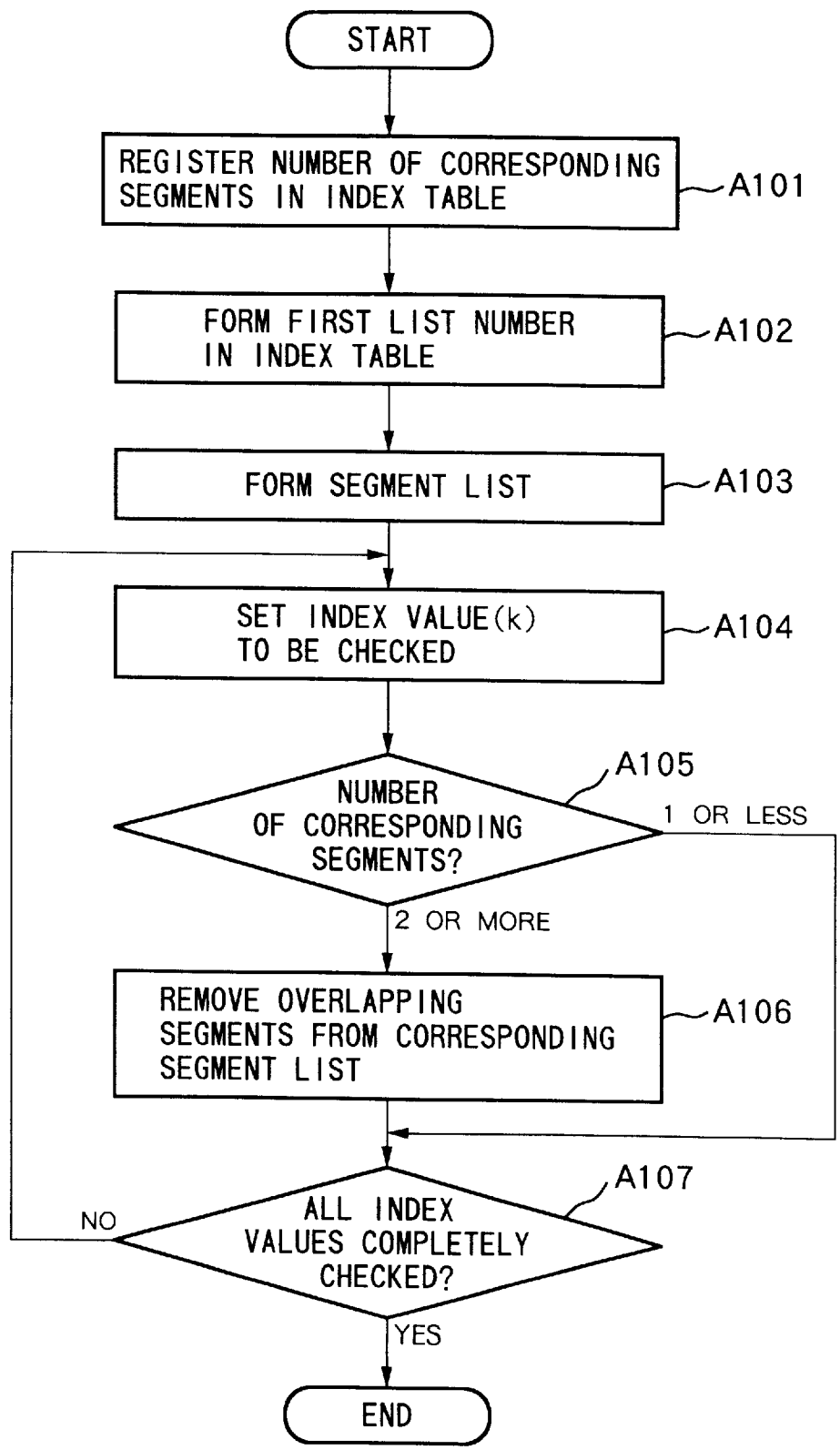
FIG. 28 is a flow chart showing the process flow in the seventh embodiment.
Figure 29:
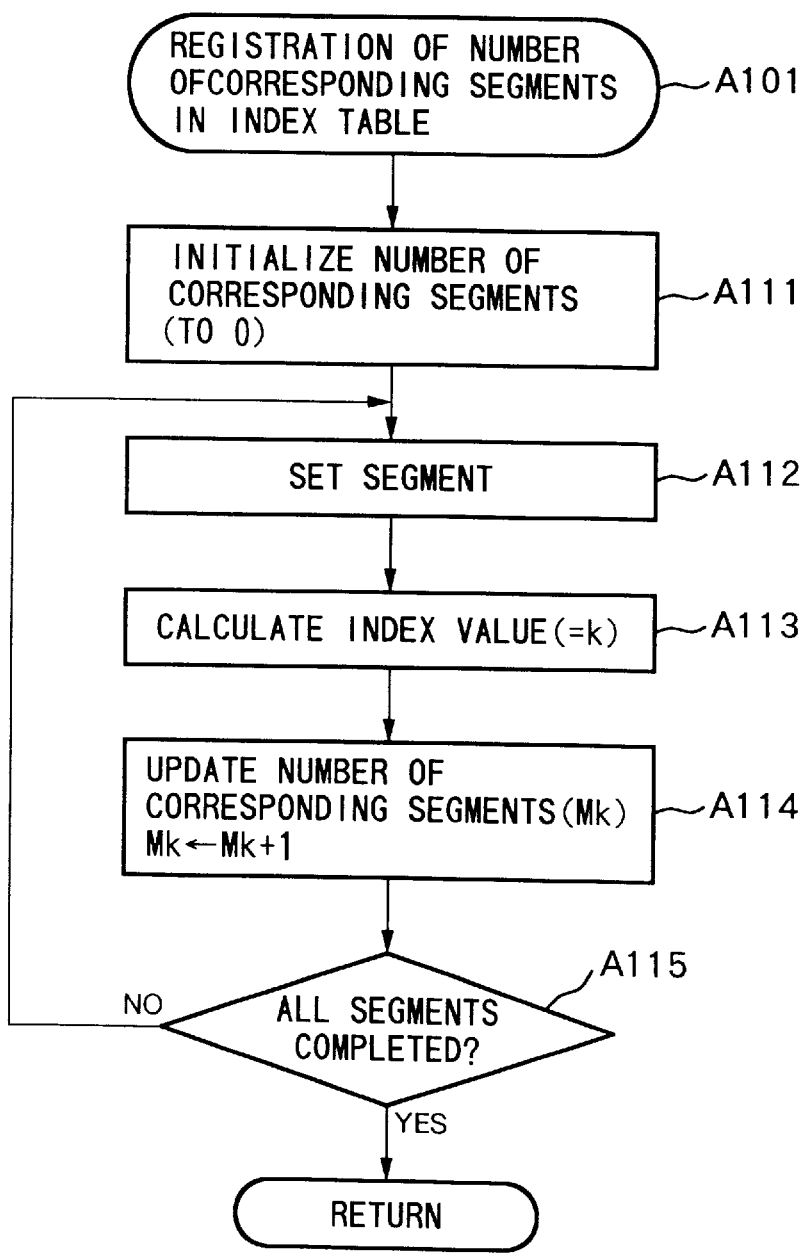
FIG. 29 is a flow chart showing a detailed process flow in A101 in FIG. 28.

In steps A101 to A103 in FIG. 28, the segment list and the index table are formed. Details of step A101 are shown in FIG. 29. The processing in step A101 is to obtain the number of segments having each index value and register the number in the item "number of corresponding segments" of each index value in the index table. In this processing, all values in the item "number of corresponding segments" in the index table are initialized to 0 in step A111. Segments are set in step A112, and the index value (=k) of each segment is calculated in step A113. In step A114, each calculation is done by updating the value ($M_k$) of the number of corresponding segments of the corresponding index value to a new value (a value larger than the old value by 1, i.e., ($M_k$+1)).

Figure 30:
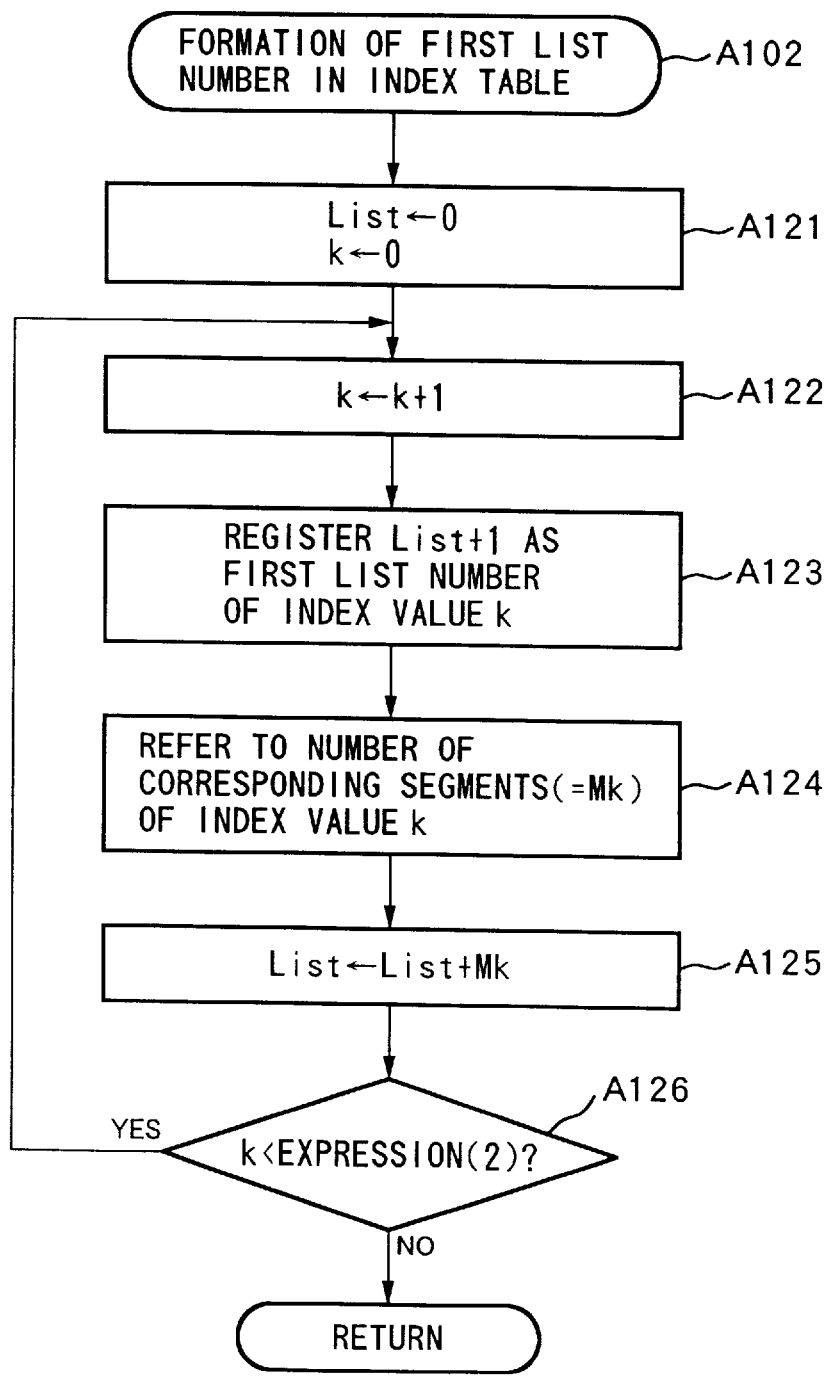
FIG. 30 is a flow chart showing a detailed process flow in A102 in FIG. 28.

Details of step A102 in FIG. 28 are shown in FIG. 30. The number of segments having each index value is found in the processing in step A101. In this processing, therefore, the first list number is calculated so that these segments are consecutively registered (without any empty row) in the segment list. FIG. 30 is a procedure of arranging segments in the segment list in order of increasing index value. In processing from step A121 to step A126, as the first list number of the kth row in the index table, the sum (obtained by adding all) of the numbers of corresponding segments in the first to the (k−1)th rows in the index table is calculated and a value obtained by adding 1 to the sum is registered in step A123.

Figure 31:
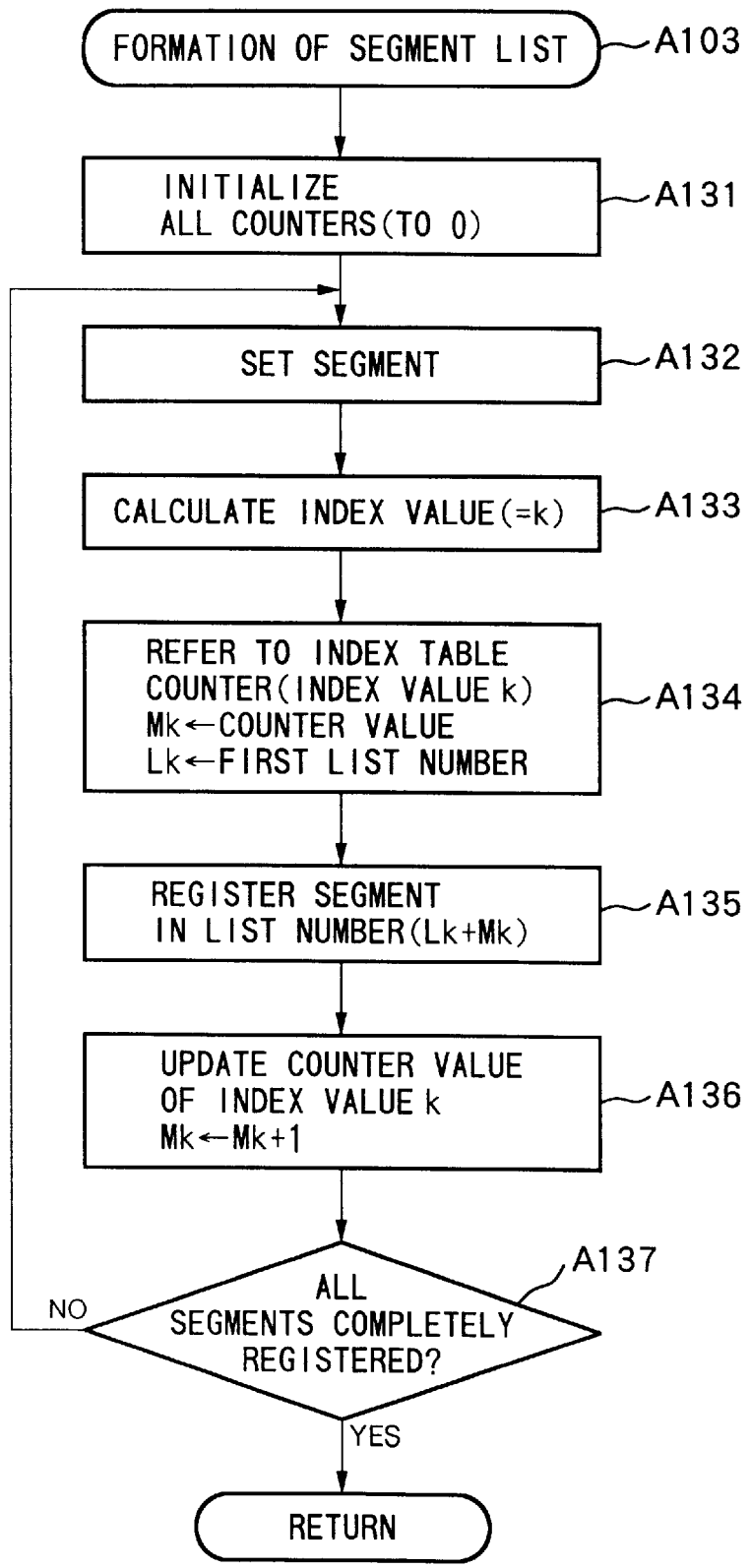
FIG. 31 is a flow chart showing a detailed process flow in A103 in FIG. 28.

FIG. 31 shows the details of step A103 in FIG. 28. In FIG. 31, a segment list is formed by using the index table formed in steps A101 and A102. Prior to the formation of the list, counters are prepared for the individual index values in the index table and initialized to 0 in step A131. In steps A132 and A133, index values (=k) of segments of each element are calculated. In step A134, the first list number ($L_k$) and the counter value ($M_k$) of each index value are obtained from the index table and the counter. In step A135, the element number and the local segment number of the segment are registered in a row (($L_k+M_k$)th row) of the segment list at an address calculated by adding the counter value to the first list number. In step A136, the counter value ($M_k$) of the index value k is updated to a value ($M_k+1$) larger by 1.

In this manner, all segments are arranged in the increasing order of index value from the first row in the segment list without any empty row.

In this embodiment, a counter memory is additionally provided for each index value. However, the memory for the numbers of corresponding segments in the index table can also be temporarily used for the purpose. That is, in step A131, all values in the item "number of corresponding segments" in the index table are initialized to 0. In the processing from step A132 to step A137, this item "number of corresponding segments" is used as the counter. After index values are calculated in steps A132 and A133, the counter value (the value $M_k$ of the item "number of corresponding segments") and the first list number ($L_k$) in the kth row of the index table are obtained in step A134. In step A135, the segment is registered in the row (($L_k+M_k$)th row) of the segment list at an address obtained by adding the counter value to the first list number. In step A136, the counter value (the value of the item "number of corresponding segments") is incremented by 1 each time a segment is registered. Note that when all segments are registered, the counter value is equal to the value of the number of corresponding segments before the initialization in step A131. Therefore, even when this memory for the number of corresponding segments is temporarily used as the counter, no postprocessing for restoring the number of corresponding segments is necessary. By substituting the counter with the memory of the number of corresponding segments, it is possible to use the memory only for the segment list and the index table and to thereby save the memory.

Note that segments are arranged in the order of increasing index value in this embodiment, but it is also possible to arrange segments in the decreasing order of index value. This is accomplished by adding the values of the numbers of corresponding segments from the row of the maximum index value to the row of the minimum in the process (FIG. 30) of forming the first list number of the index table. More specifically, changes to be made in FIG. 30 are "k← calculated value by expression (2)" in the processing in step A121, "k← (k−1)" in step A122, and "k>1" in step A126.

The process of extracting segments not shared by a plurality of elements by using the segment list and the index table formed will be described below. This process is shown in steps A104 to A107 in FIG. 28. The process will be described with reference to FIG. 28.

In step A104, an index value (=k) as an object to be checked is set. In step A105, the number of corresponding segments in the kth row of the index table is checked. If the number is 1 or less, it is determined that there are no identical segments having this index value. Therefore, the flow advances to step S107 without performing anything. If two or more corresponding segments are present, the first list number ($L_k$) and the number of corresponding segments ($M_k$) are obtained from the index table. Whether overlapping segments exist in the $M_k$ rows starting from the row $L_k$ in the segment list is checked by comparing the constituent nodes.

If overlapping segments exist, both of the overlapping segments are removed from the segment list in step A106. This removal is done by updating the corresponding element numbers in the segment list to some numerical value, such as 0 or a negative number, which is not possible as the element number. In step A107, whether the operation in steps A104 to A106 is completely performed for all index values is checked. If the operation is not completed, the flow returns to step A104 to repeat the processing until the extraction process is completed. When this process is completed, segments having proper element numbers in the segment list are segments not shared by a plurality of elements.

The above process of extracting segments not shared by a plurality of elements will be described in detail below by taking a process of extracting free faces from a practical simple element meshing model as an example.

Figure 35:
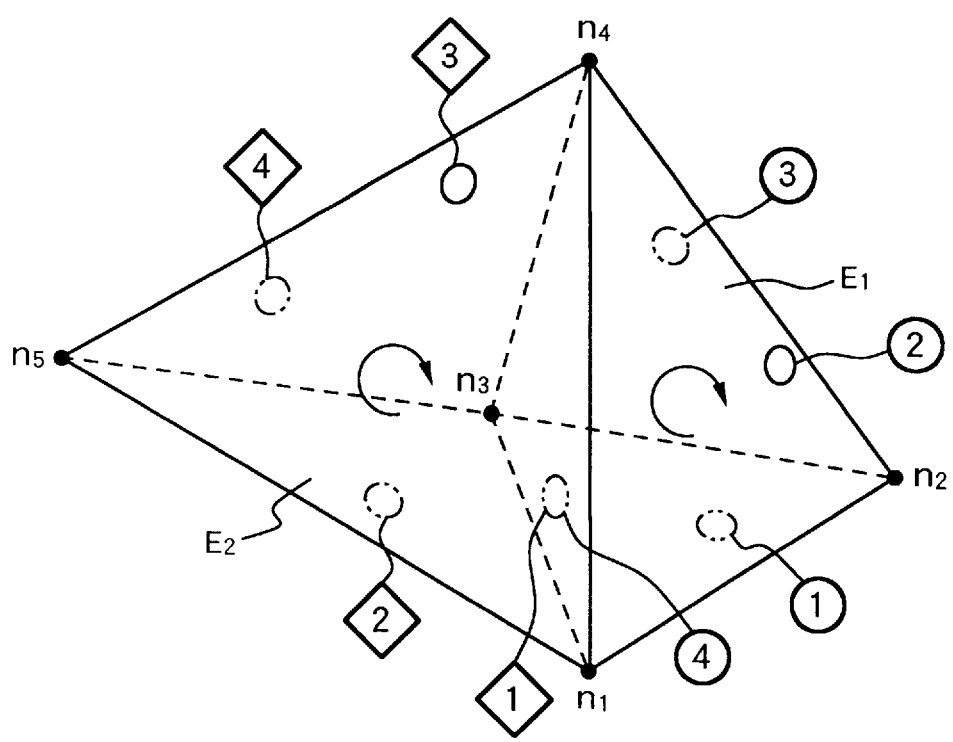
FIG. 35 is a view for explaining practical processing when segments are faces in the seventh embodiment.

FIG. 35 shows the same meshing model as used in "BACKGROUND OF THE INVENTION", which consists of two tetrahedral elements. Assume that nodes constituting these elements are registered in a memory as shown below.

E1: $n_1-n_2-n_3-n_4$

E2: $n_3-n_1-n_4-n_5$

The node numbers of the two elements are registered in accordance with the same rule. That is, the direction of rotation of the nodes registered first, second, and third is such that when a right-handed screw is rotated in that direction, the screw advances toward the barycenter of the element.

The numbers of faces constituting the tetrahedral element, e.g., the element E1, are defined as follows.

face 1: nodes $n_1-n_2-n_3$(index value: 6 (=1+2+3))

face 2: nodes $n_1-n_4-n_2$(index value: 7)

face 3: nodes $n_2-n_4-n_3$ (index value: 9)

face 4: nodes $n_3-n_4-n_1$ (index value: 8)

Accordingly, the relationship between the faces constituting the element E2 and the face numbers is as follows.

face 1: nodes $n_3-n_1-n_4$ (index value: 8)

face 2: nodes $n_3-n_5-n_1$ (index value: 9)

face 3: nodes $n_1-n_5-n_4$ (index value: 10)

face 4: nodes $n_4-n_5-n_3$ (index value: 12)

The values in the parentheses are index values of the faces.

The faces of the element E2 are formed in exactly the same way as when the combinations of the nodes of the individual faces constituting the element E1 are formed from the constituent node strings of the element E1 in a memory. As an example, the nodes of the face 1 are obtained by arranging the first to third node numbers in the memory.

In FIG. 35, the face numbers in the element E1 are enclosed by circles, and those in the element E2 are enclosed by squares.

FIGS. 36A and 36B illustrate a segment (face) list and an index table formed for this meshing model. The procedure of forming these list and table will be described below.

(1) The item "number of corresponding faces" in the index table is formed (FIG. 29). In step A111, all values in the item "number of corresponding faces" of the index table are initialized to 0. In step A113, an index value (=6) of the face 1 of the element E1 is calculated. In step A114, the value of the number of corresponding faces in the sixth row of the index table is updated to a value larger by 1 (←0+1). When this update is completely performed for all faces of the elements E1 and E2, the values of the numbers of corresponding faces in FIG. 36B are obtained.

(2) The item "first list number" in the index table is then formed (FIG. 30). That is, the numbers of corresponding faces are added in the order of increasing index value, and the sum (the value obtained by adding all numbers of corresponding faces) of the numbers of corresponding faces in the first to the (k−1)th rows is registered in the kth row of the index table. By this processing, the values of the first list numbers in FIG. 36B are obtained.

(3) The face list is formed (FIG. 31). In this processing, all values of the numbers of corresponding faces (to be used as counters) in the index table are initialized to 0 in step A131. In step A133, index values are sequentially calculated from the face 1 of the element E1. In step A134, the first list number and the counter value (the value in the item "number of corresponding faces") are referred to by using each calculated value. In step A135, each face is registered in the corresponding row of the face list. For example, the index value of the face 1 of the element E1 is 6. Therefore, the first list number (=1) and the counter value (=0) in the sixth row of the index table are referred to, and the face (face number 1 in the element E1) is registered in the first (=1+0) row of the face list. After the registration, in step A136, the counter value of this index value is updated to a value obtained by adding 1 to the old value. In this example, the counter value (the value of the number of corresponding faces) in the sixth row of the index table is updated from 0 to 1. The face list in FIG. 36A is obtained by performing the above operation for all segments.

After the face list and the index table are thus formed, free faces are extracted. This processing is done by removing faces shared by a plurality of elements from the face list formed. The procedure of this processing will be described below.

(4) In step A104, the index value 1 is set as an object to be checked (FIG. 28).

(5) In steps A105, A152, A107, and A151, the first row in the index table is referred to, and the flow advances to setting of the next index value without performing anything because the value in the item "number of corresponding faces" is 0 in the first row.

(6) Nothing is performed for the index values 2 to 7 since each corresponding segment is 1 or less.

(7) The index value 8 is set as an object to be checked.

(8) In step A105, the eighth row in the index table is referred to, and it is found that the number of corresponding faces is 2. Therefore, overlapping of the two faces is checked. First, the first list number (=3) in the index table is referred to, and from this number, the corresponding rows, i.e., the third and fourth rows (two rows because the number of corresponding faces is 2) in the face list are referred to. Consequently, it is found that the face 4 of the element E1 and the face 1 of the element E2 correspond to the index value 8. When the element numbers and the face numbers are converted into the constituent node numbers (this conversion can be readily performed as already described above), it is found that both of the two faces consist of nodes $n_1$, $n_3$, and $n_4$. Therefore, these faces are not free faces and removed from the face list. More specifically, the element numbers in the third and fourth rows of the face list are changed to 0.

(9) The index values 9 to 12 are similarly checked. Although the index value 9 has two corresponding faces (the face 3 of the element E1 and the face 2 of the element E2), their constituent node numbers are different. All numbers of corresponding faces of other index values are 1 or less. As a result, no face is removed from the list.

As a result of the above processing, faces except for those in the third and fourth rows are extracted as free faces from the face list in FIG. 36A.

Figure 37:
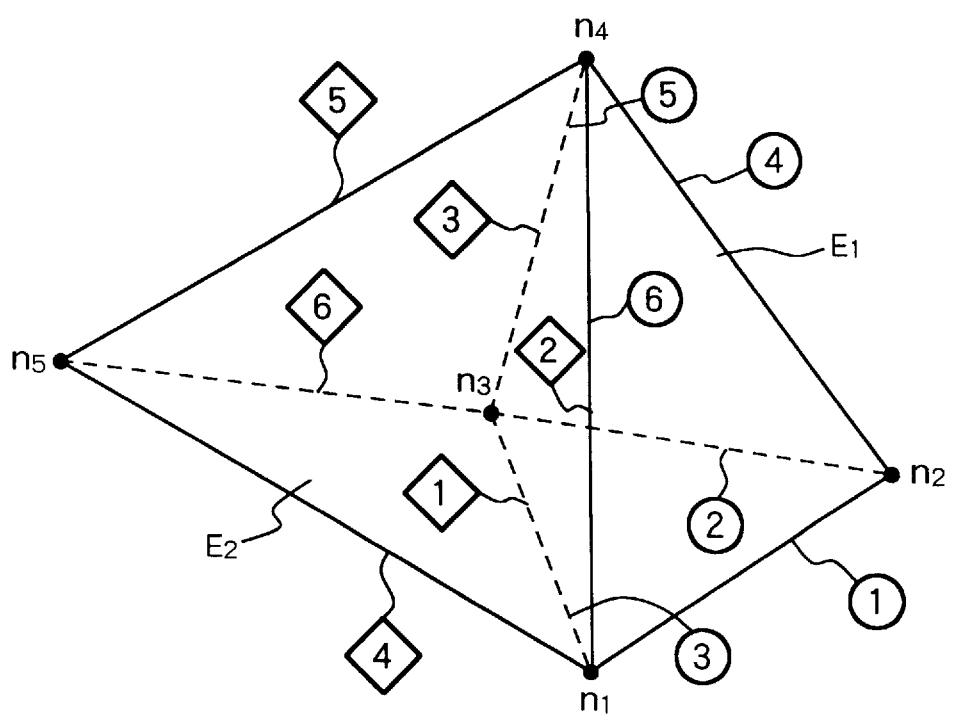
FIG. 37 is a view for explaining practical processing when segments are sides in the seventh embodiment.

A process example of extracting free edges from the meshing model consisting of two tetrahedral elements herein used will be described below. FIG. 37 shows the numbers of sides constituting the individual elements. In FIG. 37, local side numbers in the elements E1 and E2 are enclosed with circles and squares, respectively. As in the case of the free face extraction, the side numbers and the constituent nodes of each element are regularly assigned from constituent node strings in a memory. The node numbers constituting the sides of these elements and the index value of each side are as follows.

Element E1
    side 1: nodes $n_1$–$n_2$ (index value: 3 (=1+2))
    side 2: nodes $n_2$–$n_3$ (index value: 5)
    side 3: nodes $n_3$–$n_1$ (index value: 4)
    side 4: nodes $n_2$–$n_4$ (index value: 6)
    side 5: nodes $n_3$–$n_4$ (index value: 7)
    side 6: nodes $n_1$–$n_4$ (index value: 5)
Element E2
    side 1: nodes $n_3$–$n_1$ (index value: 4 (=1+3))
    side 2: nodes $n_1$–$n_4$ (index value: 5)
    side 3: nodes $n_4$–$n_3$ (index value: 7)
    side 4: nodes $n_1$–$n_5$ (index value: 6)
    side 5: nodes $n_4$–$n_5$ (index value: 9)
    side 6: nodes $n_3$–$n_5$ (index value: 8)

FIGS. 38A and 38B illustrate a segment (side) list and an index table, respectively, formed for this meshing model. The procedure of forming these list and table will be described below. This procedure is nearly identical with the processing of forming the list and the table when free faces are extracted.

(1) The item "number of corresponding sides" in the index table is formed (FIG. 29). In step A111, all values in the item "number of corresponding sides" in the index table are initialized to 0. In step A113, the index value (=3) of the side 1 of the element E1 is calculated. In step A114, the value of the number of corresponding sides in the third row of the index table is updated to a value (1←0+1) larger by 1. When this update is completely performed for all sides of the elements E1 and E2, the values of the numbers of corresponding sides in FIG. 38B are obtained.

(2) The item "first list number" in the index table is formed (FIG. 30). That is, the numbers of corresponding sides are added in the order of increasing index value, and the sum (the value obtained by adding all numbers of corresponding sides) of the numbers of corresponding sides in the first to the (k−1)th rows is registered in the kth row of the index table. By this processing, the values of the first list numbers in FIG. 38B are obtained.

(3) The side list is formed (FIG. 31). In step A131, all values of the numbers of corresponding sides (to be used as counters) in the index table are initialized to 0. In step A133, index values are calculated from the side 1 of the element E1. In step A134, from each calculated index value, the first list number and the counter value (the value in the item "number of corresponding sides") are referred to. In step A135, the side is registered in the corresponding item of the side list. For example, the index value of the side 1 of the element E1 is 3. Accordingly, the first list number (=1) and the counter value (=0) in the third row of the index table are referred to, and the side (the side number 1 of the element E1) is registered in the first (=1+0) row of the side list. After the registration in step A135, the counter value (the value in the item "number of corresponding sides") of this index value is updated to a value obtained by adding 1 to the old value in step A136. In this example, the counter value (number of corresponding sides) in the third row of the index table is updated from 0 to 1. The list shown in FIG. 38A is obtained by performing the above operation for all segments.

After the side list and the index table are thus formed, free edges are extracted. This processing is done by removing sides shared by a plurality elements from the side list formed. The procedure of this processing will be described below.

(4) The index value 1 is set as an object to be checked (step A104 in FIG. 28).

(5) In steps A105, A152, A107, and A151, the first row in the index table is referred to, and the flow advances to setting of the next index value without performing anything because the value in the item "number of corresponding sides" is 0 in the first row.

(6) Nothing is performed for the index values 2 and 3 since each corresponding segment is 1 or less.

(7) The index value 4 is set as an object to be checked.

(8) In step A105, the fourth row in the index table is referred to, and it is found that the number of corresponding sides is 2. Therefore, overlapping of the two sides is checked. First, the first list number (=2) in the index table is referred to, and from this number the corresponding rows, i.e., the second and third rows (two rows because the number of corresponding sides is 2) in the side list are referred to. Consequently, it is found that the side 3 of the element E1 and the side 1 of the element E2 are sides corresponding to this index value. When the element numbers and the side numbers are converted into the constituent node numbers, it is found that both of the two sides consist of nodes $n_1$ and $n_3$. Therefore, these sides are not free edges and removed from the side list. More specifically, the element numbers in the second and third rows of the side list are changed to 0.

(9) The index values 5 to 9 are similarly checked. As a consequence, the list numbers 5, 6, 9, and 10 in the side list are removed.

As a result of the above processing, sides in the rows 1, 4, 7, 8, 11, and 12 in the side list shown in FIG. 36A are extracted as free edges.

In the above processing, each segment in the segment list is expressed by two integral values, the element number and the local segment number, and memories of two integers are used for one segment. However, this processing can also be performed by using only one memory. That is, the local segment number is necessarily equal to or smaller than the number of segments constituting one element. Therefore, each segment is registered by expressing it by SG in equation (10) below:

$$SG=(element\ number)\times(\alpha+1)+(segment\ number) \quad (10)$$

where $\alpha$ is an integral value to or smaller than the number of segments per element Note that the element number and the segment number can be restored from this expression by using the following equations:

$$element\ number=SG/(\alpha+1) \quad (11)$$

$$segment\ number=MOD(SG,\ \alpha+1) \quad (12)$$

(remainder obtained by dividing SG by $(\alpha+1)$

The element number in equation (11) is an integral value obtained by chopping the figures below the decimal point of the calculated value on the right side.

If a model contains several element shapes, different shapes have different numbers of segments. If this is the case, the maximum value can be taken as a.

Also, the segment numbers start from 1 in the above explanation, but the numbers can start from 0. In this case, $(\alpha+1)$ in equations (10) to (12) is changed to $\alpha$.

By expressing each segment by one integral value, the memories used by the segment list are reduced by one-half.

Analogously, the number of corresponding segments and the first list number in the index table can also be represented by one integral value. According to the experience of the present inventors, the number of segments which one index value has in normal meshing models is 10 or less. That is, the number of corresponding segments is an integral value of 10 or less, and the number of corresponding segments and the first list number can be expressed by AD in equation (13) below:

$$AD=(first\ list\ number)\times\beta+(number\ of\ corresponding\ segments) \quad (13)$$

where $\beta$ is an integer of 10 or more.

Note that the number of corresponding segments and the first list number can be restored from this expression by using the following equations:

$$first\ list\ number=AD/\beta \quad (14)$$

$$number\ of\ corresponding\ segments=MOD(AD,\beta)\ (remainder\ obtained\ by\ dividing\ AD\ by\ \beta) \quad (15)$$

The first list number in equation (14) is an integral value obtained by chopping the figures below the decimal point of the calculated value on the right side.

When the number of corresponding segments and the first list number in the index table are represented by one integral value as described above, the memories to be used are further reduced.

Necessary memories when this method is used in the case described in "BACKGROUND OF THE INVENTION" in which free faces are extracted from a meshing model consisting of 1,000,000 hexahedral elements and 1,000,000 nodes will be described below.

Memories required by the face list are 24 Mbytes (4×6,000,000) since segment information per segment is one integer (4 bytes) and the number of rows in the list is the same value, 6,000,000, as in the conventional method. Memories required by the index table are approximately 16 Mbytes (4×4,000,000) since a memory used per index value is 4 bytes and the number of rows in the table is the same value, approximately 4,000,000, as in the conventional method.

The result is that a total of 40 Mbytes (24M+16M) of memories are necessary for this meshing model. This memory capacity is well achievable by present computers, and so the processing can be done by general computers.

In this embodiment, the method of extracting free faces and free edges from three-dimensional meshing models have been described. However, this method is similarly applicable to extraction of free edges from two-dimensional models and can also be used as a general method of segment extraction.

(Eighth Embodiment) In the seventh embodiment, segments such as free aces and free edges not shared by a plurality of elements are extracted by removing segments shared by a plurality of elements from all segments. These segments shared by a plurality of elements and therefore removed in the seventh embodiment indicate that a plurality of elements are adjacent to each other through each of these segments. In this embodiment, therefore, a method of extracting adjacent elements by using the segment list and the index table formed in the seventh embodiment will be described.

The segment list and the index table used in this embodiment are identical with those formed in steps A101 to A103 of FIG. 28. Accordingly, a description of the formation methods will be omitted and only the method of extracting adjacent elements will be described.

Figure 39:
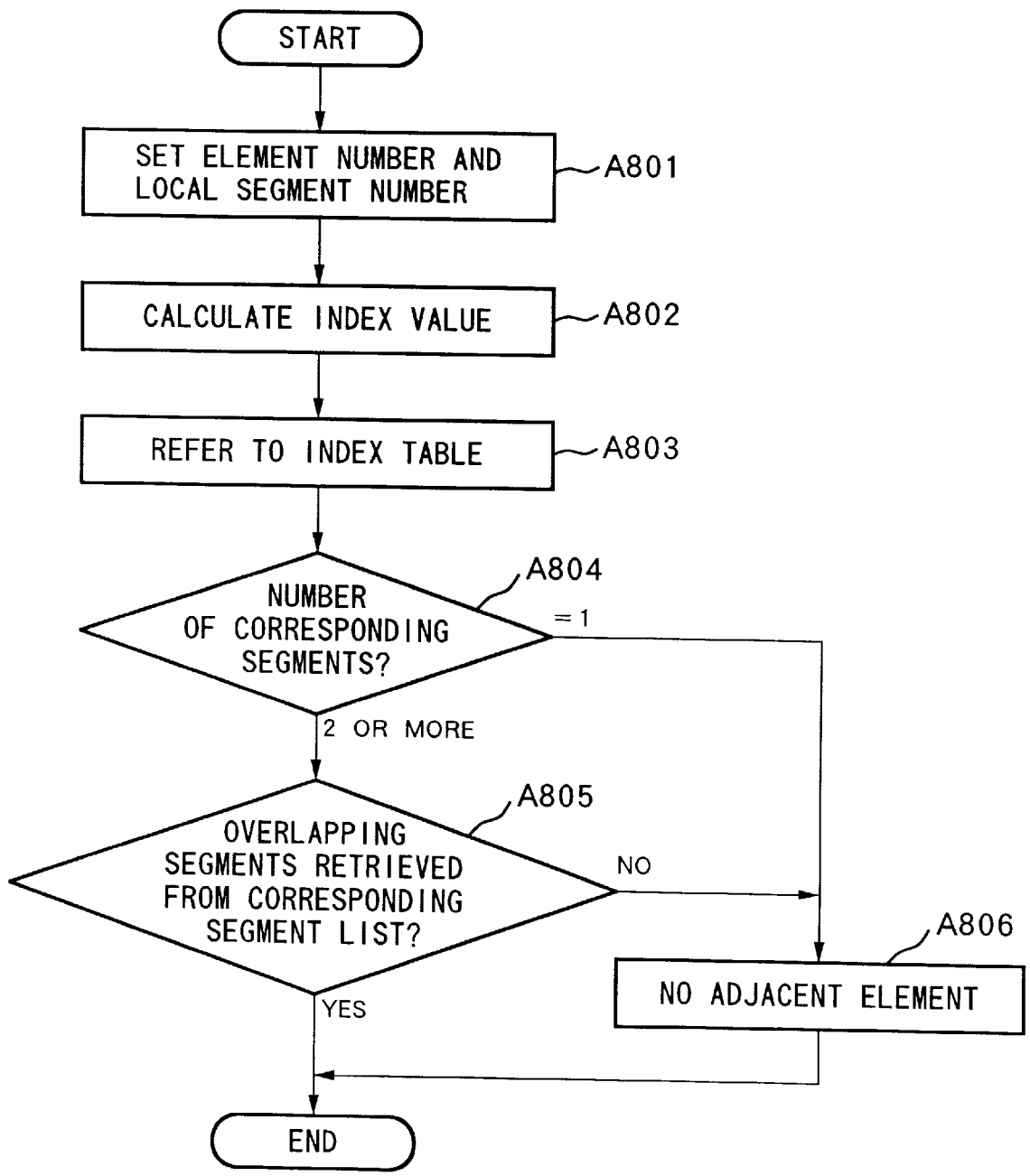
FIG. 39 is a flow chart showing the process flow in the eighth embodiment.

FIG. 39 shows the flow of processing of extracting adjacent elements. This processing is performed after the segment list and the index table are formed.

In step A801, a segment of an element from which adjacent elements are to be extracted is set. That is, the element is specified by an element number ($E_i$) and the segment is specified by a local segment number ($L_i$). Note that the local segment number is the number of a segment in an element explained in the first embodiment. In step A802, the index value ($M_i$) of the segment $L_i$ is calculated. In step A803, the $M_i$th row in the index table is referred to. If the number of corresponding segments is 1, it is determined in step A806 that the segment $L_i$ of the element $E_i$ has no adjacent elements. If the number of corresponding segments is 2 or more, segments consisting of the same nodes as this segment are retrieved by the same method as explained in the first embodiment. If no such segment exists with respect to the segment $L_i$ of the element $E_i$, it is determined in step A806 that no adjacent elements are present. If such a segment exists, an element having this segment is an adjacent element.

This processing will be described in detail below by using a simple element meshing model.

Figure 40:
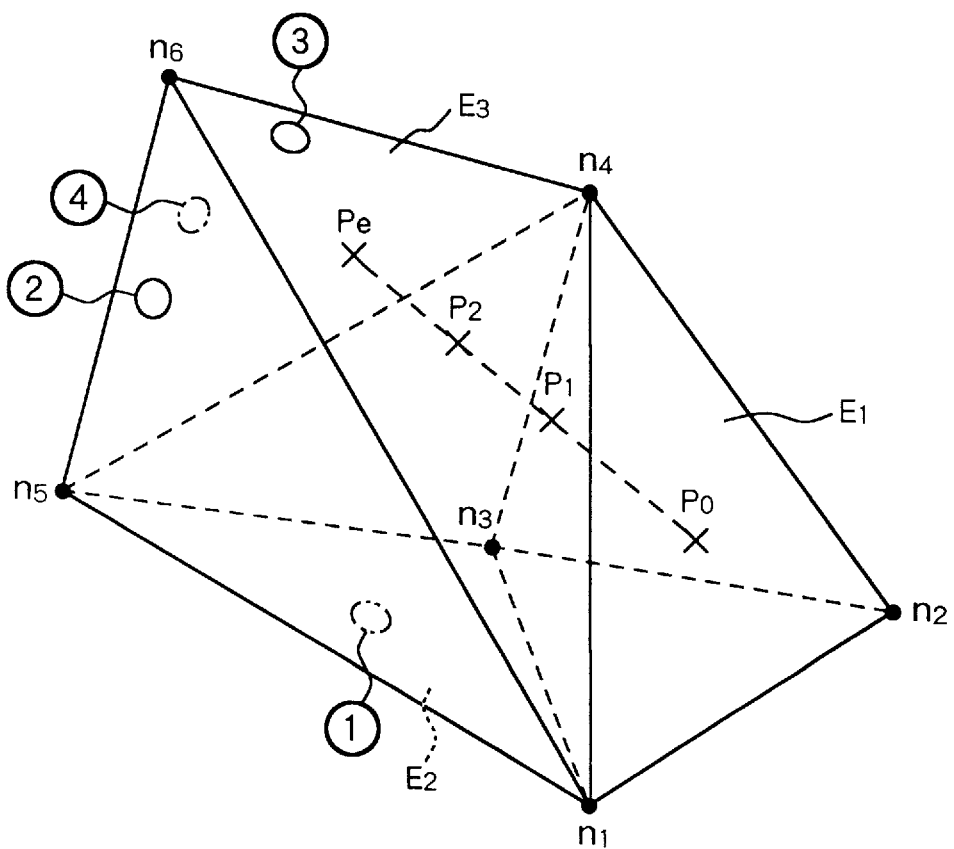
FIG. 40 is a view for explaining practical processing when segments are faces in the eighth embodiment.

FIG. 40 is a meshing model consisting of three tetrahedral elements. This meshing model is formed by adding an element E3 consisting of nodes $n_5$–$n_1$–$n_4$–$n_6$ to the meshing model in FIG. 50. The local numbers in elements E1 and E2 are as shown in FIG. 35. The faces of the element E3 are as presented below. The values in parentheses are index values of these faces.

face 1: nodes $n_5$–$n_1$–$n_4$ (index value: 10)
face 2: nodes $n_5$–$n_6$–$n_1$ (index value: 12)
face 3: nodes $n_1$–$n_6$–$n_4$ (index value: 11)
face 4: nodes $n_4$–$n_6$–$n_5$ (index value: 15)

A process of extracting elements adjacent to the element E3 through the face 1 of the element E3 in this meshing model will be described below.

Prior to the extraction, a face list shown in FIG. 41A and an index table shown in FIG. 41B are formed. Since these list and table are formed by the processing in steps A101 to A103 in FIG. 28, the formation method will be omitted. After the list and the table are formed, the following processing is performed.

(1) In step A802 of FIG. 39, the index value of the face number 1 of the element E3 is calculated. The index value is 10.

(2) In step A803, the tenth row in the index table is referred to.

(3) In step A804, since the number of corresponding faces is 2 and the first list number is 7, the seventh and eighth rows in the face list are referred to, and it is found that faces having this index value is the face number 3 of the element E2 and the face number 1 of the element E3. Therefore, these element numbers and face numbers are converted into node numbers constituting these faces, and it is checked in step A805 whether the two faces are the same. The check result shows that the two faces are the same (both the faces consist of nodes $n_1$, $n_4$, and $n_5$). Consequently, the element E2 is extracted as an adjacent element.

Through this processing it is found that the elements E2 and E3 are adjacent to each other at the local face numbers 3 and 1.

As can be seen from the above description, this method is basically an application of the segment extraction method using the segment list and the index table explained in the first embodiment. Since the segment list and the index table can be formed within short time periods, this method can extract adjacent elements at a high speed.

In this embodiment, the case in which elements are adjacent to each other through a face has been described. However, elements can be adjacent through some other segment. For example, even when elements are adjacent to each through a side or a node (i.e., when elements share a side or a node), these elements can be extracted by the operation shown in FIG. 39. In the case of sides or nodes, however, a plurality of adjacent elements are extracted in step A805 due to the structural feature of meshing models.

(Ninth Embodiment)

In the eighth embodiment, the method of extracting adjacent elements is described. By the use of these extracted adjacent elements, it is readily possible to extract an element including an arbitrary point in a meshing model. In this embodiment, an application of adjacent elements explained in the eighth embodiment to extraction of an element including such a point will be described.

Figure 42:
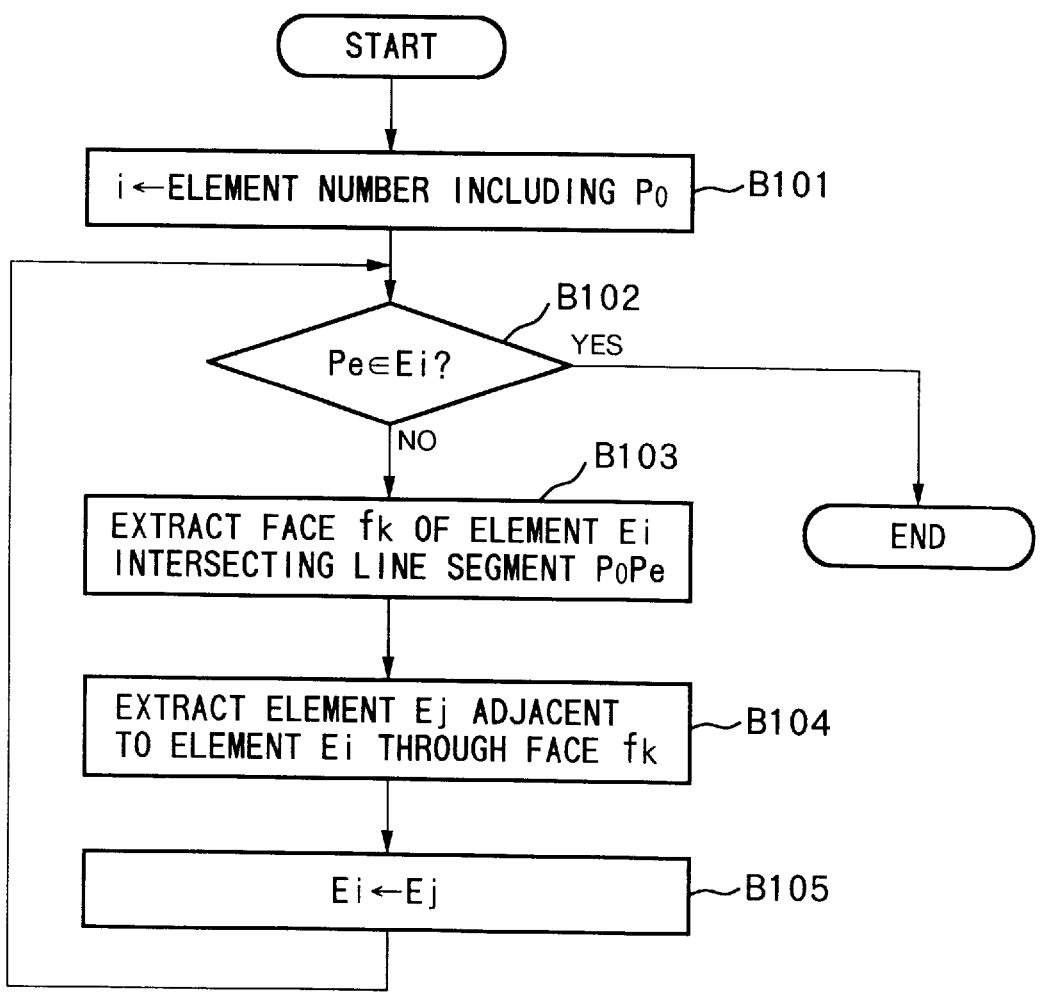
FIG. 42 is a flow chart showing the process flow in the ninth embodiment.

FIG. 42 shows the flow of processing, and the processing will be described by taking extraction of an element including a point $P_e$ in FIG. 40 as an example. In FIG. 40, the point $P_e$ is included in an element E3.

The flow of processing will be described below with reference to FIG. 42.

(1) In step B101 of FIG. 42, a point $P_0$ is set because an element including this point is already known, and i is set as the element number. In FIG. 40, $P_0$ is the barycenter of the element E1. Accordingly, i is 1 in FIG. 42.

(2) In step B102, whether the point $P_e$ is included in the element $E_i$ (E1) is checked. This check can be easily performed by the following procedure.

First, a normal vector A of a face $F_n$ constituting the element $E_i$ is calculated. This normal vector is calculated by equations (16) below:

$$A_x = (y_1 - y_3)(z_2 - z_3) - (y_2 - y_3)(z_1 - z_3)$$
$$A_y = (z_1 - z_3)(x_2 - x_3) - (z_2 - z_3)(x_1 - x_3) \quad (16)$$
$$A_z = (x_1 - x_3)(y_2 - y_3) - (x_2 - x_3)(y_1 - y_3)$$

where $A_x$, $A_y$, and $A_z$ are the components of the normal vector, and $(x_1, y_1, z_1)$f $(x_2, y_2, z_2)$, and $(x_3, y_3, z_3)$ are the coordinate values of three nodes constituting the face $F_n$. Assume that the order of the three nodes is regularly formed from the node numbers registered in a memory as described in the first embodiment. By setting the order of the three nodes in this way, the normal vector points in the same direction with respect to the element $E_i$. For example, the normal vectors of the individual faces point in the direction of the barycenter of all elements in FIG. 40. Therefore, the inclusion is checked by checking the side on which the point $P_e$ is positioned with respect to the normal direction of each face.

That is, the coordinate values of the point $P_e$ are substituted into (x,y,z) of equation (17) below, thereby calculating V:

$$V = A_x(x - x_1) + A_y(y - y_1) + A_z(z - z_1) \quad (17)$$

If V>0, the point $P_e$ is positioned on the normal direction side with respect to the face $F_n$. If V<0, the point $P_e$ is positioned on the side away from the normal direction. If V=0, the point $P_e$ is positioned on the face. In the case of FIG. 40, if V>0, the point $P_e$ is positioned near the barycenter of the element, and, if V<0, the point $P_e$ is positioned outside the element. This V is calculated for all faces constituting the element. If the point $P_e$ is positioned near the barycenter of the element for all faces, it is determined that the point $P_e$ is included in the element $E_i$. If the point $P_e$ is positioned outside the element for one or more faces, it is determined that the point $P_e$ is not included in the element.

(3) In step B103, if the point $P_e$ is not included in the element $E_i$, a face (face number $L_k$) intersecting a line segment $P_0P_e$ of the element $E_i$ is obtained. In FIG. 40, the line segment $P_0P_e$ intersects a face $n_3-n_1-n_4$ at a point $P_1$. The intersecting face is extracted by selecting opposite faces which interpose the points $P_0$ and $P_e$ from the faces constituting the element $E_i$. This is done by substituting the coordinate values of the points $P_0$ and $P_e$ into equation (17) to calculate the respective V values and choosing faces whose two V values have different signs. If the point $P_e$ is not included in the element $E_i$, a face (on the opposite sides of which the points $P_0$ and $P_e$ are positioned) intersecting the line segment $P_0P_e$ necessarily exists.

(4) In step B104, an element ($E_j$) adjacent to the element $E_i$ through the face $L_k$ is obtained. This is performed by the method explained in the eighth embodiment. In FIG. 40, $E_j$ is an element E2.

(5) In step B105, the element $E_i$ is replaced with the adjacent element $E_j$ thus obtained. In step B102, whether the point $P_e$ is included in the element $E_i$ (E2) is checked. If NO in step B102, the flow advances to step B103 to again obtain a face intersecting the line segment $P_0P_e$ of the element $E_i$ (E2). However, in the second and subsequent executions of step B103, the previously obtained faces are excluded from faces to be checked. For example, the face $n_3-n_1-n_4$ of the faces of the element E2 in FIG. 40 is excluded because this face is obtained in the first execution of step B102, and a face $n_1-n_4-n_5$ is obtained.

(6) The processing from step B102 to step B105 is repeated until the element $E_i$ includes the point $P_e$. In FIG. 40, an element E3 is obtained as an adjacent element of the face $n_1-n_4-n_5$ of the element E2, and an element E3 includes the point $P_e$, As described above, this method can extract an element including the point $P_e$ of interest by tracing adjacent elements starting from an appropriate point (in this embodiment the point $P_0$) in a meshing model. According to the experience of the present inventors, this method of tracing adjacent elements proves to reach an element of interest relatively fast because the path of trace is nearly straight. That is, in a meshing model consisting of n elements, an element of interest can be reached by checking the inclusion for approximately the same number of elements as the triple root of n.

In this embodiment, an arbitrary point is set as the start point. If a plurality of points exist in a model, however, it is preferable to extract each succeeding point by using the preceding extracted point as the start point. This is so because if points are sequentially arranged on a curved line, this method shortens the path of tracing adjacent elements and thereby improves the efficiency.

(Tenth Embodiment)

Conventionally, free edges are used as substitutes for contours. In this embodiment, a method of obtaining contours from angles formed by free faces by using the method of obtaining adjacent elements explained in the eighth embodiment will be described.

Figure 43:
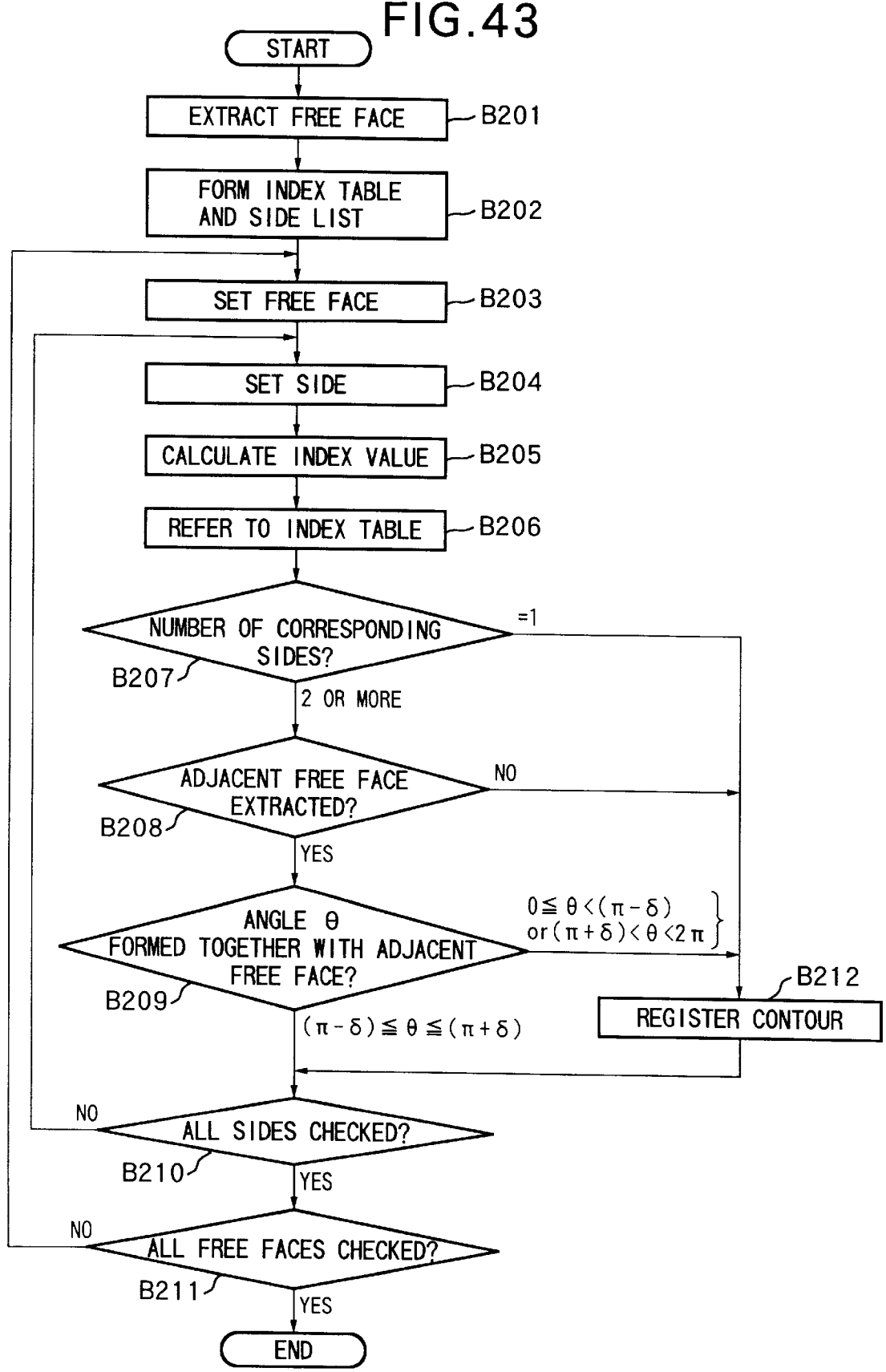
FIG. 43 is a flow chart showing the process flow in the tenth embodiment.

Free faces extracted from a three-dimensional element meshing model consist of two-dimensional elements (film-like elements). Therefore, adjacent two-dimensional elements are obtained for each extracted free face and an angle formed by these two adjacent free faces is calculated, thereby checking whether the edge (the boundary between two elements) is to be registered as a contour. The process of extracting this contour is illustrated in FIG. 43 and will be described below with reference to FIG. 43.

In step B201, free faces are extracted from a meshing model. This processing is already explained in the seventh embodiment and so a description thereof will be omitted. In step B202, a side list and an index table are formed by regarding the extracted free faces as two-dimensional elements. The method of forming these list and table also are already explained in the seventh embodiment. In steps B203 to B208, one ($E_i$) of the free faces is set, and a free face adjacent to this free face through one side ($L_j$) as the boundary is extracted. This processing is done by the method shown in FIG. 39 in the eighth embodiment. In FIG. 43, steps B203 and B204 correspond to step A801, and steps B205 to B208 correspond to steps A802 to A805 in this order.

After the free face adjacent to the free face $E_i$ through the side $L_j$ is extracted, an angle (θ) formed by the two free faces is calculated in step B209. This angle can be calculated by obtaining the normal vectors of the two free faces and calculating the angle formed by these normal vectors. If the angle formed by the normal vectors nearly equals π, nothing is performed because this indicates that the two faces are positioned on an almost one plane. In other cases, the side $L_j$ through which these two faces are adjacent to each other is registered as a contour in step B212. In FIG. 43, whether the angle θ nearly equals π is checked by comparison using a tolerance ∂. If it is determined in step B207 or B208 that the number of corresponding sides is 1 or there is no adjacent free face, it is determined that the side $L_j$ of this free face is a side at an end portion. Accordingly, the side $L_j$ is registered as a contour. All contours can be extracted by executing the above operation for all sides of all free faces.

Figure 44:
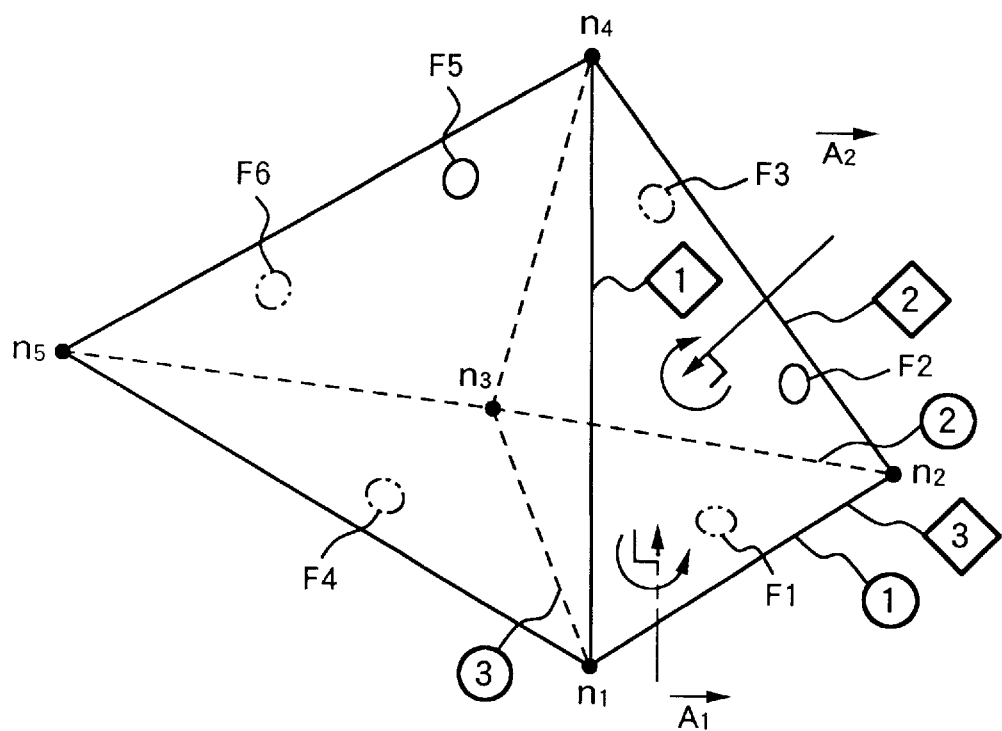
FIG. 44 is a view showing practical processing in the tenth embodiment.

Details of the above operation will be described below by using a simple meshing model illustrated in FIG. 44. Note that this model in FIG. 44 is the same as that shown in FIG. 50.

(1) In step B201 of FIG. 43, six faces presented below are extracted as free faces by the method explained in the seventh embodiment. Element numbers (F1 to F6) as those of two-dimensional elements are assigned to the extracted free faces.

Element F1: nodes $n_1$–$n_2$–$n_3$
Element F2: nodes $n_1$–$n_4$–$n_2$
Element F3: nodes $n_2$–$n_4$–$n_3$
Element F4: nodes $n_3$–$n_5$–$n_1$
Element F5: nodes $n_1$–$n_5$–$n_4$
Element F6: nodes $n_4$–$n_5$–$n_3$ (2) In step B202, a segment list and an index table are formed for the elements F1 to F6 by regarding their sides as segments. Local segment numbers (side numbers) of the elements F1 and F2 are defined as follows, and the side numbers of the individual elements are enclosed by circles and squares in FIG. 44. The segment list and the index table formed are shown in FIGS. 45A and 45B, respectively. Note that FIGS. 45A and 45B illustrate only portions relating to the elements F1 and F2.

Element F1
   side number 1: nodes $n_1$–$n_2$ (index value: 3)
   side number 2: nodes $n_2$–$n_3$ (index value: 5)
   side number 3: nodes $n_3$–$n_1$ (index value: 4)
Element F2
   side number 1: nodes $n_1$–$n_4$ (index value: 5)
   side number 2: nodes $n_4$–$n_2$ (index value: 6)
   side number 3: nodes $n_2$–$n_1$ (index value: 3)

(3) In steps B203 to B208, an element adjacent to the element F1 through the side number 1 of the element F1 as the boundary is obtained. As a result, the element F2 is extracted.

(4) An angle (θ) formed by the elements F1 and F2 is calculated. The calculation of this angle is done as follows.

First, normal vectors (vectors $A_1$ and $A_2$ in FIG. 44) of the two faces are calculated. The normal vectors $A_1$ and $A_2$ are calculated by equations (16) presented earlier. As described in the ninth embodiment, if regularity is given to the order of node numbers constituting a two-dimensional element (free face), this normal vector points in the same direction as in a two-dimensional element in an original three-dimensional element. For example, in FIG. 44, normal vectors of all two-dimensional elements point in a direction in which a right-handed screw advances if the screw is rotated in the order of node numbers constituting the elements, and this direction is toward the barycenter of the original three-dimensional element (tetrahedral element). This indicates that all normal vectors point the inside of the model on the surfaces of the model.

Accordingly, an angle formed by the two normal vectors $A_1$ and $A_2$ is the angle θ formed by the elements F1 and F2. This angle θ is calculated by Equation (18) below:

$$\theta = \cos^{-1}\left( \frac{A_1 \cdot (-A_2)}{|A_1| \cdot |-A_2|} \right) \quad (18)$$

where $0 \leq \theta \leq \pi$. θ need not be 0 to 2 π, and this is apparent from the determination condition in step B209 of FIG. 43.

Since $\theta < (\pi - \partial)$, the side 1 of the element F1 is registered as a contour in step B212.

(5) The manipulations in items (3) and (4) above are performed for all sides of all elements (steps B210 and B211). The result is that all sides of all elements are extracted as contours in this embodiment.

Note that all of the sides herein registered overlap each other. That is, each side is registered for two adjacent elements having the side as their boundary. This overlap can be easily avoided by providing a flag and checking whether each side is already registered as a contour.

This embodiment has exemplified the method of extracting contours from a meshing model consisting of three-dimensional elements. However, this method is applicable to three-dimensional models consisting of two-dimensional elements (film-like elements). That is, two-dimensional elements (film-like elements) need only be used in place of the free faces extracted in FIG. 43. In this case, it is necessary that a contour be not registered even if it is determined in step B209 that the angle θ is close to 0. That is, when expression (19) below, instead of the condition in step B209, is satisfied, the boundary between two adjacent two-dimensional elements is registered as a contour.

$$\partial < \theta < (\pi - \partial) \text{ or } (\pi + \partial) < \theta < (2\pi - \partial) \quad (19)$$

This is because in the case of free faces of three-dimensional elements, normals can be directed to the same point with respect to a model (in the above embodiment, the normals are directed to the inside of the model), whereas in general two-dimensional elements it is not possible to direct normals to the same point.

Also, the method of extracting contours by using the determination condition of expression (19) is similarly applicable to models consisting of both three- and two-dimensional elements. That is, free faces are extracted from three-dimensional elements and added to two-dimensional elements, and processing is performed by regarding that the whole model consists of two-dimensional elements.

According to the experience of the present inventors, it is found that appropriate contours can be extracted from almost all meshing models when the value of the tolerance $\partial$ herein used satisfies the following expression:

$$\pi/180 \leq \partial \leq \pi/18 \quad (20)$$

It is therefore preferable to set a value within the range of expression (20) as a default value of the tolerance $\partial$ and allow the user to change this value to an arbitrary value while using programs. Since the user can change the default value to a given value, proper contours can be extracted from any model.

(Eleventh Embodiment)

In the seventh embodiment, segments not shared by a plurality elements are extracted by removing segments shared by a plurality of elements from all segments of a meshing model. When this method is applied, it is readily possible to extract segments shared by a plurality of elements from a meshing model. Also, overlapping elements can be easily extracted by replacing segments with the elements themselves. Extracting overlapping elements is effective as preprocessing before meshing models are checked and displayed. As an example, each contour is registered twice in the tenth embodiment. Therefore, if overlapping contours are extracted and combined into one contour prior to drawing these contours, the same line is not drawn twice. In this embodiment, a method of extracting overlapping elements and combining them into one element will be described.

The flow of processing of extracting overlapping elements to thereby eliminate the overlap is almost identical with the process flow shown in FIG. 28. That is, the segment list in FIG. 28 is replaced with an element list, and only element numbers are registered in the list. Also, in step A106 overlapping elements are removed from the element list to eliminate the overlap. When it is determined in step A107 that the check is completely performed for all index values, elements remaining in the element list are elements not overlapping each other.

Figure 50:
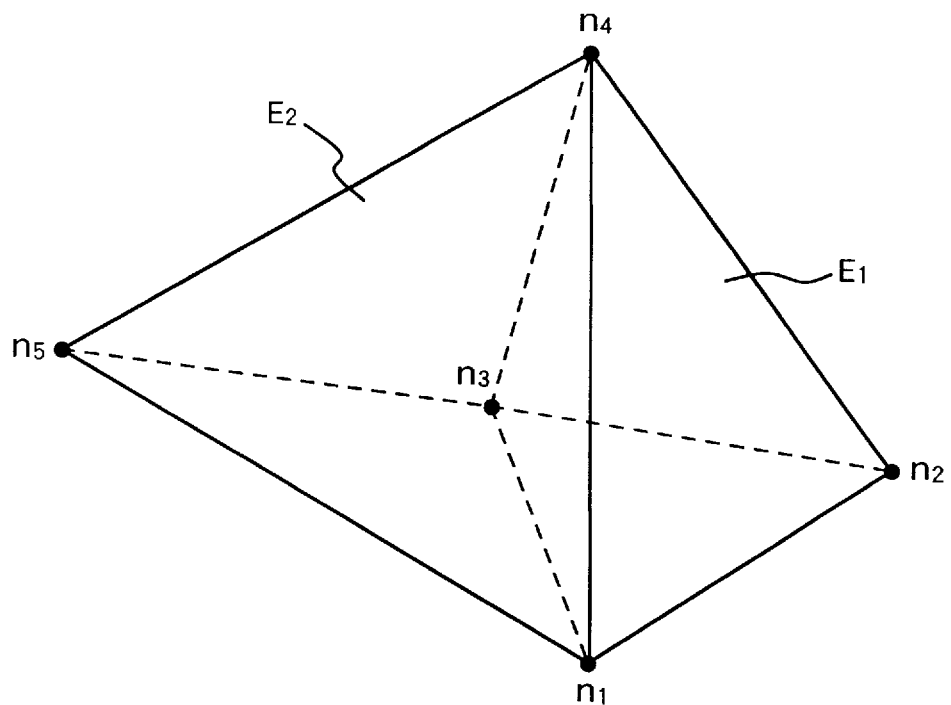
FIG. 50 is a view for explaining practical processing in the prior art.

A case where this processing is performed for a model in which an element E3 identical with an element E2 of a meshing model shown in FIG. 50 is added to the model will be described in detail below.

(1) In steps A101 to A103, an element list and an index table are formed. FIGS. 46A and 46B illustrate the formed list and table, respectively. An index value is the sum of the numbers of nodes constituting an element, and only element numbers are registered in the element list.

(2) If 1 to 12 are set as index values to be checked, nothing is performed since the numbers of corresponding elements are 1 or less (steps A104, A105, and A152).

(3) In step A104, 13 is set as an index value to be checked. In step A105, it is determined that the number of corresponding elements is 2, and so the nodes of elements in the second and third rows of the element list are compared. As a consequence, it is determined that these elements are the same. In step A106, one of the two elements is removed from the element list (in this case E3 is removed).

(4) An index value 14 is similarly checked, and nothing is performed because the number of corresponding elements is 0.

As a result of the above processing in which overlapping elements are combined into one element, the elements E1 and E2 remain in the element list.

In this embodiment, only elements not overlapping each other are obtained by combining overlapping elements into one element. It is, however, apparently readily possible to extract both of overlapping elements and elements not overlapping each other by the use of this method.

This embodiment has been described by taking elements used in a finite difference method, a finite element method, and a boundary element method as examples. However, the present invention is obviously applicable to data having structures analogous to these structures.

As is apparent from the above description, the present invention can provide a method and apparatus for extracting sides, faces, and elements from finite element meshing models, which can extract segments from large-scale meshing models by using even computers incorporating only a small amount of memories, which can faithfully display contours, and which can extract elements including arbitrary points in a model at a high speed.

More specifically, the following effects can be attained.

In the present invention, a segment list requires only a memory of one integer per segment, and an index table also requires only a memory of one integer per segment. As a consequence, memories used are greatly reduced as a whole and this allows even computers not incorporating a large amount of memories to extract segments from large-scale meshing models. For example, 256 Mbytes of memories are conventionally necessary to extract free faces from a meshing model consisting of 1,000,000 hexahedral elements and 1,000,000 nodes. The present invention can perform the same processing with only 40 Mbytes of memories.

Also, the present invention has solved the problem arising when a large number of segments have the same index value. This is because the processing can be easily performed by setting a large value as β in expression (13).

Additionally, the present invention can extract adjacent elements from a meshing model at a very high speed by limiting objects of retrieval to segments having the same index value.

By the use of this adjacent element extraction method, elements including points present in a meshing model can also be extracted at a high speed. This is because adjacent elements can be extracted at a high speed and so the retrieval can be rapidly performed almost linearly in the model. In the case of a meshing model consisting of n elements, the number of times an inclusion check needs to be performed is only the triple root of n in the present invention, whereas the check is conventionally performed n/2 times.

Figures 52A, 52B, 53:
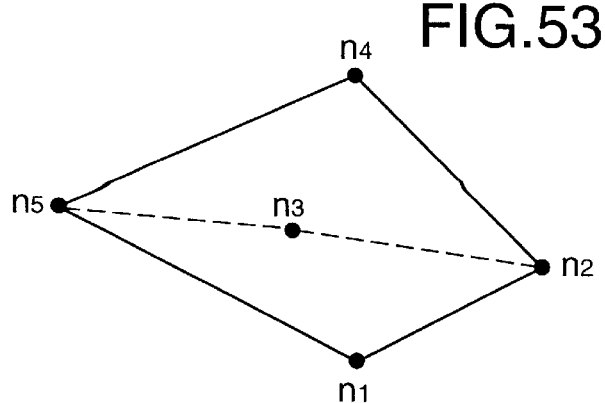
FIGS. 52A and 52B are views for explaining practical processing when segments are sides in the prior art.
FIG. 53 is a view for explaining the result of practical processing in the prior art.

Furthermore, contours faithful to a model can be rapidly obtained. This faithfulness results from a contour obtained from an angle between adjacent free faces. As an example, the free edges shown in FIG. 53 are conventionally displayed as contours for the model shown in FIG. 44. However, the line segments $n_1-n_4$, $n_1-n_3$, and $n_3-n_1$ in FIG. 53 can also be extracted by the present invention. The rapidness results from the high-speed extraction of adjacent free faces.

The present invention can also extract overlapping elements from a meshing model at a high speed.

The present invention can be applied to a system constituted by a plurality of devices (e.g., host computer, interface, reader, printer) or to an apparatus comprising a single device.

Further, as described in the above embodiments, the object of the present invention can also be achieved by providing a storage medium storing program codes for performing the aforesaid processes to a system or an apparatus, reading the program codes with a computer (e.g., CPU, MPU) of the system or apparatus from the storage medium, and then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where on OS or the like working on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

In a case where the present invention is applied to the aforesaid storage medium, the storage medium stores program codes corresponding to the flowcharts described in the embodiments. Briefly, the storage medium stores each module shown as an example of a memory map in FIG. 8B, 20B, or 47B.

More specifically, in FIG. 8B, program codes which correspond to the surrounding element count module and the element segmentation error detection module, at least, are to be stored in the storage medium. In FIG. 20B, program codes which correspond to the segment list formation module, the index table formation module, and the node extraction module, at least, are to be stored in the storage medium. In FIG. 47B, program codes which correspond to the free face extraction module, the contour extraction module, and the vertex extraction module, at least, are to be stored in the storage medium.

The data (file) managing module includes a hierarchical level management program, a data management program and a file (frame) management program. The display managing module includes a hierarchical data display program and a cutout display program.

The storage medium can also include files and/or data to be used for performing the present invention as well as program codes.

The data or file area is separated into a file area and a data base area. The file area stores a hierarchical level list, a file list, attribute data and various tables. The data base area stores personal management-data, schedule data and album data.

The present invention may apply to a system composed of a plurality of equipment or an apparatus realized with one equipment. Needless to say, the present invention can apply to a mode in which a program is installed in a system or apparatus.

Although the preferred embodiments of the present invention have been described above, it should be understood that the present invention is not limited to thereto and that other modifications will be apparent to those skilled in the art without departing from the spirit of the invention.

The scope of the present invention, therefore, is to be determined solely by the appended claims.

What is claimed is:

1. A finite element meshing data error detection method of detecting an error in finite element meshing data formed by segmenting an analytic model into finite elements, comprising the steps of:

counting a number of elements sharing each of boundaries between elements surrounding a node of interest, respectively, when reading out finite element meshing data composed based on nodes and stored in storage means;

determining whether the node of interest is positioned inside or on an outer circumference of an analytic model consisting of finite elements on the basis of the counted value;

detecting an error in the finite element meshing data corresponding to a position of the node of interest on the basis of the determined position, wherein the error detection step includes a step of determining that the node of interest is positioned in a constricted part when all of the counts are not 2 and a number of appearances of a boundary whose count is 1 is not 2.

2. The method according to claim 1, wherein the error detection step comprises determining that the node of interest is a floating point if the count is 0.

3. The method according to claim 1, wherein the error detection step comprises determining that boundaries of elements surrounding the node of interest overlap each other if at least one of the counts is not less than 3.

4. The method according to claim 1, wherein the analytic model is a three-dimensional model, and the error detection step comprises determining that the node of interest is positioned in a constricted part if all of the counts are 1.

5. The method according to claim 1, wherein the analytic model is a three-dimensional model, and the error detection step includes a step of, when the node of interest is positioned on an outer circumference of an analytic model consisting of finite elements, performing finite element meshing data error detection on the basis of connection of boundaries between the elements.

6. The method according to claim 5, wherein the position determination step determining that the node of interest is positioned on an outer circumference of an analytic model consisting of finite elements when all of the counts are not 2, and the error detection step includes the step of performing finite element meshing data error detection on the basis of connection of boundaries whose counts are 1.

7. The method according to claim 6, wherein the error detection step includes the steps of regarding boundaries whose counts are 1 as second elements, counting a number of second elements having each of the boundaries of the second elements, respectively, and, if all of the counts are not 2, determining that the node is positioned in a constricted part.

8. The method according to claim 6, wherein the error detection step includes the steps of regarding boundaries whose counts are 1 are regarded as second elements, counting a number of second elements sharing each of the boundaries between the second elements, respectively, and, when all of the counts are 2 but the second elements do not constitute one continuous element group, determining that the node is positioned in a constricted part.

9. A finite element meshing data error detection method of detecting an error in finite element meshing data formed by segmenting an analytic model into finite elements, comprising the steps of:

counting a number of elements sharing each of boundaries between elements surrounding a node of interest, respectively, when reading out finite element meshing data composed based on nodes and stored in storage means;

obtaining a sum of internal angles around the node of interest in elements surrounding the node of interest;

determining whether the node of interest is positioned inside or on an outer circumference of an analytic model consisting of finite elements on the basis of the counted value and the sum of internal angles;

detecting an error in the finite element meshing data corresponding to a position of the node of interest on the basis of the determined position; and outputting the detected errors, wherein the error detection step includes a step of determining that the node of interest is positioned in a constricted part when all of the counts are not 2 and a number of appearances of a boundary whose count is 1 is not 2.

10. The method according to claim 9, wherein the analytic model is a two-dimensional model, and the error detection step includes a step of determining overlapping of elements if all of the counts are 2 and the sum of the internal angles is not 2 π.

11. The method according to claim 9, wherein the analytic model is a two-dimensional model, and the error detection step includes of step of performing finite element meshing data error detection on the basis of a number of appearances of a boundary whose count is 1 when all of the counts are not 2.

12. The method according to claim 11, wherein the error detection step includes a step of determining that the node of interest is positioned in a constricted part when all of the counts are not 2 and a number of appearances of a boundary whose count is 1 is not 2.

13. The method according to claim 11, wherein the error detection step includes the steps of, when all of the counts are not 2 and a number of appearances of the boundary whose count is 1 is 2, performing finite element meshing data error detection on the basis of whether the sum of the internal angles is between a maximum angle and a minimum angle of an external shape of the analytic model, and, when the sum of the internal angles is not between the maximum and the minimum angles, determining that an element is missing, the node of interest has an overlapping node, or the node is positioned on a boundary of another element.

14. The method according to claim 9, wherein the analytic model is a three-dimensional model, and the error detection step includes a step of determining overlapping of elements when all of the counts are 2 and the sum of the internal angles is not 4 π.

15. The method according to claim 9, wherein the analytic model is a three-dimensional model, and the error detection step includes a step of, when the node of interest is positioned on an outer circumference of an analytic model consisting of finite elements, performing finite element meshing data error detection on the basis of connection of boundaries between the elements.

16. The method according to claim 15, wherein the position determination step includes a step of determining that the node of interest is positioned on an outer circumference of an analytic model consisting of finite elements when all of the counts are not 2, and the error detection step includes a step of performing finite element meshing data error detection on the basis of connection of boundaries whose counts are 1.

17. The method according to claim 16, wherein the error detection step includes the steps of regarding boundaries whose counts are 1 as second elements, counting a number of second elements sharing each of the boundaries of the second elements, respectively, when all of the counts are 2 and the second elements constitute one continuous element group, performing finite element meshing data error detection on the basis of whether the sum of the internal angles is between a maximum angle and a minimum angle of an external shape of the analytic model, and, when the sum of the internal angles is not between the maximum and the minimum angles, determining that an element is missing, nodes overlapping each other, or a node is positioned on a boundary of another element.

18. A finite element meshing data error detection method of detecting an error in finite element meshing data error detection method of detecting an error in finite element meshing data formed by segmenting an analytic model into finite elements, comprising the steps of:

counting a number of elements sharing each of boundaries between elements surrounding a node of interest, respectively, when reading out finite element meshing data composed based on nodes and stored in storage means;

determining whether the node of interest is positioned inside or on the outer circumference of an analytic model consisting of finite elements on the basis of the counted value;

detecting an error in the finite element meshing data corresponding to a position of the node of interest on the basis of the determined position; and outputting the detected error, wherein the analytic model is a two-dimensional model and the error detection step includes a step of determining that the node of interest is positioned in a constricted part when all of the counts are not 2 and a number of appearances of a boundary whose count is 1 is not 2.

19. A finite element meshing data error detection method of detecting an error in finite element meshing data error detection method of detecting an error in finite element meshing data formed by segmenting an analytic model into finite elements, comprising the steps of:

counting a number of elements sharing each of boundaries between elements surrounding a node of interest, respectively, when reading out finite element meshing data composed based on nodes and stored in storage means;

determining whether the node of interest is positioned inside or on the outer circumference of an analytic model consisting of finite elements on the basis of the counted value and a sum of internal angles;

detecting an error in the finite element meshing data corresponding to a position of the node of interest on the basis of the determined position; and outputting the detected error, wherein the analytic model is a two-dimensional model and the error detection step includes the steps of, when all of the counts are not 2 and a number of appearances of a boundary whose count is 1 is 2, performing finite element meshing data error detection on the basis of whether the sum of the internal angles is between a maximum angle and a minimum angle of an external shape of the analytic model, and, when the sum of the internal angles is not between the maximum and the minimum angles, determining that an element is missing, the node of interest has an overlapping node, or a node is positioned on a boundary of another element.

20. A finite element meshing data error detection method of detecting an error in finite element meshing data error detection method of detecting an error in finite element meshing data formed by segmenting an analytic model into finite elements, comprising the steps of:

counting a number of elements sharing each of boundaries between elements surrounding a node of interest, respectively, when reading out finite element meshing data composed based on nodes and stored in storage means;

determining whether the node of interest is positioned inside or on the outer circumference of an analytic model consisting of finite elements on the basis of the counted value;

detecting an error in the finite element meshing data corresponding to a position of the node of interest on the basis of the determined position; and outputting the detected error, wherein the analytic model is a three-dimensional model, the positioning determination step determines that the node of interest is positioned on the outer circumference of an analytic mode consisting of finite elements when all of the counts are not 2, and the error detection step includes the steps of regarding boundaries whose counts are 1 as second elements, counting a number of second elements sharing each between the boundaries of the second elements, respectively, and, when all of the counts are not 2, determining that the node is positioned in a constricted part.

21. A finite element meshing data error detection method of detecting an error in finite element meshing data error detection method of detecting an error in finite element meshing data formed by segmenting an analytic model into finite elements, comprising the steps of:

counting a number of elements sharing each of boundaries between elements surrounding a node of interest, respectively, when reading out finite element meshing data composed based on nodes and stored in storage means;

determining whether the node of interest is positioned inside or on the outer circumference of an analytic model consisting of finite elements on the basis of the counted value;

detecting an error in the finite element meshing data corresponding to a position of the node of interest on the basis of the determined position; and outputting the detected error, wherein the analytic model is a three-dimensional model, the positioning determination step determines that the node of interest is positioned on the outer circumference of an analytic mode consisting of finite elements when all of the counts are not 2, and the error detection step includes the steps of regarding boundaries whose counts are 1 as second elements, counting a number of second elements sharing each of the boundaries between the second elements, respectively, and, when all of the counts are 2 but the second elements do not constitute one continuous element group, determining that the node is positioned in a constricted part.

22. A finite element meshing data error detection method of detecting an error in finite element meshing data error detection method of detecting an error in finite element meshing data formed by segmenting an analytic model into finite elements, comprising the steps of:

counting a number of elements sharing each of boundaries between elements surrounding a node of interest, respectively, when reading out finite element meshing data composed based on nodes and stored in storage means;

determining whether the node of interest is positioned inside or on the outer circumference of an analytic model consisting of finite elements on the basis of the counted value;

detecting an error in the finite element meshing data corresponding to a position of the node of interest on the basis of the determined position; and outputting the detected error, wherein the analytic model is a three-dimensional model, the positioning determination step determines that the node of interest is positioned on the outer circumference of an analytic mode consisting of finite elements when all of the counts are not 2, and the error detection step includes the steps of regarding boundaries whose counts are 1 as second elements, counting a number of second elements sharing each of the boundaries between the second elements, respectively, when all of the counts are 2 but the second elements constitute one continuous element group, performing finite element meshing data error detection on the basis of whether a sum of internal angles around the node of interest in the second elements surrounding the node of interest is between a maximum angle and a minimum angle of an external shape of the analytic model, and, when the sum of the internal angles is not between the maximum and the minimum angles, determining that an element is missing, nodes overlap each other, or a certain node is positioned on a boundary of another element.

23. A method of extracting a side, a face or an element from finite element meshing model formed by segmenting an analytic model into finite elements, comprising the steps of:

when elements and nodes constituting the elements are stored in storage means so as to correspond to each other, and by regarding one side, face, or element as one segment, the segment is extracted from the finite element meshing model;

assigning to each segment an identifier generated on the basis of a combination of nodes constituting the segment;

forming and storing a segment list in which pieces of information of segments having the same identifier are consecutively arranged;

forming and storing an index table in which index values, each indicating a position in the segment list and a number of the segments having the same identifier, are arranged corresponding to the identifiers; and by indicating an identifier, extracting segments having the identifier obtaining from said storage means information of nodes constituting the segments having the identifier, on the basis of the segment list and the index table.

24. The method according to claim 23, wherein the segments stored in the segment list are arranged in a decreasing or increasing order of the identifier.

25. The method according to claim 23, wherein the index value corresponding to each identifier in the index table is expressed by a number of segments corresponding to the identifier and a pointer indicating a first position in the segment list from which the segments having the same identifier are stored.

26. The method according to claim 25, wherein the point is multiplied by an integral value not less than 10, and the number of segments is added to the product, thereby storing the number and the pointer as one integral value in the index table.

27. The method according to claim 25, wherein the segment list and the index table are formed by a procedure of calculating a number of segments having the same identifier on the basis of the identifiers of segments, obtaining the pointer by adding the calculated numbers in an increasing or decreasing order of index value, and registering the information of each segment in the segment list on the basis of the pointer.

28. The method according to claim 23, further comprising a step of extracting a plurality of elements consisting of the same nodes as adjacent elements among the extracted segments having the same identifier.

29. The method according to claim 23, further comprising a step of removing segments consisting of the same nodes from the segment list, thereby allowing only segments not overlapping with other segments to remain in the segment list.

30. The method according to claim 29, wherein the segments are faces constituting a finite element meshing model, and free faces not shared by a plurality of elements are allowed to remain in the segment list.

31. The method according to claim 29, wherein the segments are sides constituting a finite element meshing model, and free edges not shared by a plurality of elements are allowed to remain in the segment list.

32. A method of extracting a side, face or an element from finite element meshing model formed by segmenting an analytic model into finite elements, comprising the steps of:

when elements and nodes constituting the elements are stored in storage means so as to correspond to each other, and by regarding one side, face, or element as one segment, the segment is extracted from the finite element meshing model;

assigning to each segment a first identifier which specifies an element including the segment;

assigning to each segment a second identifier which indicates an ordinal position of the segment in an element;

forming and storing a segment list in which the first and second identifiers of segments having an identifier generated on the basis of a combination of nodes constituting each segment are consecutively arranged, and by indicating an identifier, extracting segments having the identifier and obtaining from said storage means information of nodes constituting the segments having the identifier, on the basis of the segment list.

33. The method according to claim 32, wherein the first identifier is multiplied by a predetermined integral value not less than the number of segments constituting one element, and the second identifier is added to the product, thereby storing the first and the second identifiers as one integral value in the segment list.

34. A method of extracting an element including a point $P_e$ in a finite element meshing model, comprising the steps of:

obtaining, starting from a known point $P_0$ included in a given element $E_0$ a face $F_0$ of the element $E_0$ which intersects a line segment connecting two points $P_e$ and $P_0$;

obtaining an element $E_1$ adjacent to the element $E_0$ through the face $F_0$ as a boundary;

obtaining a face $F_1$, other than the face $F_0$ of the element $E_1$, which intersects the line segment connecting the points $P_e$ and $P_0$;

repeating a process of extracting an element $E_2$ adjacent to the element $E_1$ through the face $F_1$; and extracting an element including the point $P_e$ by tracing the adjacent elements, wherein the adjacent element extracting step includes the steps of:

when elements and nodes constituting the elements are stored in storage means so as to correspond to each other, and by regarding one side, face or element as one segment, the segment is extracted from the finite element meshing mode;

assigning to each segment an identifier generated on the basis of a combination of nodes constituting the segment;

forming and storing a segment list in which pieces of information of segments having the same identifier are consecutively arranged;

forming and storing an index table in which index values, each indicating a position in the segment list and a number of segments having the same identifier, are arranged corresponding to the identifiers;

by indicating an identifier, extracting segments having the identifier and obtaining from said storage means information of nodes constituting the segments having the identifier, on the basis of the segment list and the index table; and extracting a plurality of elements consisting of the same nodes as adjacent elements among the extracted segments having the same identifier.

35. A method of extracting a side from a finite element meshing model, comprising the steps of:

extracting free faces from a three-dimensional finite element model;

by regarding the free faces as shell-like two-dimensional elements, extracting adjacent two-dimensional elements;

calculating an angle θ formed by the adjacent two-dimensional elements; and extracting a boundary between the two-dimensional elements as a contour if a value of the angle θ satisfies $0 \leq \theta < (\pi - \partial)$ or $(\pi + \partial) < \theta < 2\pi$ where $\partial$ is a tolerance, wherein the extracting of the free faces and adjacent two-dimensional elements is performed using information of nodes constituting segments having an identifier obtained from storage means, said information of nodes obtained by the steps of:

when elements and nodes constituting the elements are stored in the storage means so as to correspond to each other, and by regarding one side, face or element as one segment, the segment is extracted from the finite element meshing model, assigning to each segment the identifier generated on the basis of a combination of nodes constituting the segment;

forming and storing a segment list in which pieces of information of segments having the same identifier are consecutively arranged;

forming and storing an index table in which index values, each indicating a position in the segment list and a number of the segments having the same identifier, are arranged corresponding to the identifier; and by indicating an identifier, extracting segments having the identifier and obtaining from said storage means information of nodes constituting the segments having the identifier, on the basis of the segment list and the index table.

36. The method according to claim 35, further comprising the steps of:

adding a three-dimensional meshing model consisting of shell-like, two-dimensional elements to the extracted free faces and extracting adjacent two-dimensional elements; and extracting a boundary between the two two-dimensional elements as a contour if a value of the angle θ satisfies $\partial \leq \theta < (\pi - \partial)$ or $(\pi + \partial) < \theta < 2\pi - \partial$ where $\partial$ is a tolerance.

37. The method according to claim 35, further comprising the steps of:

setting $\pi/180 \leq \partial \leq \pi/18$ as a default value of the tolerance $\partial$, and allowing a user to designate an arbitrary value as the tolerance $\partial$ while using a program.

38. The method according to claim 35, wherein the free face extraction step includes a step of removing segments having the same nodes from the segment list, thereby extracting faces remaining in the segment list as free faces.

39. The method according to claim 35, wherein the adjacent two-dimensional element extraction step includes a step of extracting a plurality of elements, as adjacent faces, constituted by segments consisting of the same nodes among other extracted segments.

40. An apparatus for extracting a side, a face or an element from a finite element meshing model formed by segmenting an analytic model into finite elements, comprising:

means for storing elements and nodes constituting the elements so that the elements and the nodes correspond to each other;

means for regarding one side, face or element as one segment, assigning to each segment an identifier generated on the basis of a combination of nodes constituting the segment;

means for forming and storing a segment list in which pieces of information of segments having the same identifier are consecutively arranged;

means for forming and storing an index table in which index values, each indicating a position in the segment list and a number of segments having the same identifier, are arranged corresponding to the identifier; and means for, by indicating an identifier, extracting segments having the identifier table and obtaining from said storage means information of nodes constituting the segments having the identifier on the basis of the segment list and the index table.

41. The apparatus according to claim 40, wherein the segments stored in the segment list are arranged in a decreasing or increasing order of the identifier.

42. The apparatus according to claim 40, wherein the index value corresponding to each identifier in the index table is expressed by a number of segments corresponding to the identifier and a pointer indicating a first position in the segment list from which the segments having the same identifier are stored.

43. The apparatus according to claim 42, wherein the pointer is multiplied by an integral value not less than 10, and the number of segments is added to the product, thereby storing the number and the pointer as one integral value in the index table.

44. The apparatus according to claim 42, wherein said means for forming and storing the segment list and the index table comprises:

means for calculating a number of segments having an identifier on the basis of the identifiers of segments;

means for obtaining the pointer by adding the calculated numbers in an increasing or decreasing order of index value; and means for registering the pointer in the index table and the information of each segment in the segment list on the basis of the pointer.

45. The apparatus according to claim 40, further comprising means for extracting a plurality of elements consisting of the same nodes as adjacent elements among the extracted segments having the same identifier.

46. The apparatus according to claim 40, further comprising means for removing segments consisting of the same nodes from the segment list, thereby allowing only segments not overlapping with other segments to remain in the segment list.

47. An apparatus for extracting a side, a face or an element from a finite element meshing model formed by segmenting an analytic model into finite elements, comprising:

means for storing elements and nodes constituting the elements so that the elements and the nodes correspond to each other;

means for, by regarding one side, face or element as one segment, assigning to each segment a first identifier which specifies an element including a segment and a second identifier which indicates an ordinal position of the segment in the element;

means for forming and storing a segment list in which the first and second identifiers of segments having an identifier generated on the basis of a combination of nodes constituting each segment are consecutively arranged; and means for, by indicating an identifier, extracting segments having the identifier and obtaining from said storage means information of nodes constituting the segments having the identifier, on the basis on the segment list.

48. The apparatus according to claim 47, wherein the first identifier is multiplied by a predetermined integral value not less than a number of segments constituting one element, and the second identifier is added to the product, thereby storing the first and the second identifiers as one integral-value in the segment list.

49. A method of extracting a contour from a finite element meshing model composed based on nodes and stored in storage means to find an incorrect data included in the finite element meshing model, said finite element meshing model obtained by segmenting an analytic model into finite elements, comprising the steps of:

extracting free faces not shared by a plurality of elements from an element by checking, for all faces of the element, whether each face of the element is shared by another element;

checking, when a number of free faces extracted from an element is not less than 2, whether two free faces sharing any one side of the element are extracted, and determining that a side shared by two free faces is a contour; and extracting contours from the finite element meshing model stored in the storage means on the basis of the determined result.

50. The method according to claim 49, further comprising a step of, when a the number of free faces extracted from an element is not more than 1, determining that any sides of the element are not contours.

51. The method according to claim 49, further comprising a step of extracting overlapping contours, nodes at two ends of which have respective same node numbers, from the extracted contours.

52. A method of extracting a contour and a vertex from a finite element meshing model composed based on nodes and stored in storage means to find an incorrect data included in the finite element meshing model, said finite element meshing model obtained by segmenting an analytic model into finite elements, comprising the steps of:

extracting free faces not shared by a plurality of elements from an element by checking, for all faces of the element, whether each face of the element is shared by another element;

checking, when a number of free faces extracted from an element is not less than 2, whether two free faces sharing any one side of the element are extracted, and determining that a side shared by two free faces is a contour;

checking, when a number of sides determined as contours in an element is not less than 3, whether each of sides sharing one node of the element as an end point thereof is extracted as a contour, and, when all the sides sharing a node are extracted as contours, determining that the node is a vertex;

extracting contours and vertices from the finite element meshing model stored in the storage means on the basis of the determined result of said contour and vertex determining steps.

53. The method according to claim 52, wherein the free face extraction step comprises extracting a free face from an element by checking, for all faces of the element, whether a face of the element is shared by another element, the contour extraction step comprises checking whether two faces having one side of an element as sides thereof are extracted as free faces, and, if both of the two faces are extracted as free faces, determining that the side is a contour, and the vertex extraction step comprises checking whether an edge having one node of each element as an end point thereof is extracted as a contour, and, if all of the sides are extracted as contours, determining that the node is a vertex.

54. The method according to claim 52, further comprising a step of, when a number of free faces extracted from an element is not more than 1, determining that any sides of the element are not contours.

55. The method according to claim 52, further comprising a step of, when a number of sides determined as contours in an element is not more than 2, determining that any nodes of the element are not vertices.

56. The method according to claim 52, further comprising a step of displaying the extracted vertices in a diagram with contours or free edges of the finite element meshing model to check the finite element meshing model.

57. A method of extracting a vertex from a finite element meshing model composed based on nodes and stored in storage means to find an incorrect data included in the finite element meshing model, said finite element meshing model obtained by segmenting an analytic model into finite elements, comprising the steps of:

extracting free edges from an element by checking, for all faces of the element, whether each face of the element is shared by another element;

checking, when a number of free edges extracted from an element is not less than 2, whether two free edges sharing one node of the element as end points thereof are extracted, and determining that a node shared by two free edges is a vertex; and extracting vertices from the finite element meshing model stored in the storage means on the basis of the determined result.

58. The method according to claim 57, further comprising a step of, when a number of free edges extracted from an element is not more than 1, determining that any nodes of the element are not vertices.

59. The method according to claim 57, further comprising a step of displaying the extracted vertices in a diagram with contours or free edges of the finite element meshing model.

60. An apparatus for extracting a contour from a finite element meshing model composed based on nodes and stored in storage means to find an incorrect data included in the finite element meshing model, and finite element meshing model obtained by segmenting an analytic model into finite elements, comprising:

free face extracting means for extracting free faces from an element by checking, for all faces of the element, whether each face of the element is shared by another element;

first contour determining means for determining that any sides of an element are not contours, when a number of free faces extracted from the element is not more than 1;

second contour determining means for checking, when a number of free faces extracted from an element is not less than 2, whether two free faces sharing any one side of the element are extracted, and determining that a side shared by two free faces is a contour; and extracting means for extracting contours from the finite element meshing model stored in the storage means on the basis of the determined result of said first and second contour determining means.

61. The apparatus according to claim 60, further comprising overlapping contour extracting means for extracting overlapping contours, nodes at two ends of which have respective same node numbers, from the extracted contours, to check mismatching between elements in the finite element meshing model on the basis of overlapping of contours.

62. An apparatus for extracting a contour and a vertex from a finite element meshing model composed based on nodes and stored in storage means to find an incorrect data included in the finite element meshing model, said finite element meshing model obtained by segmenting an analytic model into finite elements, comprising:

free face extracting means for extracting free faces from an element by checking, for all faces of the element, whether each face of the element is shared by another element;

first contour determining means for determining that any sides of an element are not contours, when a number of free faces extracted from the element is not more than 1;

second contour determining means for checking, when a number of free faces extracted from an element is not less than 2, whether two faces sharing any one side of the element are extracted, and determining that a side shared by two free faces is a contour;

first vertex determining means for determining that any nodes of an element are not vertices, when a number of sides determined as contours in the element is not more than 2;

second vertex determining means for checking, when a number of sides determined as contours in an element is not less than 3, whether each of sides sharing one node of the element as an end point thereof is extracted as a contour, and, when all the sides sharing a node are extracted as contours, determining that the node is a vertex; and extracting means for extracting contours and vertexes from the finite element meshing model stored in the storage means on the basis of the determined result of said first and second contour determining means and said first and second vertex determining means.

63. The apparatus according to claim 62, further comprising meshing model displaying means for displaying the extracted vertices in a diagram with contours or free edges of the finite element meshing model to check the finite element meshing model.

64. An apparatus for extracting a vertex from a finite element meshing model composed based on nodes and stored in storage means to find an incorrect data included in the finite element meshing model, said finite element meshing model obtained by segmenting an analytic model into finite elements, comprising:

free edge extracting means for extracting free edges from an element by checking, for all faces of the element, whether each face of the element is shared by another element;

first vertex determining means for determining that any nodes of an element are not vertices, when a number of free edges extracted from an element is not more than 1; and second vertex determining means for checking, when a number of free edges extracted from an element is not less than 2, whether two free edges sharing one node of the element as end points thereof are extracted, and determining that a node shared by two free edges is a vertex; and extracting means for extracting vertices from the finite element meshing model stored in the storage means on the basis of the determined result of said first and second vertex determining means.

65. The apparatus according to claim 64, further comprising meshing model displaying means for displaying the extracted vertices in a diagram with contours or free edges of the finite element meshing model to check the finite element meshing model.

66. A computer program product comprising a computer usable medium having computer readable program code means for error detection in finite element meshing data formed by segmenting an analytic model into finite elements, said computer program product including:

computer readable program code means for counting a number of elements having each of boundaries of elements surrounding a node of interest, respectively, when reading out finite element meshing data composed based on nodes and stored in storage means;

computer readable program code means for determining whether the node of interest is positioned inside or on an outer circumference of an analytic model consisting of finite elements on the basis of the counted value;

computer readable program code means for detecting an error in the finite element meshing data corresponding to a position of the node of interest on the basis of the determined position; and computer readable program code means for outputting the detected error.

67. The product according to claim 66, further comprising computer readable program code means for checking whether the node of interest is positioned inside or on an outer circumference of an analytic model consisting of finite elements.

68. The product according to claim 66, further comprising data of a finite element meshing model.

69. A computer program product comprising a computer usable medium having computer readable program code means for extracting a side, a face and an element from a finite element meshing model in finite element meshing data formed by segmenting an analytic model into finite elements, said computer program product comprising:

computer readable program code means for, when regarding one side, face or element as one segment and extracting the segment from a finite element meshing model composed based on nodes, assigning to each segment a first identifier which specifies an element including the segment, a second identifier which indicates an ordinal position of the segment in an element, and a combination of nodes constituting the segment;

computer readable program code means for forming and storing a segment list in which the first and second identifiers of segments having a third identifier are consecutively arranged;

computer readable program code means for forming and storing an index table in which index values, each indicating a position in the segment list and a number of the segments having the same third identifier, are arranged corresponding to the third identifiers; and computer readable program code means for, by indicating a third identifier, extracting segments having the same third identifier and obtaining by indicating an identifier, information of nodes constituting the segments having the identifier, on the basis on the segment list and the index table.

70. The product according to claim 69, further comprising data of a finite element meshing model.

71. A computer program product comprising a computer usable medium having computer readable program code means for extracting a contour or a vertex from a finite element meshing model composed based on nodes and stored in storage means to find an incorrect data included in the finite element meshing model, said finite element meshing model obtained by segmenting an analytic model into finite elements, said computer program product comprising:

computer readable program code means for extracting free faces from an element by checking, for all faces of the element, whether each face of the element is shared by another element;

computer readable program code means for determining that any sides of an element are not contours, when a number of free faces extracted from the element is not more than 1;

computer readable program code means for checking, when a number of free faces from an element is not less than 2, whether two free faces sharing any one side of the element are extracted, and determining that a side shared by two free faces is a contour; and computer readable program code means for extracting contours from the finite element meshing model stored in the storage means on the basis of the contour determined result.

72. The product according to claim 71, further comprising computer readable program code means for extracting a vertex by using data of the extracted contour.

73. The product according to claim 71, further comprising data of a finite element meshing model.

\* \* \* \* \*

UNITED STATES PATENT AND TRADEMARK OFFICE
CERTIFICATE OF CORRECTION

PATENT NO. : 5,819,070

DATED : October 6, 1998

INVENTOR(S) : TOYOSHIGE SASAKI

Page 1 of 5

It is certified that error appears in the above-identified patent and that said Letters Patent is hereby corrected as shown below:

ON THE TITLE PAGE:

Line [56] References Cited, FOREIGN PATENT DOCUMENTS "4346178" should read --4-346178--.

SHEET 21

Figure 14, "INCLUDIND" should read --INCLUDING--.

SHEET 24

Figure 17:
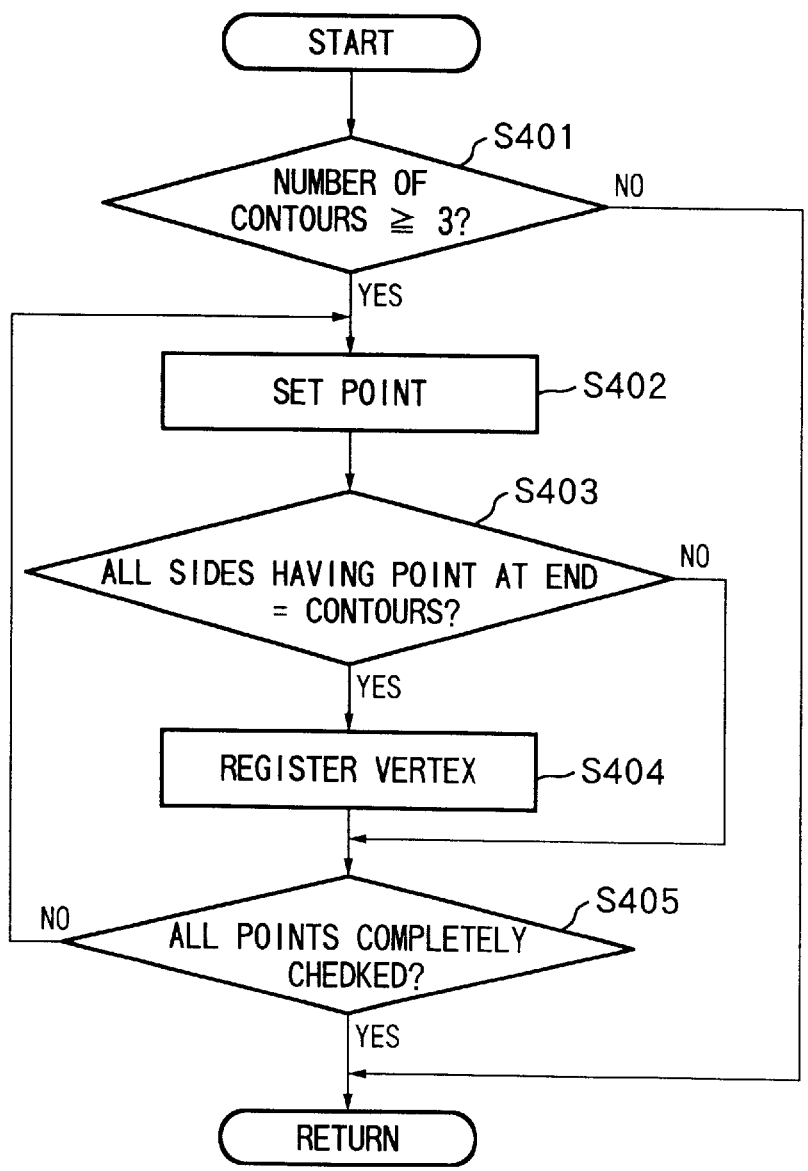
FIG. 17 is a flow chart showing the process flow in the fifth embodiment of the present invention.

Figure 17, "CHEDKED?" should read --CHECKED?--.

SHEET 35

Figure 29, "OFCORRESPONDING" should read --OF CORRESPONDING--.

COLUMN 2

Line 11,   "referred" should read --referred to--.

COLUMN 7

Line 15, "$n_9-n_{10}$," should read --$n_9-n_{10}$, and--.

UNITED STATES PATENT AND TRADEMARK OFFICE
CERTIFICATE OF CORRECTION

PATENT NO. : 5,819,070
DATED : October 6, 1998
INVENTOR(S) : TOYOSHIGE SASAKI

It is certified that error appears in the above-identified patent and that said Letters Patent is hereby corrected as shown below:

COLUMN 9

Line 6, "No. b" should read --No.--.

COLUMN 12

Line 28, "n2." should read --n/2.--.

COLUMN 14

Line 15, "an alytic" should read --analytic--.

COLUMN 21

Line 28, "$n_o n_j$" should read --$n_o n_1$--.

COLUMN 22

Line 9, "$(r_n=0)$" should read --$(r_n=0)$.--.
Line 42, "indicate" should read --indicates--.
Line 63, "$n_o$is" should read --$n_o$ is--.

UNITED STATES PATENT AND TRADEMARK OFFICE
CERTIFICATE OF CORRECTION

PATENT NO. : 5,819,070

DATED : October 6, 1998

INVENTOR(S) : TOYOSHIGE SASAKI

It is certified that error appears in the above-identified patent and that said Letters Patent is hereby corrected as shown below:

COLUMN 24

Line 33, "$n_o n_k n_i$"," should read --$n_o n_i n_j$",--.
Line 34, "$n_o n_k n_i$"," (first occurance) should read --$n_o n_j n_k$",--.

COLUMN 25

Line 49, "other" should read --other.--.
Line 59, "no" should read --$n_o$--.

COLUMN 26

Line 30, "$n_o n_j$" should read --$n_o n_i$--.

COLUMN 32

Line 50, "whether" should read --Whether--.

COLUMN 36

Line 9, "correspond" should read --corresponding--.

COLUMN 39

Line 8, "($\leftarrow$0+1)." should read --(1$\leftarrow$0+1).--.

UNITED STATES PATENT AND TRADEMARK OFFICE
CERTIFICATE OF CORRECTION

PATENT NO. : 5,819,070

DATED : October 6, 1998

INVENTOR(S) : TOYOSHIGE SASAKI

It is certified that error appears in the above-identified patent and that said Letters Patent is hereby corrected as shown below:

COLUMN 42

Line 13, "element" should read --element.--.

COLUMN 43

Line 17, "Embodiment)" should read --Embodiment)¶ --.

COLUMN 44

Line 15, "is" should read --are--.
    Line 22, "$n_4$." should read --$n_4$,--.

COLUMN 45

Line 6, "$(x_1,y_1,z_1)f$" should read --$(x_1,y_1,z_1)$,--.
    Line 67, "Pe," should read --Pe.--.

COLUMN 50

Line 41, "on OS" should read --an OS--.

COLUMN 52

Line 45, "errors," should read --error,--.

UNITED STATES PATENT AND TRADEMARK OFFICE
CERTIFICATE OF CORRECTION

PATENT NO. : 5,819,070
DATED : October 6, 1998
INVENTOR(S) : TOYOSHIGE SASAKI

It is certified that error appears in the above-identified patent and that said Letters Patent is hereby corrected as shown below:

COLUMN 57

Line 30, "$E_o$" (first occurrence) should read --$E_o$,--.
    Line 35, "$F_o$" should read --$F_o$,--.

COLUMN 60

Line 4, "basis on" should read --basis of--.
    Line 30, "a the" should read --a--.
    Line 36, "contours." should read --contours, overlapping of contours in checking mismatching between elements in the finite element meshing model.--.

COLUMN 64

Line 15, "basis on" should read --basis of--.

Signed and Sealed this

Twenty-eighth Day of December, 1999

Attest:

*Attesting Officer*

Q. TODD DICKINSON

*Acting Commissioner of Patents and Trademarks*